(12) United States Patent
Jinnai et al.

(10) Patent No.: US 9,566,933 B2
(45) Date of Patent: Feb. 14, 2017

(54) AIRBAG DEVICE

(71) Applicant: TOYODA GOSEI CO., LTD., Kiyosu-shi, Aichi-ken (JP)

(72) Inventors: Ryosuke Jinnai, Kiyosu (JP); Hiroki Imaeda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/067,516

(22) Filed: Mar. 11, 2016

(65) Prior Publication Data

US 2016/0280179 A1  Sep. 29, 2016

(30) Foreign Application Priority Data

Mar. 27, 2015 (JP) ................. 2015-067105
Feb. 23, 2016 (JP) ................. 2016-032507

(51) Int. Cl.
*B60R 21/217* (2011.01)
*B60R 21/232* (2011.01)
*B60R 21/231* (2011.01)
*B60R 21/2346* (2011.01)
*B60R 21/235* (2006.01)

(52) U.S. Cl.
CPC ......... *B60R 21/2171* (2013.01); *B60R 21/232* (2013.01); *B60R 21/2346* (2013.01); *B60R 2021/23123* (2013.01); *B60R 2021/23514* (2013.01)

(58) Field of Classification Search
CPC ............... B60R 21/2171; B60R 21/232; B60R 21/2346; B60R 21/23123
See application file for complete search history.

(56) References Cited

U.S. PATENT DOCUMENTS

| 2006/0108778 | A1 | 5/2006 | Ochiai et al. | |
| 2010/0084841 | A1* | 4/2010 | Suemitsu | B60R 21/2346 280/730.2 |
| 2010/0164209 | A1* | 7/2010 | Magnin | B60R 21/232 280/740 |
| 2012/0049496 | A1* | 3/2012 | Gamill | B60R 21/2346 280/742 |
| 2013/0200596 | A1* | 8/2013 | Goto | B60R 21/262 280/728.2 |

(Continued)

FOREIGN PATENT DOCUMENTS

| JP | 2006-117109 A | 5/2006 |
| JP | 2011-201518 A | 10/2011 |

*Primary Examiner* — Ruth Ilan
(74) *Attorney, Agent, or Firm* — Posz Law Group, PLC

(57) ABSTRACT

An airbag of an airbag device includes a connection port to be joined with an inflator and a flexible reinforcing sheet disposed inside the connection port. The reinforcing sheet includes a first cover region and a second cover region each of which wraps the leading end of the inflator and has an opening for providing gas communication with a main body of the airbag. The first cover region has a double-folded configuration that is doubled on a crease which crosses an axial direction of the inflator while the second cover region has a double-folded configuration that is doubled on a crease extending in parallel to the axial direction of the inflator. The first cover region and second cover region are arranged in such an overlapped fashion that the crease of the first cover region continues to the crease of the second cover region.

18 Claims, 37 Drawing Sheets

(56) References Cited

U.S. PATENT DOCUMENTS

2014/0125041 A1\* 5/2014 Kalandek .............. B60R 21/232
  280/740
2014/0306435 A1\* 10/2014 Lee ....................... B60R 21/261
  280/742
2015/0014973 A1\* 1/2015 Osterfeld .............. B60R 21/262
  280/742

\* cited by examiner

Schematic Section at XXXVA-XXXVA

Schematic Section at XXXVB-XXXVB

Schematic Section at XXXVC-XXXVC

A.

B.

A.

B.

AIRBAG DEVICE

CROSS REFERENCE TO RELATED APPLICATIONS

The Present application claims priority from Japanese Patent Application No. 2015-067105 of Jinnai, filed on Mar. 27, 2015, and Japanese Patent Application No. 2016-032507 of Imaeda et al., filed on Feb. 23, 2016, the entire disclosures of which are incorporated herein by reference.

BACKGROUND OF THE INVENTION

1. Field of the Invention

The present invention relates to an airbag device adapted to be mounted on a vehicle and provided with an airbag and a generally cylindrical inflator for feeding an inflation gas to the airbag to inflate the airbag.

2. Description of Related Art

A known airbag connected with a generally cylindrical inflator includes an airbag body and a flexible reinforcing sheet (reinforcing cloth) disposed inside the redirecting sheet for enhancing heat resistance, as shown in JP2011-201518A, paragraph 0041 and FIGS. 14 and 18. The airbag body includes a main inflatable portion which is inflatable with an inflation gas in such a manner as to separate a front wall from a back wall and a connection port which is formed into a tube for connection with the inflator to admit the inflation gas. The connection port includes a root region which extends from and generally perpendicularly to the main inflatable portion and a tubular region into which the inflator is inserted. The tubular region is formed generally perpendicularly to the root region, thus the connection port is formed into an L shape and mounted on a vehicle in that L shape. The reinforcing sheet is mounted around the inflator inside the connection port for enhancing head resistance. The conventional reinforcing sheet is formed by folding a plain-weave cloth or the like in half and sewing peripheral edges thereof together because that way the reinforcing sheet can be manufactured at a lower cost than a reinforcing sheet formed by one-piece woven technology (as disclosed in JP2006-117109A, by way of example).

The problem with the conventional reinforcing sheet is that it has a crease of the double-folding of the plain-weave cloth on the upper edge facing away from the main inflatable portion of the bag body inside the tubular region of the connection port while a seam by the sewing is disposed in a vicinity of the front edge inside the root region of the connection port disposed away from the inflator.

The inflation gas fed from the inflator flows along an axial direction of the tubular region of the connection port and hits the front edge of the root region of the connection port, and then is redirected towards the main inflatable portion of the bag body. That is, the inflation gas hits the seam of the reinforcing sheet before flowing into the bag body.

Since the seam is likely to be damaged due to hot inflation gas, an improvement in the heat resistance of the reinforcing sheet has been desired.

SUMMARY OF THE INVENTION

An object of the present invention is to provide an airbag device whose reinforcing sheet disposed inside a connection port of the airbag has an improved heat resistance with a simple configuration.

The airbag device of the invention, which is mountable on a vehicle, includes an inflatable airbag and a generally cylindrical inflator which emits an inflation gas from the leading end region for inflating the airbag. The airbag includes a bag body and a flexible reinforcing sheet disposed inside the bag body for covering the leading end region of the inflator. The bag body includes a main inflatable portion that is inflatable in such a manner as to separate a front wall from a back wall thereof and a connection port that is tubular in shape and connected with the inflator for admitting the inflation gas into the main inflatable portion. The reinforcing sheet is disposed inside the connection port in such a manner as to cover an outer circumference of the inflator.

The reinforcing sheet includes a first cover region and a second cover region. The first cover region has a double-folded configuration that is doubled at a region of the redirecting sheet distant from the leading end region of the inflator in an axial direction of the inflator on a crossing crease which crosses the axial direction of the inflator, and wraps the leading end region of the inflator with regions of the first cover portion disposed on both sides of and away from the crossing crease. The second cover region has a double-folded configuration that is doubled at a distant edge of the reinforcing sheet disposed facing away from the main inflatable portion of the bag body on an axial-direction crease which extends in parallel to the axial direction of the inflator, and wraps the leading end region of the inflator with regions of the second cover region disposed on both sides of the axial-direction crease.

The reinforcing sheet is so configured that the first cover region and second cover region are arranged in such an overlapped fashion that the crossing crease continues to the axial-direction crease at a region distant from the leading end of the inflator, and each of the first cover region and second cover region has an opening facing towards the main inflatable portion of the bag body.

With the airbag device of the invention, an inflation gas discharged from the leading end region of the inflator will flow through the connection port before flowing into the main inflatable region of the bag body. At this time, inside the reinforcing sheet, before flowing into the main inflatable portion via the openings of the first and second cover regions, the gas will hit the crossing crease of the first cover region of the reinforcing sheet. Since the crossing crease is a crease on which the first cover region are doubled (folded) and thus continuous, it has an improved heat resistance in comparison with a conventional reinforcing sheet in which the corresponding region is sewn up with a sewn seam. Moreover, although the gas discharged out of the leading end region of the inflator also hits the distant edge of the reinforcing sheet facing away from the opening of the reinforcing sheet, there is disposed the axial-direction crease of the second cover region. The axial-direction crease is also a crease on which the second cover region are doubled (folded) and thus continuous. Accordingly, the region has an improved heat resistance in comparison with an instance where the region is sewn up with a sewn seam. Since the reinforcing sheet can be formed simply by arranging the first cover region and second cover region in such an overlapped fashion that the crossing crease continues to the axial-direction crease, the reinforcing sheet having an enhanced heat resistance can be provided in a simple fashion.

Therefore, with the airbag device of the invention, the heat resistance of the reinforcing sheet disposed inside the connection port of the airbag can be improved in a simple fashion.

In the airbag device of the invention, it is further desired that the second cover region of the reinforcing sheet is located on an inner side of the first cover region, that is, the second cover region provided with the axial-direction crease is located more proximate to the inflator than the first cover region.

With this configuration, an inflation gas discharged from the leading end region of the inflator firstly will hit the axial-direction crease of the second cover region, and then is redirected by the crossing crease of the first cover region inside the connection port of the bag body, before flowing into the main inflatable portion of the bag body. Accordingly, the reinforcing sheet will exert its heat resistance performance in a further adequate fashion at an upper reach of the inflation gas.

In this instance, it is desired that the second cover region and the first cover region of the reinforcing sheet are sewn together by an end region of the second cover region which is disposed distant from the leading end of the inflator in the axial direction of the inflator.

This configuration will prevent the end region of the second cover region distant from the leading end of the inflator from riding up and being separated from the first cover region due to an inflation gas, and further prevent the inflation gas from flowing into a space between the second cover region and first cover region via the end region of the second cover region. By way of example, even if the gas hits the crossing crease of the first cover region and bounces back towards the axial-direction crease of the second cover region, the gas is not likely to flow into a space outside of the second cover region since the end region of the second cover region stays fixed to the first cover region. Accordingly, if there is a seam of the first cover region or the like outside the axial-direction crease, the seam will not be damaged by the inflation gas.

Moreover, in the airbag device of the invention, it is desired that the crossing crease of the first cover region of the reinforcing sheet is inclined from a direction perpendicular to the axial direction of the inflator at such an angle as to enlarge toward the opening of the first cover region.

Due to such an inclination angle, an inflation gas discharged from the leading end region of the inflator will hit the crossing crease and then be smoothly redirected towards the opening and further towards the main inflatable portion of the bag body, and a pressure increase in a vicinity of the crossing crease will also be prevented.

It is also desired that the first cover region of the reinforcing sheet is sewn up by the distant edge of the reinforcing sheet that is disposed on a part facing away from the main inflatable portion and extends in such a fashion as to continue from the crossing crease.

If the distant edge, which is located away from the opening of the first cover region, is sewn up, when the first cover region is set inside the connection port, the sewn seam of the distant edge will prevent a front region and a back region of the first cover region from slipping from each other and facilitate the setting of the first cover region at a predetermined location inside the connection port.

It is also desired that the second cover region of the reinforcing sheet is sewn up by the edge disposed on a part facing away from the axial-direction crease and adjoining the opening and an opening for receiving the inflator.

When the second cover region is set inside the connection port, this configuration will prevent a front region and a back region of the second cover region from slipping from each other and facilitate the setting of the second cover region at a predetermined location inside the connection port.

It is also desired in the above invention that the first cover region and second cover region are sewn together at the edges that are disposed on a part facing away from the axial-direction crease and adjoin the openings of the first cover region and second cover region and openings for receiving the inflator.

This configuration will prevent the first cover region and second cover region, including the front regions and back regions of the first and second cover regions, from slipping from each other, and facilitate the setting of the reinforcing sheet at a predetermined location inside the connection port.

It is further desired that the first cover region and second cover region are composed of such a single piece of sheet material that the first cover region and second cover region are joined with each other in a seamless fashion.

This configuration will facilitate the handling of the material of the reinforcing sheet and eliminate the need for joining the first cover region and second cover region.

The first cover region may include, in a vicinity of the crossing crease, a reinforced region which has a multi-layered structure. Likewise, the second cover region may include in a vicinity of the axial-direction crease a reinforced region which has a multi-layered structure.

This configuration will further help improve the heat resistance in the vicinity of the crossing crease and/or axial-direction crease of the reinforcing sheet.

In the airbag device of the invention, in order to improve the heat resisting property of the reinforcing sheet, at least either one of the cover regions disposed closer to the inflator desirably includes a coating layer having heat resisting property on the inner plane approximating the inflator.

For an even higher heat resistance, both of the first cover region and second cover region desirably include such a coating layer on the planes facing towards the inflator.

When the either one of the cover regions disposed closer to the inflator includes a coating layer having heat resisting property as described above, it is desired that the cover region disposed closer to the inflator further includes tongue regions that are disposed proximate to an opening of the connection port for receiving the inflator and on both sides of the inflator in an opposing fashion, and that the tongue regions are folded back on an outer surface of the connection port and attached to the outer surface of the connection port.

Usually, a heat-resisting coating layer formed from such a coating agent as silicone resin has a high friction resistance and makes it difficult to insert the inflator into the reinforcing sheet via the opening of the connection port. However, with this configuration, the tongue regions extend from inside to the outside of the opening of the connection port and covers the end planes of the reinforcing sheet and connection port, and will assist the insertion of the inflator into the reinforcing sheet by being gripped by fingers. The tongue regions will further help prevent the inflator from being erroneously inserted in between the reinforcing sheet and connection port.

In the airbag device of the invention, it is further desired that the airbag further includes a flexible redirecting sheet that is disposed inside the connection port and a region of the main inflatable portion adjoining the connection port such that the reinforcing sheet is located on an inner side of the redirecting sheet. The redirecting sheet includes a connection tube region that is disposed inside the connection port to receive the leading end region of the inflator and be connected with the inflator, and an outlet region that extends from the connection tube region into the main inflatable portion and includes at least two outlet ports for releasing the inflation gas towards opposite directions.

With this configuration, the redirecting sheet reinforced by the reinforcing sheet will smoothly guide an inflation gas fed from the inflator to the outlet region and feed the gas to the main inflatable portion of the bag body via the outlet ports in a furcate fashion.

It is desired that the redirecting sheet is composed of a piece of flexible sheet material that is formed into the redirecting sheet by being folded in half on a crease disposed in the outlet region and sewn up by overlapped outer peripheral edges thereof.

With this configuration, before an inflation gas flows out of the outlet ports of the redirecting sheet, the inflation gas having passed through the opening of the reinforcing sheet will hit the crease disposed in the outlet region. Since the crease is a region where a front region and a back region of the redirecting sheet are continuous and is not such a sewn-up region that the front region and back region are sewn together, the region around the crease has a high heat resistance. Therefore, the redirecting sheet with the above configuration will have a high heat resistance with a simple configuration.

The redirecting sheet may include an additional intermediate outlet port for releasing the inflation gas between the outlet ports in the outlet region.

This configuration will facilitate controlling of the flow rate of the inflation gas released from the outlet ports of the redirecting sheet depending on the number of inflatable portions of the bag body and improve the performance of the airbag.

In the airbag device of the invention, it is further desired that:

the redirecting sheet includes a bent region at which the outlet region bends from the connection tube region in a generally L shape, and a seam sewing up the overlapped outer peripheral edges of the redirecting sheet is located at the bent region;

the redirecting sheet is provided, on an inner plane thereof of at least a vicinity of the bent region, with a patch cloth having flexibility;

the patch cloth is integrated with the redirecting sheet by being sewn to regions of the redirecting sheet on both sides of the crease, along the bent region, in a vicinity of the bent region and at a position dislocated from the seam at the bent region; and the seam at the bent region sews edges of the patch cloth together with the redirecting sheet.

When the airbag device is actuated and the inflator feeds an inflation gas to the airbag, a stress concentration is likely to occur on the seam at the bent region of the redirecting sheet due to a tension force generated by pressure of the gas. However, the seam is reinforced by the patch cloth. Specifically, the patch cloth is sewn to the reinforcing sheet in the vicinity of the seam of the bent region on both sides of the crease of the redirecting sheet, and increases the thickness of the redirecting sheet. This configuration will help prevent the seam at the bent region of the redirecting sheet from being damaged by the inflation gas.

In the above instance, the patch cloth is desirably composed of a single sheet material for easy handling and easy mounting on the redirecting sheet.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
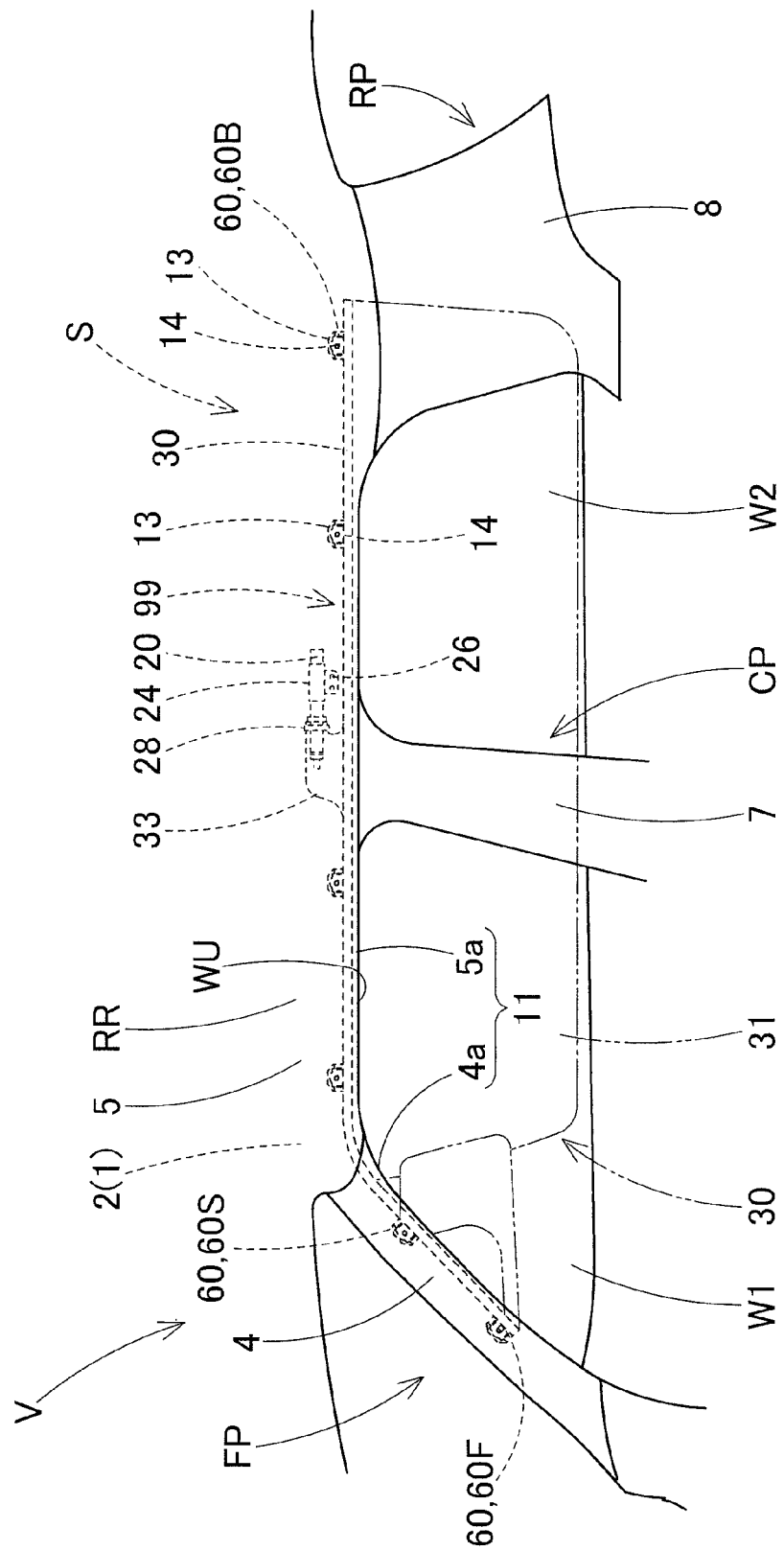
FIG. 1 is a front elevation of a head-protecting airbag device embodying the present invention as mounted on a vehicle, viewed from an interior of the vehicle.

FIG. 1 illustrates an airbag device S embodying the present invention, which is a head-protecting airbag device. The airbag device S includes an airbag (curtain airbag) 30, an inflator 20 for feeding an inflation gas to the airbag 30, an airbag cover 11, and a plurality of mounting brackets 13. The airbag 30 is stored in a folded-up configuration in upper peripheries WU of windows (side windows) W1 and W2 of a vehicle V, which windows being disposed one behind the other at a side of a front seat and a rear seat inside a vehicle V. That is, the airbag 20 is stored extendedly in a lower peripheral region of a front pillar FP to a region above a rear pillar RP, via a region above a middle pillar CP.

Figure 2:
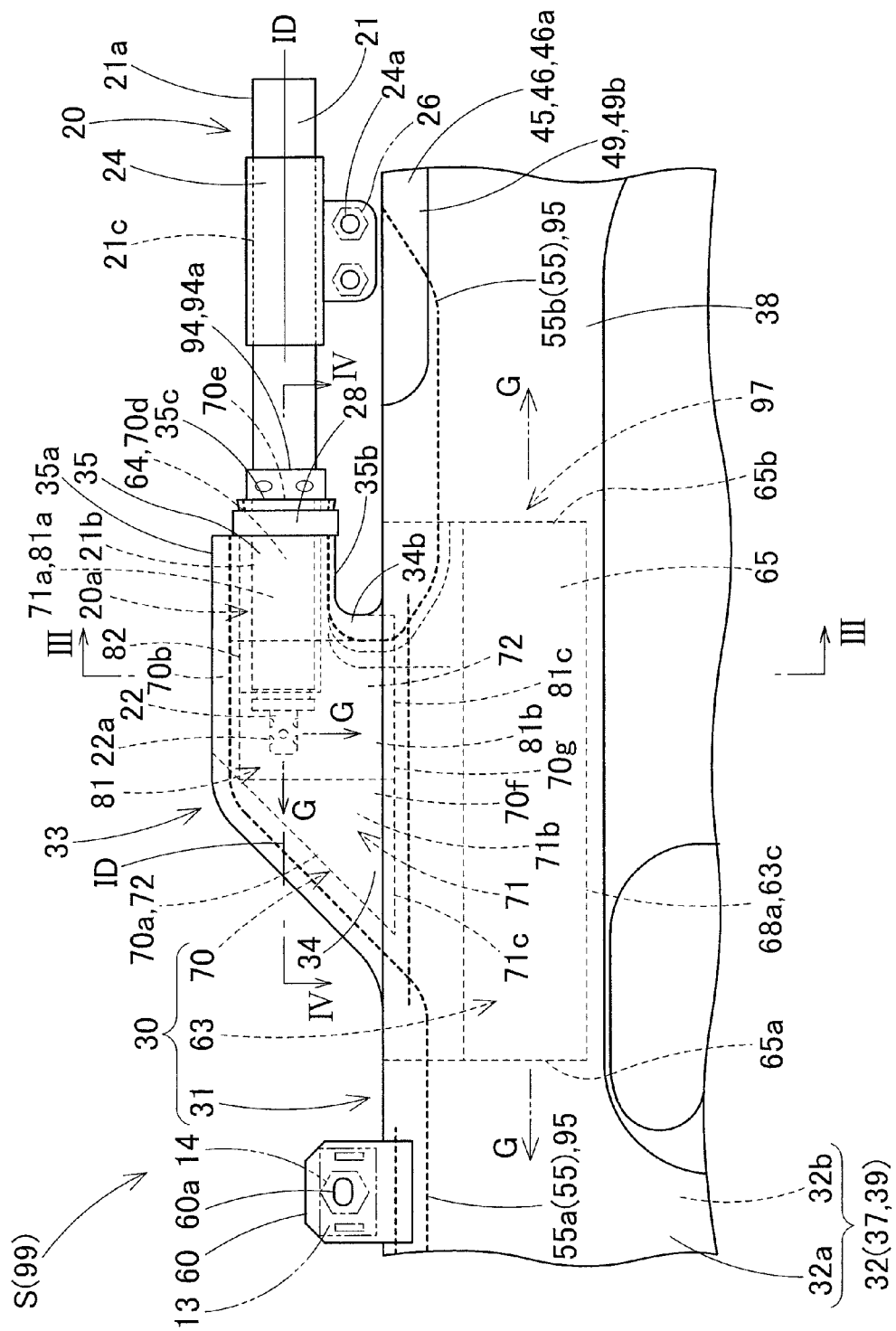
FIG. 2 is a schematic partial enlarged front elevation of the airbag device of FIG. 1 as actuated, especially showing a vicinity of an inflator.
Figure 3:
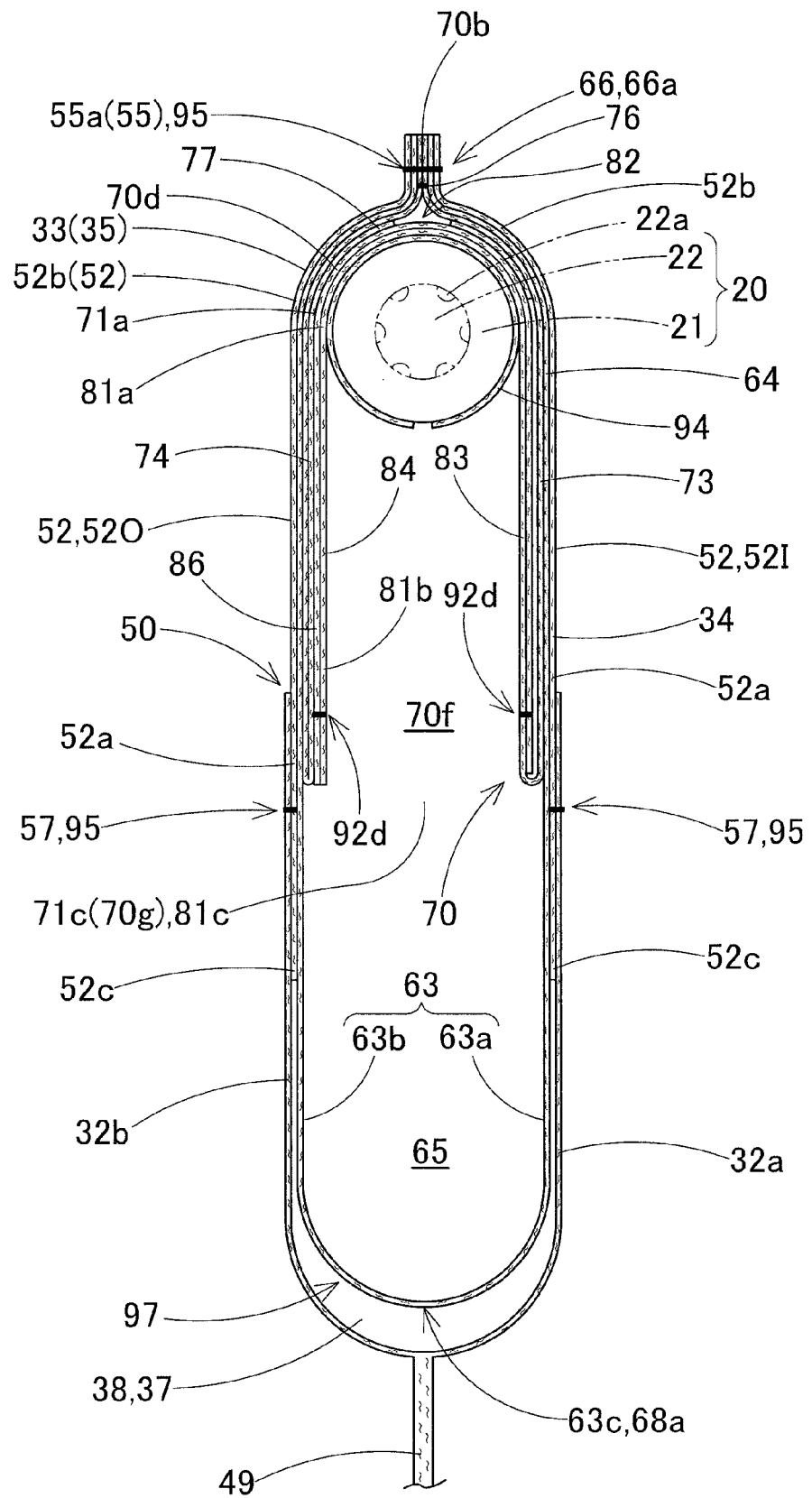
FIG. 3 is a schematic section taken along line III-III of FIG. 2.
Figure 4:
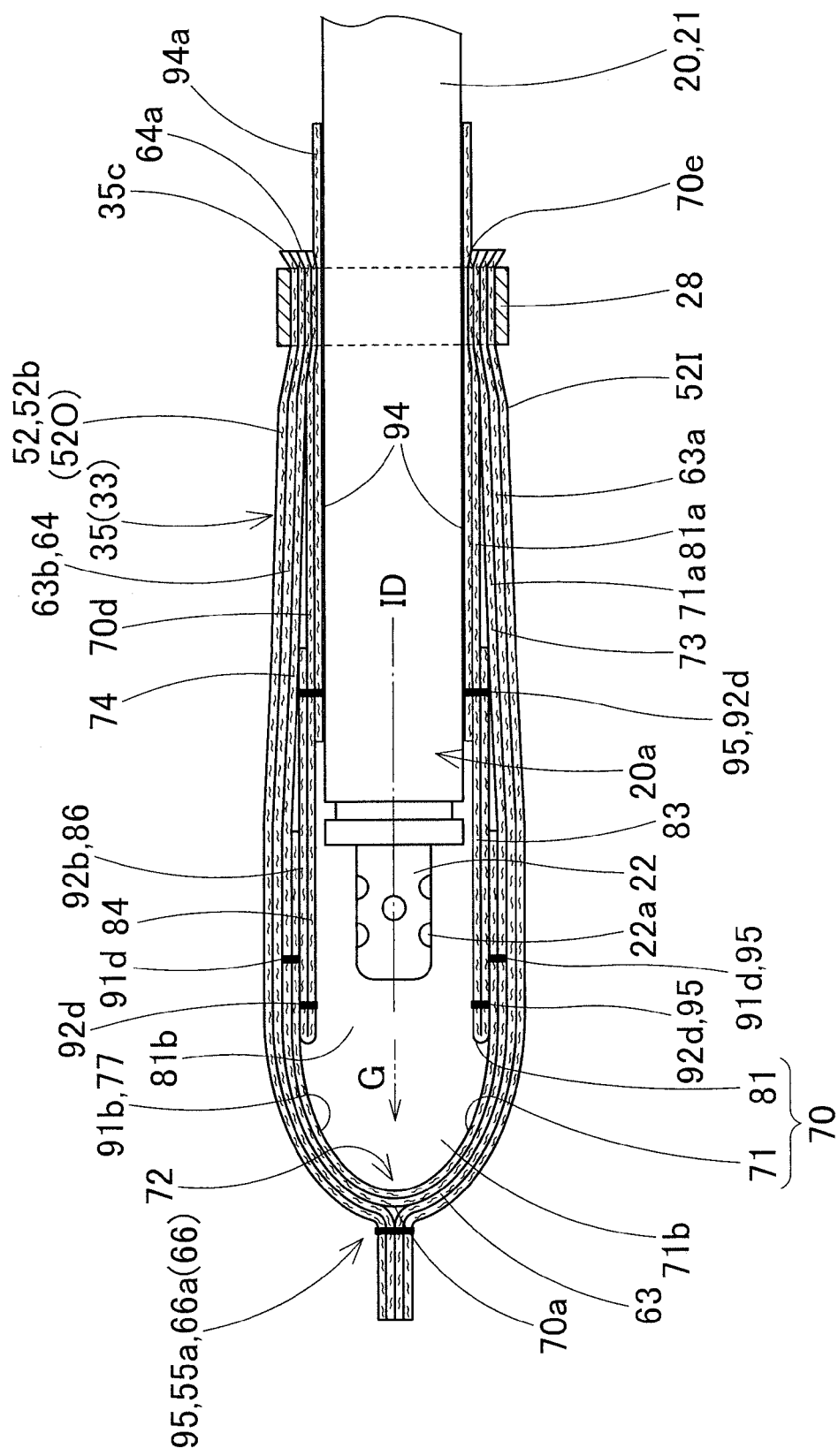
FIG. 4 is a schematic section taken along line IV-IV of FIG. 2.

As shown in FIGS. 2 to 4, the inflator 20 is formed into a generally tube and is inserted into a later-described connection port 33 of the airbag 30 and thus joined with the airbag 30. The inflator 20 contains a combustible gas-generating agent to generate an inflation gas G, and includes an ignition device, a cylindrical main body 21 and a gas releasing portion 22 disposed at the leading end of the main body 21. The gas releasing portion 22 is smaller in diameter than the main body 21 and provided with a plurality of gas discharge ports 22a for releasing the gas G when the airbag device S is actuated.

The inflator 20 is secured to an inner panel 2 at a roof side rail RR located in a vicinity of an upper region of the middle pillar CP with a mounting bracket 24, as shown in FIG. 1. The mounting bracket 24 is mounted around an outer circumference 21c of the main body 21 of the inflator 20 at a root region of the main body 21 in a clamping fashion, and is bolt 26 fixed to the inner panel 2. The inflator 20 is covered with a lower rim 5a of a roof head liner 5 (FIG. 1). The leading end 20a of the inflator 20 including the gas releasing portion 22 is inserted into a later-described tubular region 35 of the connection port 33 of the airbag 30, and the tubular region 35 is pressed against the inflator 20 by a clamp (connecting means) 28. Thus the inflator 20 is connected with the tubular region 35.

The inflator 20 is actuated by a predetermined control device which can detect a side impact or an oblique collision including an offset collision of the vehicle V. As shown in FIG. 1, the mounting brackets 13 help secure later-described mounting portions 60 of the airbag 30 to the inner panel 2 by mounting bolts 14. Each of the bolts 14 is fastened into a screw hole on the inner panel 2 provided with a nut or the like.

As shown in FIG. 1, the airbag cover 11 is composed of a lower rim 4a of a front pillar garnish 4 arranged on the front pillar FP and the lower rim 5a of the roof head liner 5 arranged on the roof side rail RR.

Figure 5:
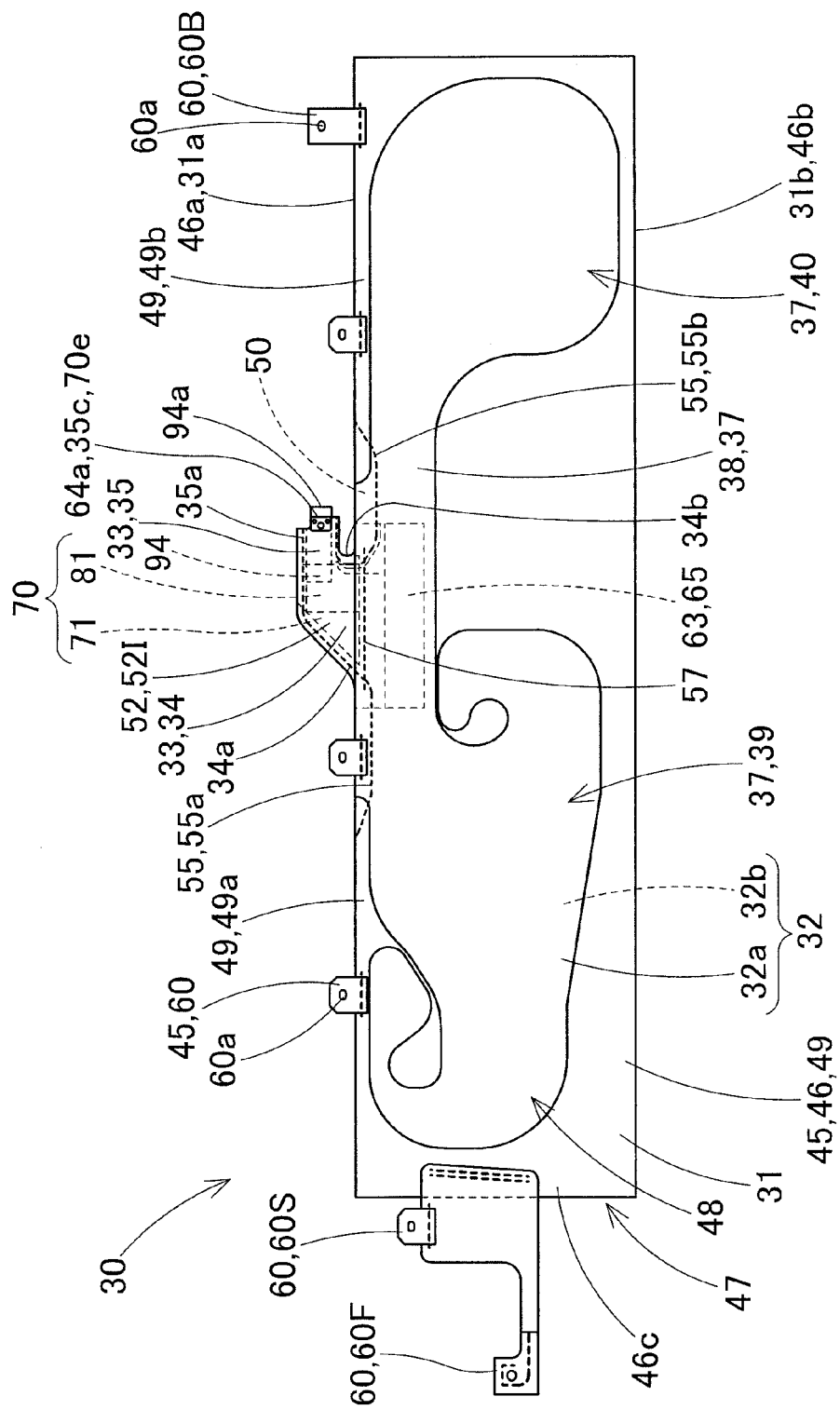
FIG. 5 is a front elevation of an airbag for use in the airbag device of FIG. 1.

As shown in FIGS. 1 and 5, the airbag 30 includes a bag body 31 inflatable to cover the windows W1 and W2, an inner tube 63 serving as a flexible redirecting sheet (or redirecting cloth) disposed inside the bag body 31, and a flexible reinforcing sheet (or reinforcing cloth) 70 for enhancing heat resistance.

The bag body 31 is inflatable with an inflation gas G fed from the inflator 20 and when unfolded and inflated covers inboard sides of the windows W1 and W2, the middle pillar CP and the rear pillar RP. As shown in FIGS. 2 to 5, the bag body 31 includes a gas admissive region 32 which is inflatable with the inflation gas G in such a manner as to separate an inboard side wall (or a front wall) 32a from an outboard side wall (or a back wall) 32b opposed to the inboard side wall 32a, and a non-admissive region 45 which admits no inflation gas G, at which the inboard side wall 32a and outboard side wall 32b are integrated.

The gas admissive region 32 includes a main inflatable portion 37 configured to cover inboard sides of the windows W1, W2, middle pillar CP and rear pillar RP, and a connection port 33 which is tubular in shape and connected with the inflator 20 for conducting the inflation gas G fed from the inflator 20 to the main inflatable portion 37.

The connection port 33 protrudes upward from a vicinity of the center in a front and rear direction of the main inflatable portion 37. The connection port 33 includes a root region 34 which extends from and generally perpendicularly to the main inflatable portion 37 and a tubular region 35 disposed at the upper end of the root region 34 for receiving the inflator 20. The tubular region 35 protrudes rearward generally perpendicularly to the root region 34 and includes an opening 35c at the rear end for receiving the inflator 20, thus the connection port 33 is formed into an L shape. The connection port 33 is mounted on the vehicle V in that bent shape.

The main inflatable portion 37 includes a front inflatable portion 39 deployable over the window W1, a rear inflatable portion 40 deployable over the window W2, and a tubular gas feed path 38 which is arranged along a front and rear direction along the upper edge 31a of the bag body 31. The gas feed path 38 is in gas communication with the connection port 33 at an intermediate region in a front and rear direction thereof and helps feed the inflation gas G to the front inflatable portion 39 and rear inflatable portion 40 with the aid of the inner tube 63.

Describing from the aspect of components, the bag body 31 includes a plurality of later-described mounting portions 60, base cloths 52 (FIGS. 3, 4, 6 and 13) for forming an inboard side wall 32a and an outboard side wall 32b of the connection port 33 and a one-piece woven portion 47 for forming the main inflatable portion 37. The one-piece woven portion 47 is formed by one-piece woven technology with yarns of polyamide, polyester or the like, and includes an inflatable main body 48 forming the gas admissive region 32 and a closed portion 49 disposed around the gas admissive region 32. Each of the base cloths 52 (52I and 52O) of the connection port 33, mounting portions 60, a later-described sheet material 90 for forming the reinforcing sheet 70, a later-described sheet material 68 for forming the inner tube 63 and a later-described guide cloth or guide sheet 94 is formed of a flexible sheet material such as a plain-weave fabric of polyamide.

The non-admissive region 45 includes a peripheral portion 46 and mounting portions 60. The peripheral portion 46 surrounds the gas admissive region 32. An upper edge region 46a of the peripheral portion 46, which is disposed at the upper edge 31a of the bag body 31, includes the closed portion 49 of the one-piece woven portion 47 and a sewn seam 55 which sews a plurality of materials including the base cloths 52 together.

At the upper edge 31a of the bag body 31, the closed portion 49 includes an upper front closed portion 49a, an upper rear closed portion 49b, and a split portion 50 disposed between the upper front closed portion 49a and upper rear closed portion 49b. As shown in FIGS. 3, 5 and 13 and as described later, extended regions 52c disposed at lower end regions of the base cloths 52 (52I and 52O) of the connection port 33 are sewn to the inboard side wall 32a and outboard side wall 32b of the main inflatable portion 37 at a peripheral edge of the split portion 50 with a sewn seam 57.

As shown in FIGS. 3 to 6 and 13, the base cloths 52I and 52O form the inboard side wall 32a and outboard side wall 32b of the connection port 33. Each of the base cloths 52I and 52O includes a root region 52a forming the root region 34 of the connection port 33, an insertion region 52b forming the tubular region 35 of the connection port 33, and an extended region 52c which is sewn to the main inflatable portion 37, in other words, to a vicinity of the split portion 50.

The inboard side wall 32a and outboard side wall 32b of the connection port 33 and the split portion 50 are further sewn together with a sewn seam 55 composed of a front edge seam 55a and a rear edge seam 55b. As shown in FIGS. 5 and 14, the front edge seam 55a starts in the upper front closed portion 49a and extends rearward along a front edge 34a of the root region 34 and an upper edge 35a of the tubular region 35 of the connection port 33 via the split portion 50 to sew the inboard side wall 32a and outboard side wall 32b together. The rear edge seam 55b starts in the upper rear closed portion 49b and extends forward along a rear edge 34b of the root region 34 and a lower edge 35b of the tubular region 35 of the connection port 33 via the split portion 50 to sew the inboard side wall 32a and outboard side wall 32b together.

In the illustrated embodiment, as described later, the front edge seam 55a sews the inner tube 63 and the reinforcing sheet 70 together with the inboard side wall 32a and outboard side wall 32b while the rear edge seam 55b sews the inner tube 63 and the reinforcing sheet 70 together with the inboard side wall 32a and outboard side wall 32b as well and overlaps with later-described sewn seams 75 and 85 of the reinforcing sheet 70.

As shown in FIG. 5, the mounting portions 60 are formed in plurality in such a manner as to protrude upward from the upper edge 46a of the peripheral portion 46 at the upper edge 31a of the bag body 31. The airbag 31 of the illustrated embodiment includes six such mounting portions 60. The mounting portion 60 are prepared separate from the one-piece woven portion 47 and sewn to the one-piece woven portion 47. Each of the mounting portions 60 is provided with an aperture 60a for receiving a mounting bolt 14. As described above, each of the mounting portions 60 is coupled with the mounting bracket 13 and secured to the inner panel 2 by the mounting bolt 14 inserted through the aperture 60a and screwed into a screw hole of the inner panel 2.

The mounting portion 60F, which is located at the foremost position, is formed of a cloth member of a woven fabric or polyamide or the like and sewn to the front edge 46a of the peripheral portion 46. The mounting portion 60F is adapted to be secured to a vicinity of the lower region of the front pillar FP so as to generate a strong tension force at airbag deployment at a lower edge 31b of the airbag 30, more specifically, on a line connecting the mounting portion 60F and a rearmost mounting portion 60 (60B) located away from the front pillar FP, such that the airbag 30 can securely arrest an occupant inside the vehicle V (FIG. 1).

The mounting portion 60S, which is located at the second from the front, is sewn to a base cloth of the mounting portion 60F.

As shown in FIGS. 2 to 5, the inner tube 63 serving as a redirecting sheet is disposed inside the connection port 33 of the bag body 31 in such a manner as to extend into the gas feed path 38 in a vicinity of the connection port 33. Thus the inner tube 63 includes a connection tube region 64 disposed inside the connection port 33 to be connected with the inflator 20 and an outlet region 65 which extends from the connection tube region 64 to the gas feed path 38 of the bag body 31 for releasing an inflation gas G in a furcate fashion. The connection tube region 64 is provided with an insertion opening 64a for receiving the inflator 20 at the rear end, and the outlet region 65 includes outlet ports 65a and 65b at the front and rear ends of the lower edge 63c region of the inner tube 63. The outlet ports 65a and 65b are opposed to each other in a front and rear direction.

Figure 6:
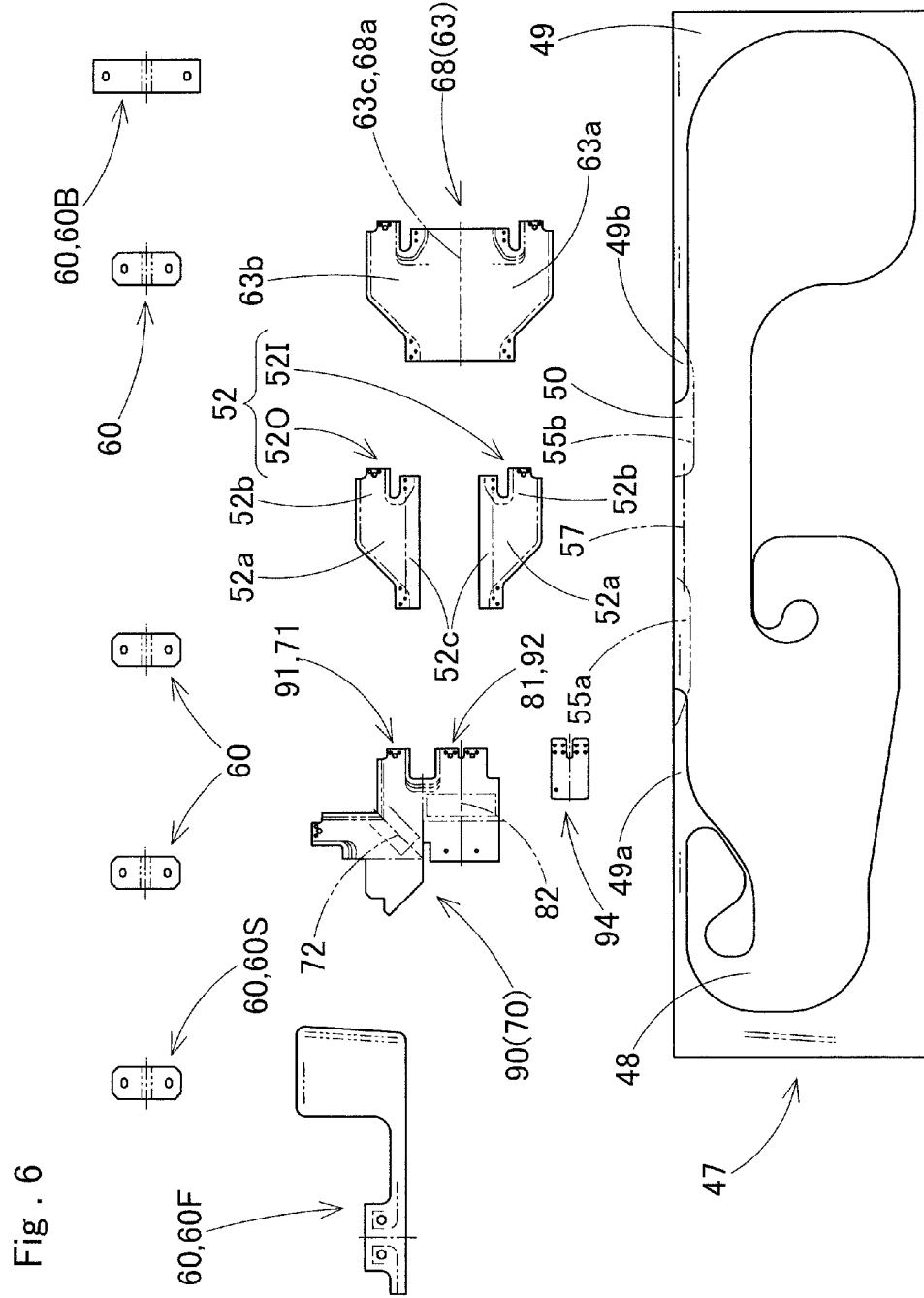
FIG. 6 depicts components of the airbag of FIG. 5 by front views.

As shown in FIGS. 6 and 12, the inner tube 63 is formed of a piece of sheet material 68 having flexibility. The sheet material 68 is formed of a woven fabric of polyamide or the like as described above. The sheet material 68 is folded in half at the center on a crease 68a extending in a front and rear direction and sewn up by overlapped peripheral edges except the insertion opening 64a and outlet ports 65a and 65b, thus formed into the inner tube 63. That is, the inner tube 63 has such a configuration that an inboard side region (front region) 63a and an outboard side region (back region) 63b extend upward from the crease 68a, and a sewn seam 66a, which sews the outer peripheral edges of the inboard side region 63a and outboard side region 63b except the insertion opening 64a and outlet ports 65a and 65b together, is disposed at the upper edge.

As shown in FIGS. 2 to 5, the reinforcing sheet 70 is disposed inside the inner tube 63 which is located inside the connection port 33. More specifically, the reinforcing sheet 70 is disposed at the connection tube region 64 and an upper region of the outlet region 65 inside the inner tube 63. In other words, the reinforcing sheet 70 is disposed in the connection tube region 64 and in a region of the outlet region 65 not reaching the gas feed path 38. The reinforcing sheet 70 covers a circumference of the leading end 20a region of the inflator 20 and a space in front of the inflator 20 in an axial direction ID of the inflator 20. The reinforcing sheet 70 includes a first cover region 71 and a second cover region 81.

As shown in FIG. 2, the first cover region 71 has a double-folded configuration that is doubled at the front edge 70a of the reinforcing sheet 70 (in other words, at its region distant from the leading end 20a of the inflator 20 in an axial direction ID of the inflator 20 or, at its region opposed to the leading end 20a of the inflator 20 in the axial direction ID of the inflator 20) on a crossing crease 72 which crosses the axial direction ID of the inflator 20, and wraps the circumference of the leading end 20a region of the inflator 20 with an inboard side region (front region) 73 and an outboard side region (back region) 74 disposed on both sides of the crossing crease 72, especially with the regions away from the crossing crease 72. The first cover region 71 includes a tubular wrap region 71a wrapped around an outer circumference 21b of a vicinity of the leading end of the inflator body 21 and a gas path region 71b which ranges from the tubular wrap region 71a to the crossing crease 72 and covers a circumference of gas releasing portion 22 of the inflator 20.

The second cover region 81 has a double-folded configuration that is doubled at the upper edge 70b of the reinforcing sheet 70 (in other words, at an edge facing away from the main inflatable portion 37 of the bag body 31) on an axial-direction crease 82 which extends in parallel to the axial direction ID of the inflator 20, and wraps the circumference of the leading end 20a region of the inflator 20 with an inboard side region (front region) 83 and an outboard side region (back region) 84 disposed on both sides of the axial-direction crease 82. The second cover region 81 includes a tubular wrap region 81a wrapped around the outer circumference 21b of a vicinity of the leading end of the inflator body 21 and a gas path region 81b which ranges from the tubular wrap region 81a to the front edge 70a of the reinforcing sheet 70 and covers the circumference of gas releasing portion 22 of the inflator 20.

The reinforcing sheet 70 has a double-wall construction of the first cover region 71 and second cover region 81, and therein the crossing crease 72 continues to the axial-direction crease 82 at a region distant from the gas releasing portion 22 of the inflator 20. In the illustrated embodiment, the second cover region 81 is disposed inside the first cover region 71. Each of the first cover region 71 and second cover region 81 has an opening 71c/81c at the lower end, facing toward the outlet region 65 of the inner tube 63.

In the illustrated embodiment, the reinforcing sheet 70 is provided for enhancing the heat resistance of the connection port 33 and the inner tube (redirecting sheet) 63 against an inflation gas G emitted from the gas releasing portion 22 of the inflator 20. The reinforcing sheet 70 of the illustrated embodiment covers the sewn seam 66a of the inner tube 63, which is disposed at the upper front edge of the inner tube 63, by its region where the crossing crease 72 of the first cover region 71 and the axial-direction crease 82 of the second cover region 81 are continuous, and prevents the seam 66a from being hit directly by the inflation gas G, as shown in FIGS. 4 and 12C.

Figure 11:
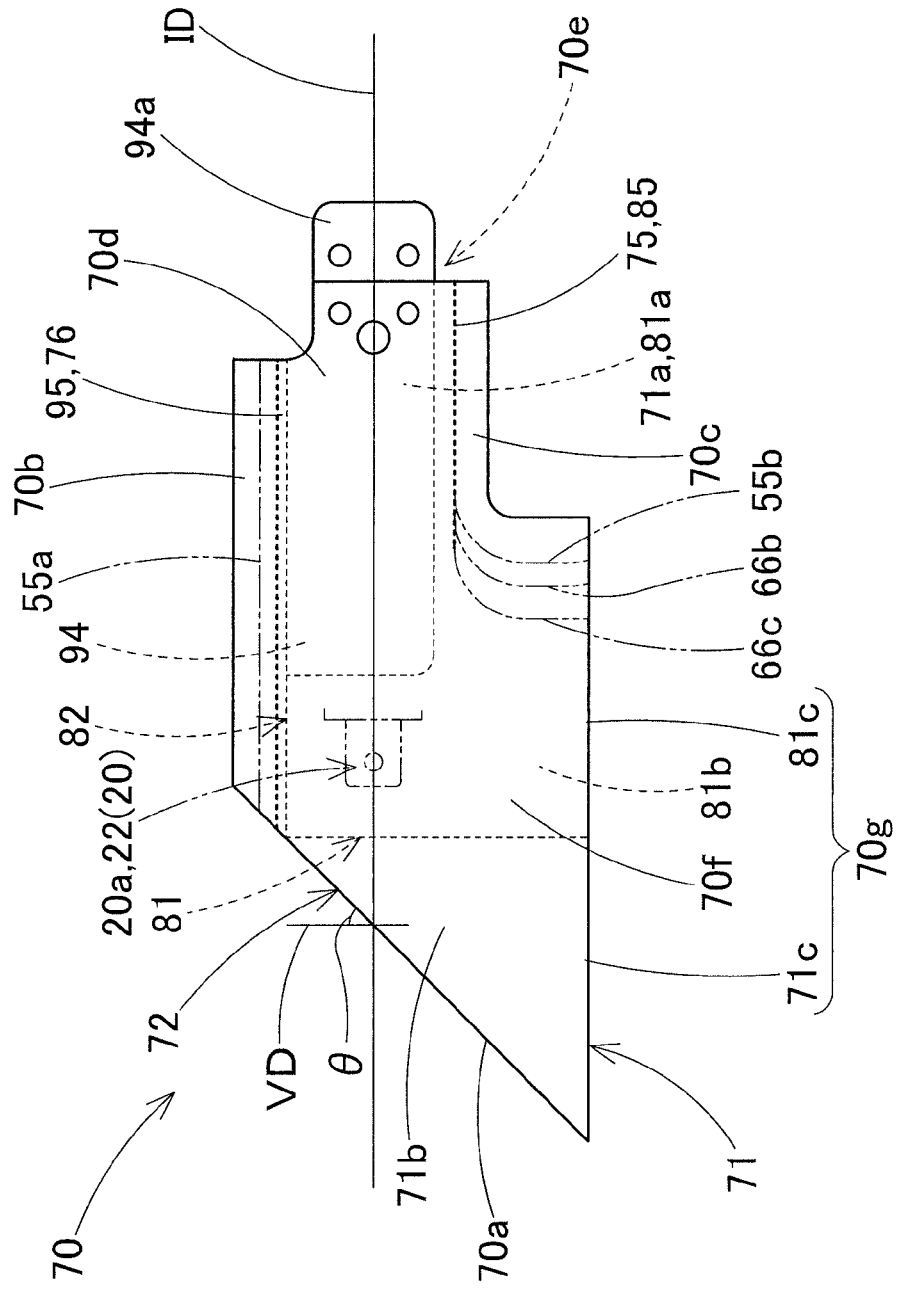
FIG. 11 is a front elevation of the completed reinforcing sheet.

In the illustrated embodiment, as shown in FIG. 11, the crossing crease 72 of the first cover region 71 is inclined from a direction VD perpendicular to the axial direction of the inflator 20 at such an inclination angle θ (about 45°, in the illustrated embodiment) as to enlarge toward the opening 71c.

Further, the first cover region 71 includes a reinforced region 77 at an inner side of the gas path region 71b encompassing the crossing crease 72 while the second cover region 81 includes a reinforced region 86 at an outer side of the gas path region 81b encompassing the axial-direction crease 82, for further enhancing heat resistance, as described later.

Figure 7:
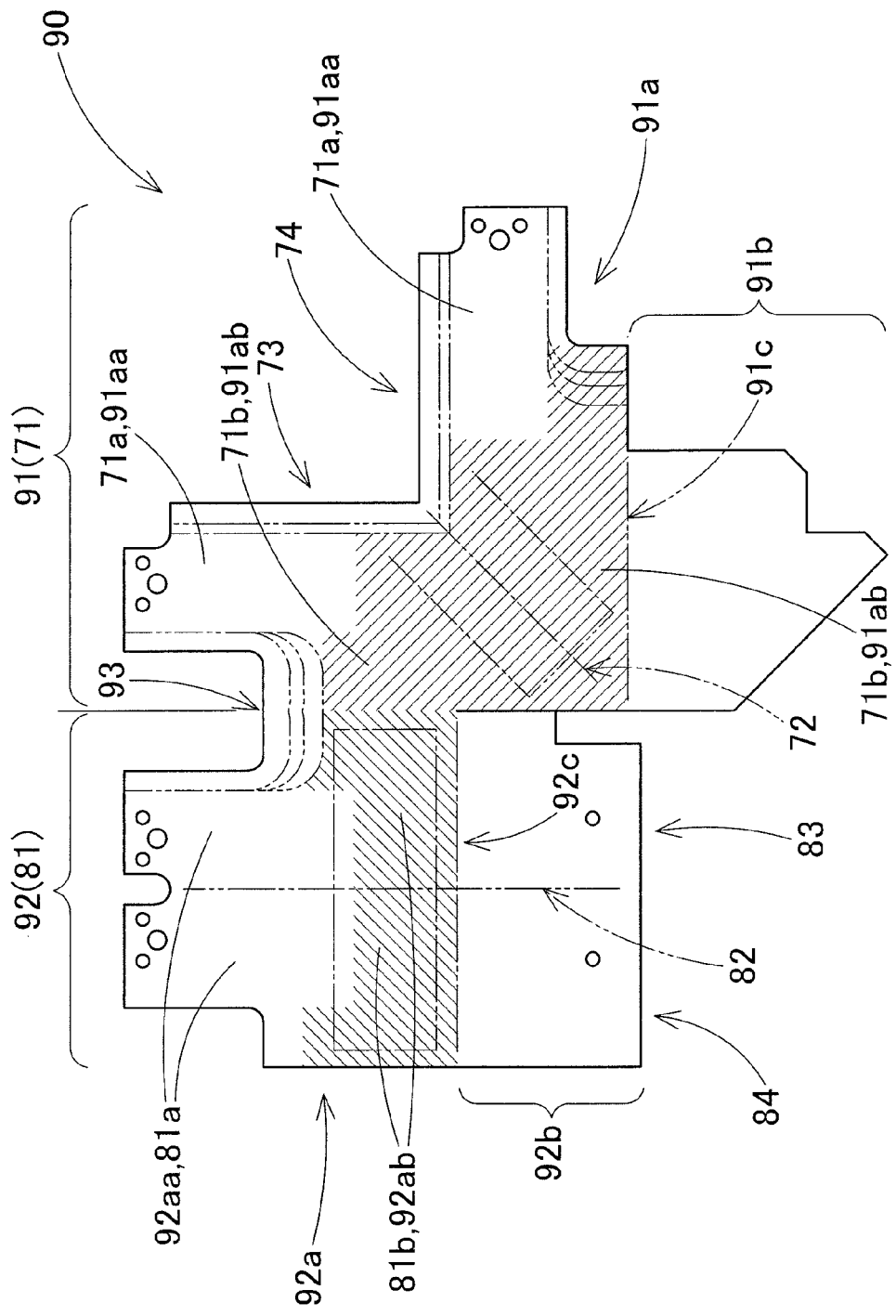
FIG. 7 is a front elevation of a sheet material for forming a reinforcing sheet for use in the airbag of FIG. 5.

As shown in FIGS. 6 and 7, the first cover region 71 and second cover region 81 of the illustrated embodiment are composed of a single piece of sheet material 90 of a woven fabric of polyamide or the like as described above. The sheet material 90 includes a first constituent region 91 for forming the first cover region 71, a second constituent region 92 for forming the second cover region 81 and a joint region 93 joining the first constituent region 91 and the second constituent region 92 in a seamless fashion.

The first constituent region 91 includes a main region 91a and a reinforcing region 91b. The main region 91a has such a configuration that the inboard side region 73 and outboard side region 74 each extend from the crossing crease 72. Generally trapezoidal regions of the inboard side region 73 and outboard side region 74 adjoining the crossing crease 72 serve as path constituents 91ab (shaded regions in FIG. 7) for forming the gas path region 71b when mated. Generally rectangular regions of each of the inboard side region 73 and outboard side region 74 adjoining the path constituents 91ab serve as tube constituents 91as for forming the tubular wrap region 71a when mated. The reinforcing region 91b is formed in such a manner as to be extended from an edge of the path constituent 91ab of the outboard side region 74, and is folded back over the main region 91a on a crease 91c formed on that edge. In the illustrated embodiment, the main region 91a and reinforcing region 91b folded over the main region 91a are sewn together with a seam 91d in the shape of C (FIG. 9B) for preventing displacement.

The second constituent region 92 includes a main region 92a and a reinforcing region 92b. The main region 92a has such a configuration that the inboard side region 83 and outboard side region 84 each extend from the axial-direction crease 82. Generally rectangular regions of the inboard side region 83 and outboard side region 84 disposed on both sides of the crease 82 and having a greater width serve as path constituents 92ab (shaded regions in FIG. 7) for forming the gas path region 81b when mated. Generally rectangular regions of the inboard side region 83 and outboard side region 84 disposed above the path constituents 92ab on both sides of the crease 82 and having a smaller width serve as tube constituents 92aa for forming the tubular wrap region 81a when mated. The reinforcing region 92b is formed in such a manner as to be extended from edges of the path constituents 92ab of the inboard side region 83 and outboard side region 84 facing away from the tube constituents 92aa, and is folded back over the main region 92a on a crease 92c formed on those edges. In the illustrated embodiment, the main region 92a and reinforcing region 92b folded over the main region 92a are sewn together with a generally rectangular seam 92d (FIG. 9A) for preventing displacement.

The reinforcing sheet 70 of the illustrated embodiment further includes a guide cloth 94 for facilitating the insertion of the inflator 20 into the insertion opening 70e. The seam 92d which sews the main region 92a and reinforcing region 92b together concurrently sews the guide cloth 94 to the main region 92a of the second constituent region 92. The guide cloth 94 is generally rectangular in shape and is doubled on a crease coincident with the axial-direction crease 82 and is formed into a generally tube. The guide cloth 94 is slidable with the outer circumference 21b of the leading end region of the inflator body 21, thus facilitating the insertion of the inflator 20. The guide cloth 94 includes a tab 94a protruding out of the insertion opening 70e to be gripped with fingers. By gripping the tab 94a, the insertion of the inflator 20 into the insertion opening 70e will be further facilitated.

Figure 8A:
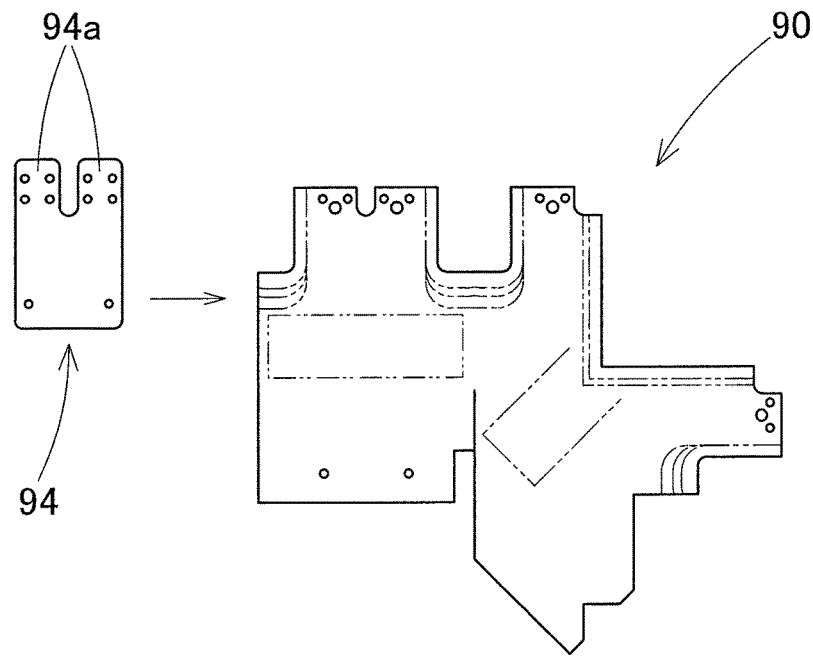
FIGS. 8A, 8B, 9A, 9B, 10A, 10B and 10C illustrate the production process of the reinforcing sheet in order.
Figure 8B:
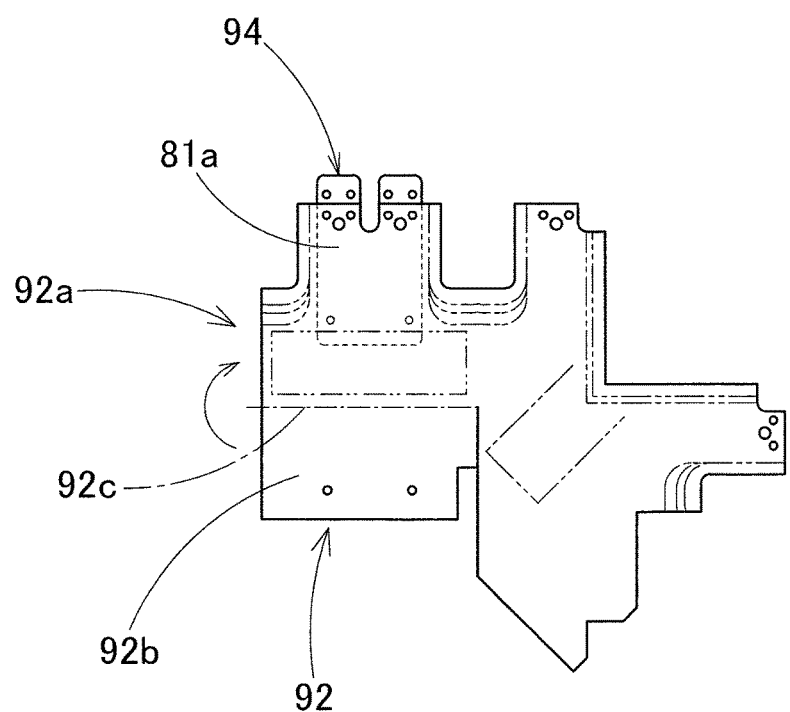
Figure 9A:
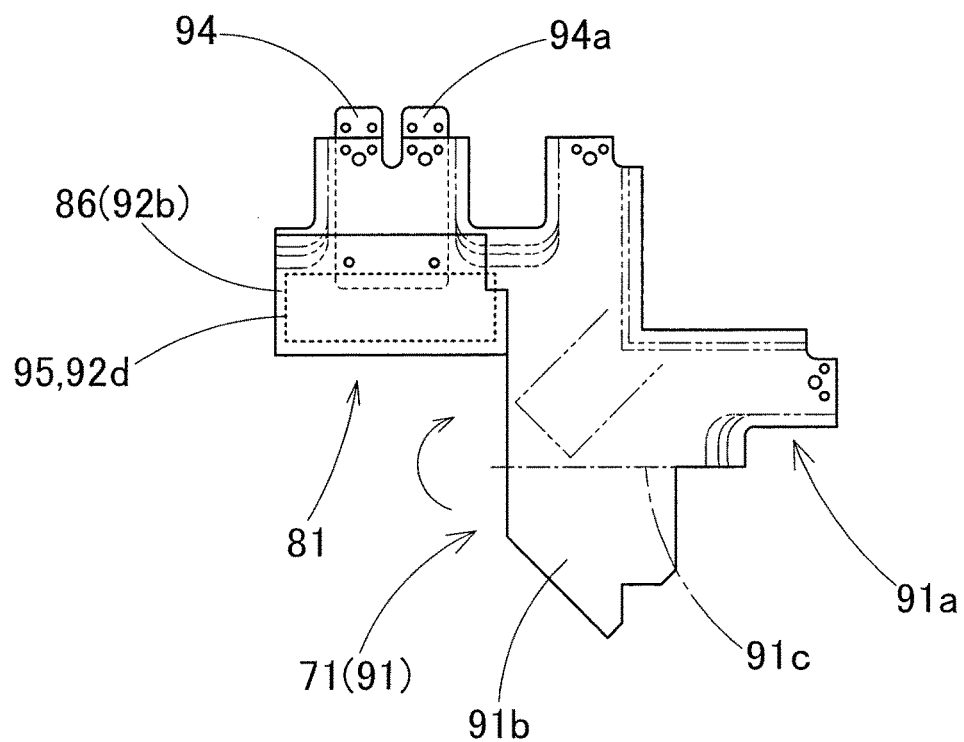

The production process of the reinforcing sheet 70 is now described. Firstly, as shown in FIGS. 8A and 8B, the guide cloth 94 is disposed at a predetermined location on the inner side of the main region 92a of the second constituent region 92. Then the reinforcing region 92b is folded back on the crease 92c towards the opposite side from the side where the guide cloth 94 is disposed, i.e., on the outer side, of the main region 92a, and is sewn to the main region 92a together with the guide cloth 94 with the seam 92d of sewing threads 95 of polyamide or the like, as shown in FIGS. 8B and 9A, thus forming the reinforced region 86. Subsequently, as shown in FIGS. 9A and 9B, the reinforcing region 91b of the first constituent region 91B is folded back on the crease 91c on the inner side of the main region 91a, and is sewn to the main region 91a with the seam 91d, thus forming the reinforced region 77.

Figure 9B:
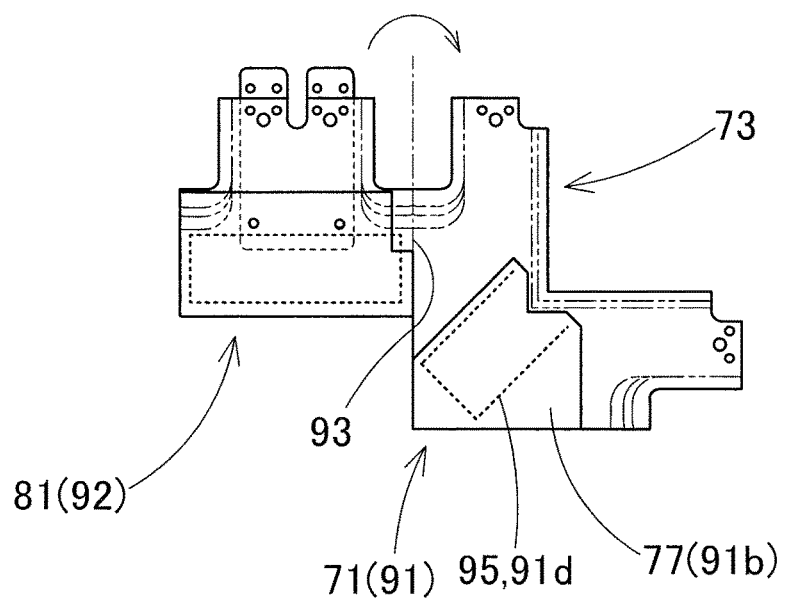
Figure 10A:
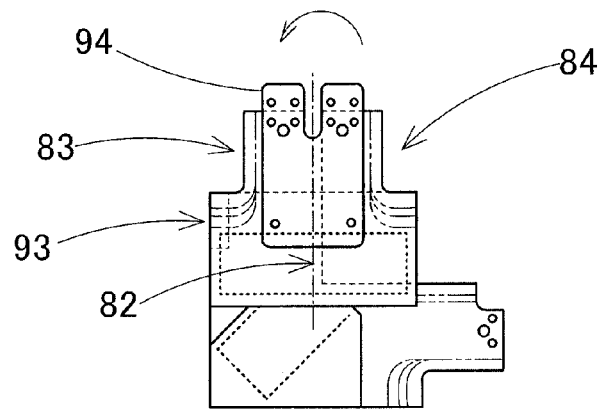

Thereafter, as shown in FIGS. 9B and 10A, the second constituent region 92 is folded over the inboard side region 73 of the first constituent region 91, which side will be the inner side of the first cover region 71, by forming a crease on the joint region 93. Then as shown in FIGS. 10A and 10B, the second constituent region 92 is doubled on the axial-direction crease 82 together with the guide cloth 94, thus forming the outer contour of the second cover region 81.

Figure 10B:
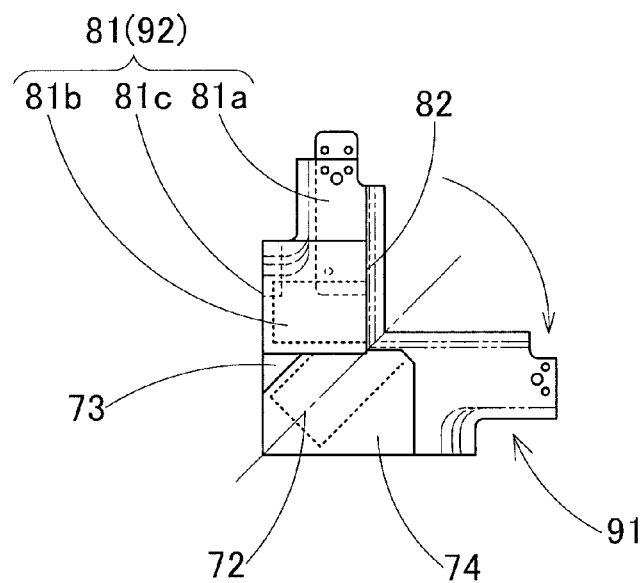
Figure 10C:
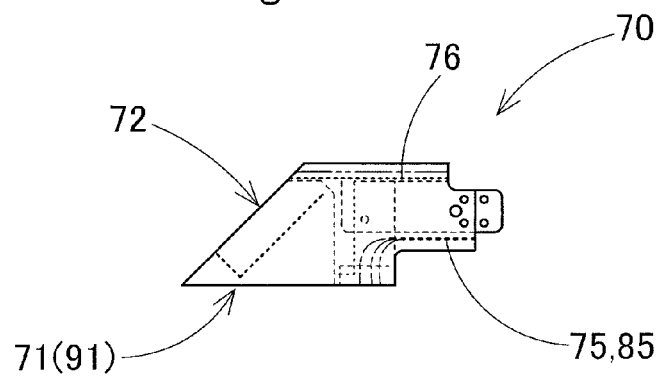

Subsequently, as shown in FIGS. 10B and 10C, the inboard side region 73 of the first constituent region 91, on which the second cover region 81 is disposed, is folded over the outboard side region 74 on the crossing crease 72. Thus the outer contour of the first cover region 71 is formed, and the reinforcing sheet 70 is completed.

In the illustrated embodiment, as shown in FIGS. 100 and 11, seams 75, 76 and 85 are formed with sewing threads 95 in order to prevent displacement between the first cover region 71 and second cover region 81 and between the inboard side region 73 and outboard side region 74 of the first cover region 71.

The seam 75 sews the inboard side region 73 and outboard side region 74 of the first cover region 71 together along the lower edge of a later-described tubular region 70d of the reinforcing sheet 70 for receiving the leading end 20a region of the inflator. The seam 76 sews together outer peripheral edges of the inboard side region 73 and outboard side region 74 of the first cover region 71 extending rearward from the crossing crease 72 along the upper edge 70b of the reinforcing sheet 70. The seam 85 sews the inboard side region 83 and outboard side region 84 of the second cover region 81 together along the lower edge of the tubular region 70d.

Although different reference numerals are given, the seam 75 is the same as the seam 85, both of which sew the inboard side region 73 and outboard side region 74 of the first cover region 71 and the inboard side region 83 and outboard side region 84 of the second cover region 81 all together.

Referring to FIG. 11, the reinforcing sheet 70 formed as described above includes a tubular region 70d which is provided with the insertion opening 70e at the rear end and accommodates the leading end 20a region of the inflator 20, and an open region 70f provided with an emission opening 70g for allowing an outflow of inflation gas G. The emission opening 70g is disposed at the lower edge 70c in the front end region of the reinforcing sheet 70. The open region 70f receives the inflation gas G emitted from the gas releasing portion 22 of the inflator 20 and releases it from the emission opening 70g, i.e., from the openings 71c and 81c of the first cover region 71 and second cover region 81. In the illustrated embodiment, the open region 70f is composed of the gas paths 71b and 81b of the first cover region 71 and second cover region 81.

Figure 12A:
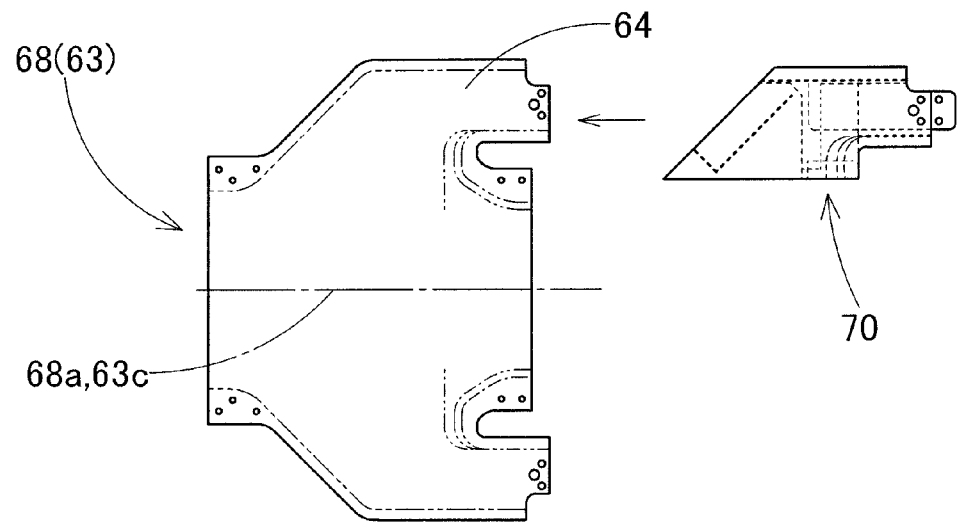
FIGS. 12A, 12B and 12C illustrate the production process of an inner tube for use in the airbag of FIG. 5.
Figure 12B:
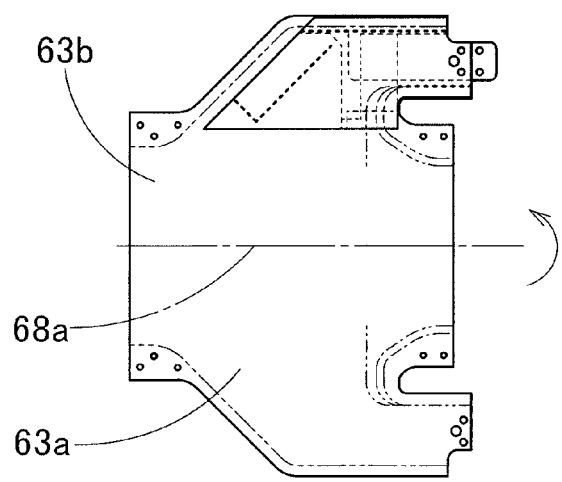
Figure 12C:
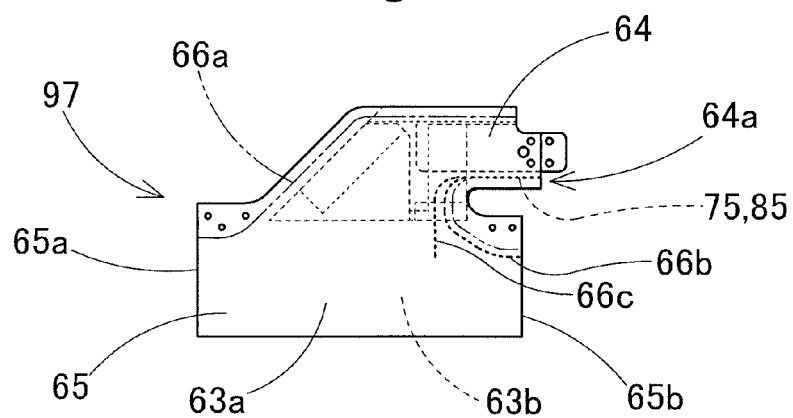

As shown in FIG. 12A, the completed reinforcing sheet 70 is placed on the sheet material 68 for forming the inner tube 63. Then as shown in FIGS. 12B and 12C, the sheet material 68 is folded on the crease 68a such that the inboard side region 63a and outboard side region 63b overlap each other, and the inboard and outboard side regions 63a and 63b are sewn together at predetermined regions of the outer peripheral edges with a sewing thread 95, except the insertion opening 64a and outlet ports 65a and 65b, thereby forming a sewn seam 66b and a sewn seam 66c. In the illustrated embodiment, the seam 66b is formed at the outer peripheral edge at the rear edge between the insertion opening 64a and outlet port 65b, and the seam 66c sews the inboard and outboard side regions 63a and 63b together in a L shape in such a manner as to branch off from the seam 66b.

The seams 66b and 66c partially sew the reinforcing sheet 70 together with the inboard side region 63a and outboard side region 63b of the inner tube 63. That is, the reinforcing sheet 70 is joined with the inner tube 63 at the same time as the outer contour of the inner tube 63 is formed. Thus, a reinforcing sheet assembly 97, in other words, the inner tube 63 equipped with the reinforcing sheet 70, is formed.

In the illustrated embodiment, the upper front edge 66a of the inner tube 63 (i.e., a region of the outer peripheral edge between the front outlet port 65a and insertion opening 64a) is sewn up when the front edge seam 55a of the connection port 33 is formed. Alternatively, however, the upper front edge 66a may be sewn up when the inner tube 63 is formed.

Figure 13A:
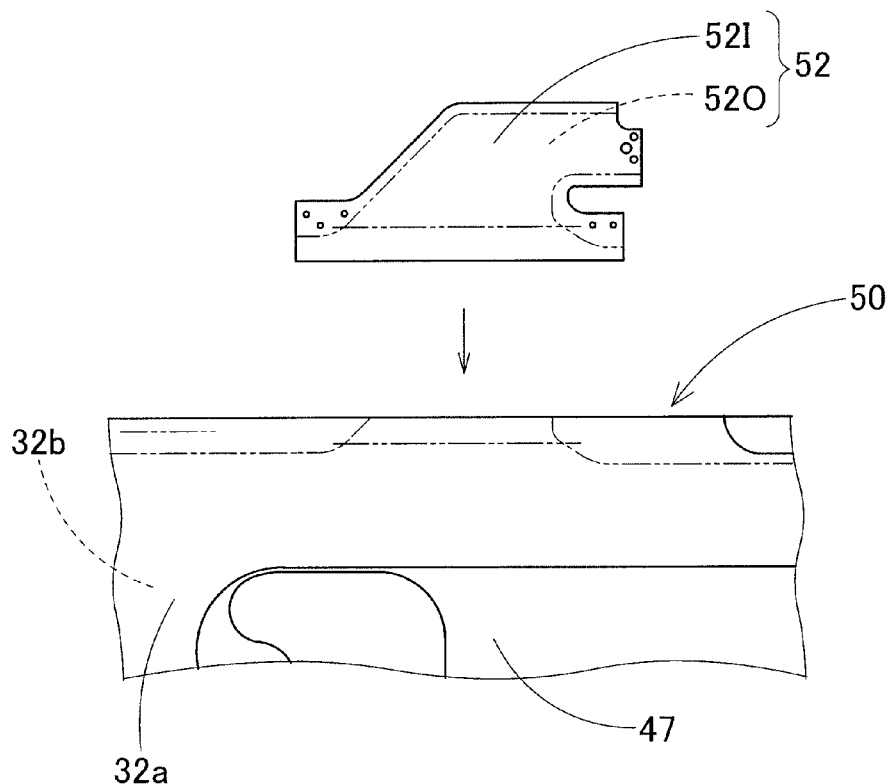
FIGS. 13A, 13B, 14A and 14B illustrate the production process of the airbag of FIG. 5.
Figure 13B:
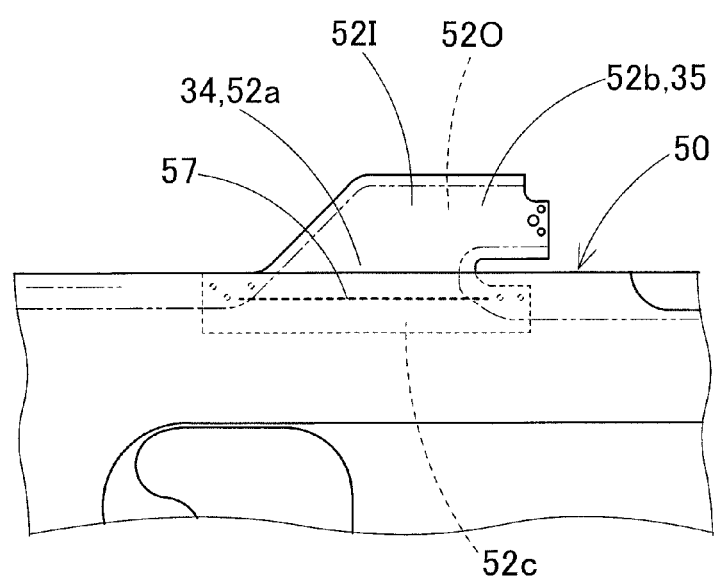
Figure 14A:
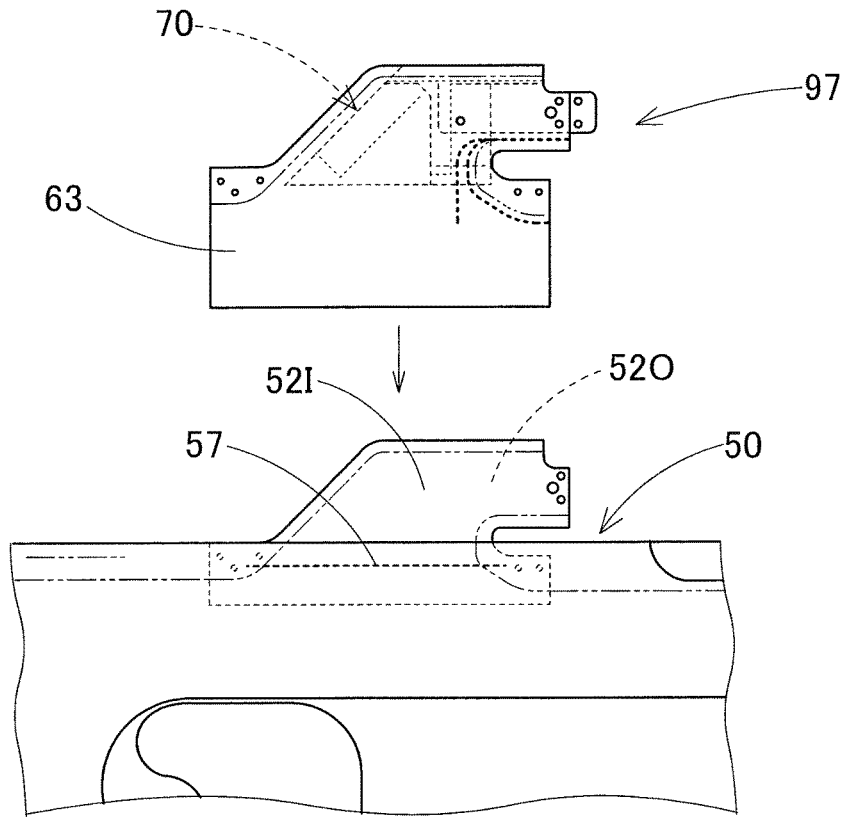
Figure 14B:
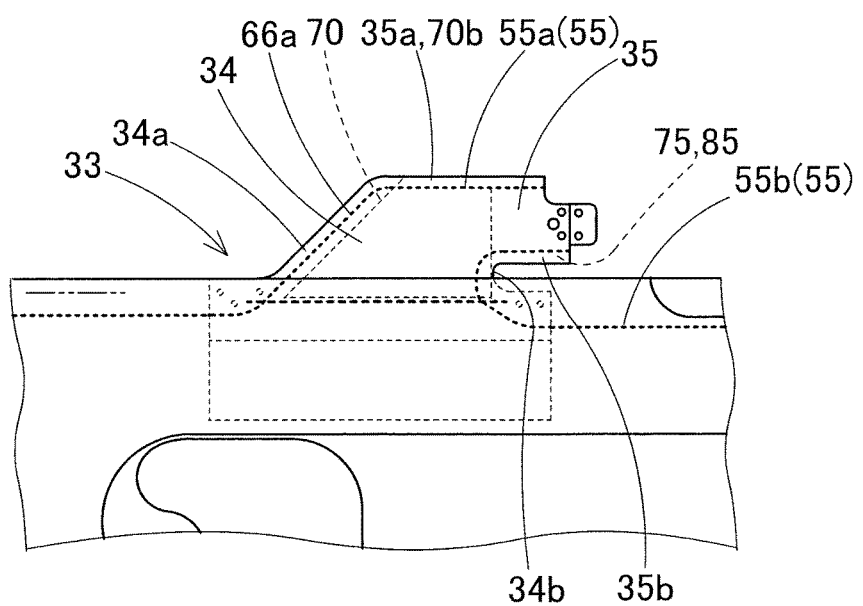

The reinforcing sheet assembly 97 is then assembled with the bag body 31. By this time, on the part of the bag body 31, as shown in FIGS. 13A and 13B, the base cloths 52I and 52O of the connection port 33 have been sewn to the inboard side wall 32a and outboard side wall 32b of the split portion 50 of the one-piece woven portion 47 with the seams 57 of the sewing threads 95 in advance. Then as shown in FIGS. 14A and 14B, the reinforcing sheet assembly 97 is placed between the base cloths 52I and 52O, and the base cloths 52I and 52O, the reinforcing sheet 70 and inner tube 63 are sewn together with the front edge seam 55a and the rear edge seam 55b using the sewing threads 95, thereby the connection port 33 is completed as well as the reinforcing sheet assembly 97 is fixed to the connection port 33. Specifically, the front edge seam 55a sews together the base cloths 52I and 52O, the upper front edge 66a of the inner tube 63 and the upper edge 70b of the reinforcing sheet 70 above and at a distance from the axial direction cease 82 (see FIG. 11). The rear edge seam 55b sews the base cloths 52I and 52O, the reinforcing sheet 70 and inner tube 63 together at the lower edge of the tubular region 35, and overlaps with the seams 75 and 85 of the reinforcing sheet 70. If the mounting portions 60 are then sewn to predetermined positions of the bag body 31, the airbag 30 is completed.

Thereafter, the airbag 30 is folded up in such a fashion as to bring the lower edge 31b close to the upper edge 31a, and is bound with a breakable tape for keeping a folded-up configuration. The mounting brackets 13 are attached to the mounting portions 60. Then the leading end 20a region of the inflator 20 is inserted into the insertion opening 70e (i.e., the opening 35c of the tubular region 35 of the connection port 33) of the tubular region 70d of the reinforcing sheet 70 disposed inside the connection tube region 64 of the inner tube 63, thus inserted in the tubular region 35 of the connection port 33. Subsequently, the clamp 28 is mounted around the outer circumference of the tubular region 35 of the connection port 33 to joint the inflator 20 with the tubular region 35. Thus an airbag module 99 is completed.

Thereafter, the mounting portions 60 with the mounting brackets 13 are disposed at predetermined mounting positions on the inner panel 2 of the vehicle body structure 1, and bolt 14 fastened thereat. Further, the inflator 20 is secured to the inner panel 2 by fixing the mounting bracket 24 with the bolts 26, thus the airbag module 99 is mounted on the vehicle body structure 1. Then the inflator 20 is connected with a not-shown lead wire extending from a suitable control for actuating the inflator. If then the front pillar garnish 4, the roof head liner 5, a middle pillar garnish 7 and a rear pillar garnish 8 are attached to the vehicle body structure 1, the head-protecting airbag device S is mounted on the vehicle V.

When the head-protecting airbag device S mounted on the vehicle V is actuated, the inflator 20 discharges an inflation gas G via the gas discharge ports 22a and the gas G flows into the main inflatable region 37 of the airbag 30 via the connection port 33. More specifically, as shown in FIGS. 2 to 4, after exiting the gas discharge ports 22a, the gas G flows towards the open region 70f of the reinforcing sheet 70, and heads towards an area above the outlet region 65 of the inner tube 63 via the emission opening 70g of the open region 70f, and reaches the lower edge 63c of the inner tube 63. Then the gas G bifurcates to the front and rear, flows out of the outlet ports 65a and 65b of the outlet region 65 and flows through the gas feed path 38 of the main inflatable region 37 of the bag body 31, and reaches the front inflatable portion 39 and rear inflatable portion 40 of the main inflatable region 37, such that the inflated airbag 30 pushes and opens the airbag cover 11 and is deployed over the windows W1, W2, the middle pillar CP and the rear pillar RP, as indicated by double-dotted lines in FIG. 1.

With the head-protecting airbag device S of the foregoing embodiment, an inflation gas G discharged from the leading end 20a region of the inflator 20 flows through the tubular region 35 and turns towards the root region 34 inside the connection port 33 of the bag body 31, before flowing into the main inflatable region 37, as shown in FIGS. 2 to 4. At this time, inside the reinforcing sheet 70, before turning towards the outlet region 65 of the inner tube 63 via the openings 71c and 81c, the gas G hits the crossing crease 72 of the first cover region 71 (i.e., the front edge 70a) of the reinforcing sheet 70. Since the crossing crease 72 is a crease on which the inboard side region (front region) 73 and outboard side region (back region) 74 of the first cover region 71 are doubled and thus continuous, it has an improved heat resistance in comparison with a conventional reinforcing sheet (a reinforcing cloth formed of a plain-weave fabric) in which the corresponding region is sewn up with a seam by stitching. Moreover, although the gas G discharged out of the gas discharge ports 22a also hits the distant edge (upper edge) 70b of the reinforcing sheet 70 facing away from the openings 71c and 81c, the axial-direction crease 82 is disposed at the distant edge 70b as shown in FIGS. 2 and 3, and the axial-direction crease 82 is also is a crease on which the inboard side region (front region) 83 and outboard side region (back region) 84 of the second cover region 81 are doubled and thus continuous, not a sewn seam. Accordingly, the region has an improved heat resistance in comparison with an instance where the inboard side region (front region) 83 and outboard side region (back region) 84 would be sewn up with a seam. Since the reinforcing sheet 70 can be formed simply by arranging the first cover region 71 and second cover region 81 in an overlapped fashion such that the crossing crease 72 continues to the axial-direction crease 82, the reinforcing sheet 70 having an enhanced heat resistance can be provided in a simple fashion.

Therefore, with the airbag device S of the foregoing embodiment, the heat resistance of the reinforcing sheet 70 disposed inside the connection port 33 of the airbag 30 can be improved in a simple fashion.

It will be appreciated that the reinforcing sheet 70 of the foregoing embodiment improves the heat resistance of the inner tube 63 by preventing an inflation gas G discharged from the gas releasing portion 22 of the inflator 20 from directly hitting the seam 66a disposed at the upper front edges of the connection tube region 64 and outlet region 65 of the inner tube 63 with its region where the crossing crease 72 of the first cover region 71 and the axial-direction crease 82 of the second cover region 81 are continuous.

In the illustrated embodiment, the airbag 30 includes the inner tube (redirecting sheet) 63 which has flexibility and is disposed inside the connection port 33 and a region of the main inflatable portion 37 adjoining the connection port 33, and the reinforcing sheet 70 is located inside the inner tube 63. The inner tube 63 includes the connection tube region 64 and the outlet region 65. The connection tube region 64 is disposed inside the connection port 33 to receive the leading end 20a region of the inflator 20 and be connected with the inflator 20 through the medium of the reinforcing sheet 70. The outlet region 65 extends from the connection tube region 64 into the main inflatable portion 37 and includes, at the lower edge 63c, at least two outlet ports 65a and 65b for releasing the inflation gas G towards the front and rear in a furcate fashion.

With this configuration, the inner tube (redirecting sheet) 63 will admit an inflation gas G at the connection tube region 64, forward the gas G to the outlet region 65 and redirect and feed the gas G smoothly to the front inflatable portion 39 and rear inflatable portion 40 of the main inflatable portion 37 via the outlet ports 65a and 65b facing toward the front and rear, since the reinforcing sheet 70 enhances the heat resistance of the inner tube 63.

In the airbag device S of the foregoing embodiment, the inner tube (redirecting sheet) 63 is composed of a piece of flexible sheet material 68, and the sheet material 68 is formed into the inner tube 63 by being folded in half on the crease 68a disposed in the outlet region 65 and sewn up by the overlapped outer peripheral edges.

With this configuration, before the inflation gas G flows out of the outlet ports 65a and 65b of the inner tube 63, the gas G having passed through the openings 71c and 81c of the reinforcing sheet 70 hits the crease 68a disposed in the outlet region 65. Since the crease 68a is a region where the inboard side region (front region) 63a and outboard side region (back region) 63b of the inner tube 63 are continuous and is not such a sewn-up region that the inboard side region 63a and outboard side region 63b are sewn together, the region around the crease 68a has a high heat resistance. Therefore, the inner tube 63 with the above configuration has a high heat resistance with a simple configuration.

If such an advantageous effect does not have to be considered, the inner tube may be composed of such a sheet material that is folded in half at the upper front edge 66a of the inner tube 63 and sewn up at the lower edge 63c and the rear edge where the seam 66b is located, see FIG. 12C.

In the airbag device S of the foregoing embodiment, the second cover region 81 of the reinforcing sheet 70 is located on an inner side of the first cover region 71.

That is, the second cover region 81 provided with the axial-direction crease 82 is located more proximate to the inflator 20 than the first cover region 71. With this configuration, the inflation gas G discharged from the leading end 20a region of the inflator 20 firstly hits the axial-direction crease 82 of the second cover region 81. Then the gas G is redirected by the crossing crease 72 of the first cover region 71 towards the main inflatable portion 37 inside the connection port 33. That is, the inflation gas G flows smoothly from the tubular region 35 to the root region 34 inside the connection port 33. Accordingly, the reinforcing sheet 70 will exert its heat resistance performance in a further adequate fashion at an upper reach of the inflation gas G.

If such an advantageous effect does not have to be considered, the first cover region 71 may be located on an inner side of the second cover region 81. By way of example, if the second cover region 81 is enlarged in a front and rear direction enough to cover the first cover region 71 and arranged against the first cover region 71 such that the upper end of the crossing crease 72 falls on a position slightly at the rear of the front end of the axial-direction crease 82, the crossing crease 72 will be continuous with the axial-direction crease 82.

In the airbag device S of the foregoing embodiment, moreover, the crossing crease 72 of the first cover region 71 of the reinforcing sheet 70 is inclined from the direction VD perpendicular to the axial direction of the inflator 20 at such an angle θ (about 45°, in the illustrated embodiment) as to enlarge toward the opening 71c, as shown in FIG. 11.

Due to the inclination angle θ, the inflation gas G discharged from the gas discharge ports 22a of the inflator 20 will hit the crossing crease 72 and then be smoothly redirected towards the opening 71c and further towards the outlet region 65 of the inner tube (redirecting sheet) 63 and main inflatable portion 37 via the openings 71c and 81c of the reinforcing sheet 70. That is, the inclination angle θ will help prevent a pressure increase in a vicinity of the crossing crease 72.

Without considering such an advantageous effect, the crossing crease 72 may be formed perpendicularly to the axial direction ID of the inflator 20, with no inclination angle θ.

The inclination angle θ should not be limited to 45° of the foregoing embodiment. The inclination angle θ is preferably in a range from 15° to 75°, and more desirably in a range from 30° to 60°, in the light of the size of a space occupied by the crossing crease 72 as well as smooth redirecting performance of the crossing crease 72. Alternatively, however, the inclination angle θ may be less than 15° on condition that the strength of the reinforcing sheet 70 is secured. Specifically, with a smaller inclination angle θ, the length in a front and rear direction of the crossing crease 72 will be reduced, which will contribute to reduce the size of the reinforcing sheet 70. Even if the inclination angle θ is in a range from 0° to 5°, by way of example, it will work as the reinforcing sheet 70 of the embodiment with high strength.

Furthermore, in the airbag device S of the foregoing embodiment, the first cover region 71 of the reinforcing sheet 70 is sewn up with the seam 76 by the distant edge 70b that is disposed on a part facing away from the main inflatable portion 37 and extends in such a fashion as to continue from the crossing crease 72.

Since the distant edge 70b, which is disposed away from the opening 71c of the first cover region 71, is sewn up, when the first cover region 71 is set inside the inner tube 63 (i.e., inside the connection port 33), the inboard side region (front region) 73 and outboard side region (back region) 74 will be prevented from slipping from each other, thereby facilitating the setting of the first cover region 71 at a predetermined location inside the inner tube 63 (the connection port 33).

However, the seam 76 is optional because the first cover region 71 is fastened with the outer circumference 21b of the leading end region of the inflator 20 together with the inner tube 63 by the clamp 28 and eventually fixed to the inner tube 63 or connection port 33. Further, in the foregoing embodiment, the first cover region 71 and inner tube 63 are sewn together with the front edge seam 55a and rear edge seam 55b for forming the connection port 33 as well. Accordingly, the seam 76 may be omitted.

In the airbag device S of the foregoing embodiment, moreover, the second cover region 81 of the reinforcing sheet 70 is sewn up with the seam 85 by the lower edge 70c that is disposed on a part facing away from the axial-direction crease 82 and adjoins the opening 81c and insertion opening 70e for receiving the inflator 20.

When the second cover region 81 is set inside the inner tube 63 (i.e., inside the connection port 33), this configuration will prevent the inboard side region 83 and outboard side region 84 from slipping from each other and facilitate the setting of the second cover region 81 at a predetermined location inside the inner tube 63 (the connection port 33).

However, the seam 85 is optional because the second cover region 81 is also fastened with the outer circumference 21b of the leading end region of the inflator 20 together with the inner tube 63 by the clamp 28 and eventually fixed to the inner tube 63 or connection port 33. Further, in the foregoing embodiment, the second cover region 81 and inner tube 63 are sewn together with the rear edge seam 55b for forming the connection port 33 as well. Accordingly, the seam 85 may be omitted.

In the reinforcing sheet 70 of the airbag device S, moreover, the first cover region 71 and second cover region 81 are sewn together with the seams 75 and 85 by a lower edge of the reinforcing sheet 70 that is disposed on a part facing away from the axial-direction crease 82 and adjoins the openings 71c and 81 and insertion opening 70e for receiving the inflator 20.

This configuration will prevent the first cover region 71 and second cover region 81, including the inboard side regions 73 and 83 and outboard side regions 74 and 84, from slipping from each other, and facilitate the setting of the reinforcing sheet 70 at a predetermined location inside the inner tube 63 (connection port 33).

Without considering such an advantageous effect, the seams 75 and 85 are optional since the rear edge seam 55b sews the location of the seams 75 and 85 to the inner tube 63 and connection port 33. Further, the seams 75 and 85 may be formed at mutually dislocated positions.

Furthermore, in the airbag device S of the foregoing embodiment, the first cover region 71 and second cover region 81 are composed of a single piece of sheet material 90, in which the first cover region 71 and second cover region 81 are joined with each other in a seamless fashion.

That is, in the illustrated embodiment, the first cover region 71 and second cover region 81 are joined with each other with the aid of the joint region 93. This configuration will facilitate the handling of the sheet material 90 and eliminate the need for joining the first cover region 71 and second cover region 81.

Figure 15:
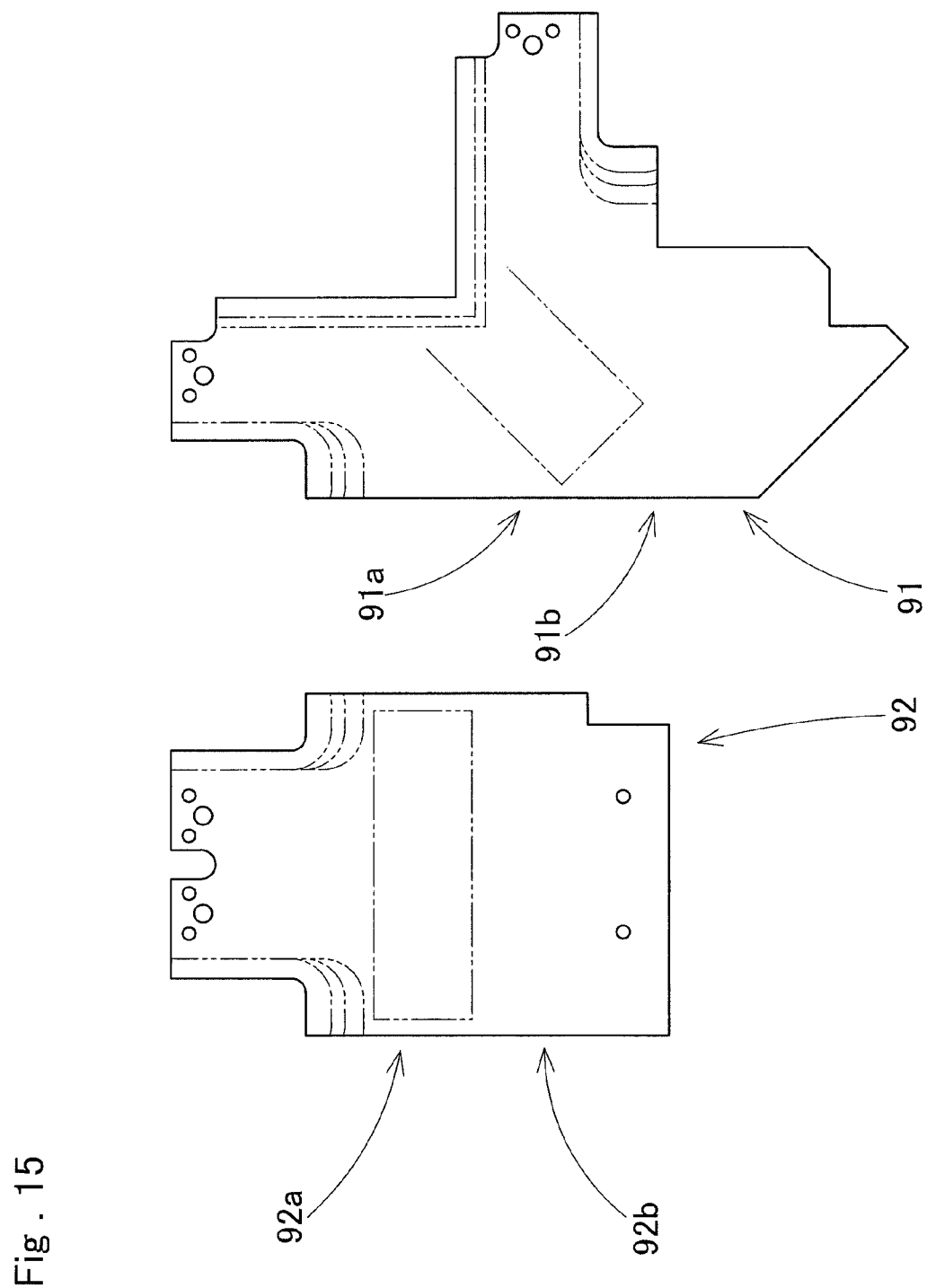
FIG. 15 is a front elevation of a modification of the reinforcing sheet.

However, the first constituent region 91 for forming the first cover region 71 may be separate from the second constituent region 92 for forming the second cover region 81 as shown in FIG. 15, because the first cover region 71 and second cover region 81 will be eventually joined with each other either when the reinforcing sheet 70 is fastened with the outer circumference 21b of the leading end region of the inflator 20 by the clamp 28, when forming the seams 75 and 85, when forming the reinforcing sheet 70, when forming the inner tube 63 or when forming the connection port 33.

Moreover, in the airbag device S of the embodiment, the first cover region 71 includes, in a region encompassing the crossing crease 72, the reinforced region 77 which has a double-layered structure. Likewise, the second cover region 81 includes, in a region encompassing the axial-direction crease 82, the reinforced region 86 which has a double-layered structure.

This configuration will further improve the heat resistance in the regions encompassing the crossing crease 72 and axial-direction crease 82 of the reinforcing sheet 70.

Further, in the foregoing embodiment, each of the reinforced region 77/86 is formed by folding the reinforcing region 91b/92b of the first constituent region 91/the second constituent region 92 of the sheet material 90, which is continuous with the main region 91a/92a, over the main region 91a/92a. This configuration will facilitate the handling of the base materials and preparation of the reinforced regions 77 and 86.

Figure 16:
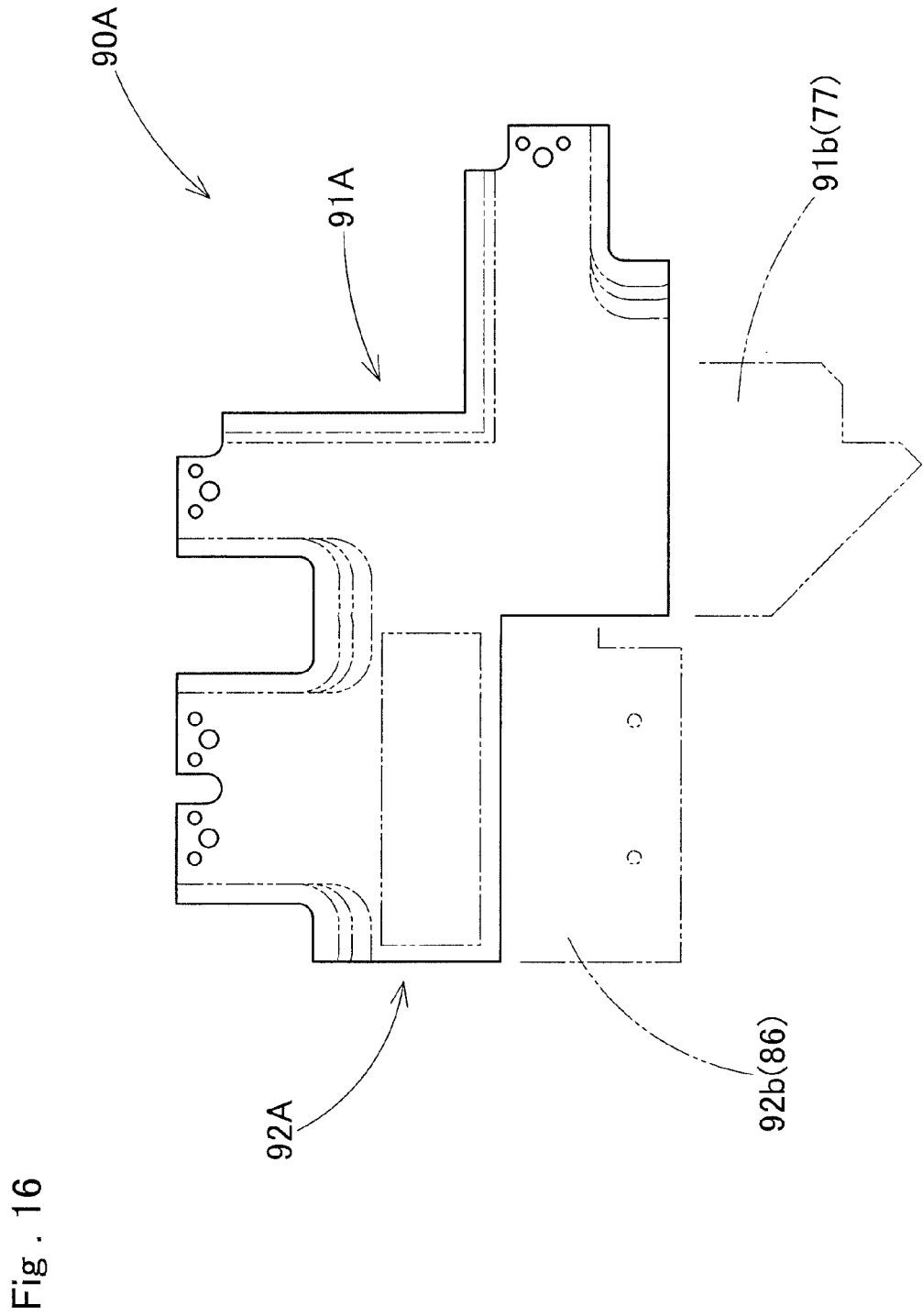
FIG. 16 is a front elevation of another modification of the reinforcing sheet.

Either one of, or both of the reinforced regions 77 and 86 may be omitted depending on an output of the inflator 20. FIG. 16 depicts a sheet material 90A which includes a first constituent region 91A and a second constituent region 92A with no reinforcing regions 91b or 92b, by way of example. On the contrary, if a further reinforcement is desired, an additional reinforcing region may be formed in such a manner as to extend from the main region 91a and/or 92a, or from the reinforcing region 91b and/or 92b, of the sheet material.

It will also be appreciated to prepare separate reinforcing regions to be sewn to the material of the reinforcing sheet.

The reinforcing sheet 70 of the foregoing embodiment further includes the guide cloth 94 inside the tubular region 70d for facilitating the insertion of the inflator 20 into the insertion opening 70e. If the tab 94a of the guide cloth 94 is gripped, the inflator 20 will be easily inserted into the tubular region 70d. Without considering such an advantageous effect, the guide cloth 94 will not be indispensable.

Figure 17:
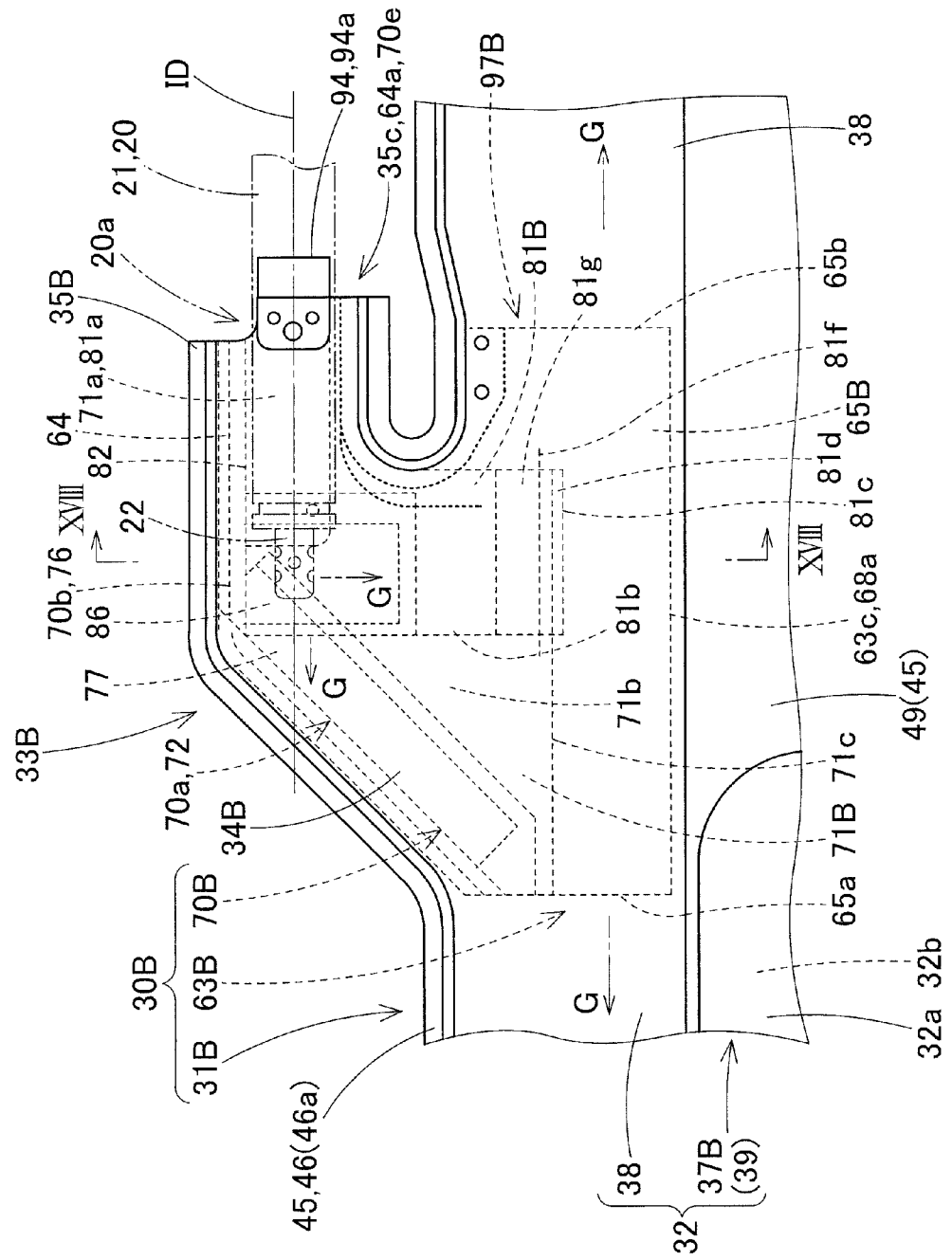
FIG. 17 is an enlarged front elevation of a modification of the airbag, especially showing a vicinity of a connection port formed by one-piece woven technology.

In the foregoing embodiment, the connection port 33 of the airbag 30 is composed of the base cloths 52 (52I and 52O) which are sewn to the one-piece woven portion 47. Alternatively, the connection port may be formed as a part of a bag body formed by one-piece woven technology, as in an airbag 30B shown in FIGS. 17 and 18. In the airbag 30B, a connection port 33B is a part of the bag body 31B formed by one-piece woven technology with polyamide yarn or the like, and a reinforcing sheet assembly 97B (i.e., an inner tube 63B equipped with a reinforcing sheet 70B) is disposed inside the connection port 33B. The connection port 33B includes a root region 34B which extends upward from the main inflatable portion 37B and a tubular region 35B which is bent rearward from the root region 34B and includes an opening 35c for receiving an inflator 20 at the rear end. The root region 34B is in gas communication with a gas feed path 38 disposed in an upper region of the main inflatable portion 37B. In this airbag 30B, due to one-piece woven structure, the inboard side wall (front wall) 32a and outboard side wall (back wall) 33a are integrated at the peripheral portion 46 and closed portion 49 (i.e., at the non-admissive region 45) in the gas feed path 38 and connection port 33B.

Referring to FIGS. 17 and 21A to 22B, in a similar fashion to the inner tube 63 shown in FIGS. 12A to 12C, the inner tube 63B is composed of a sheet material 68B formed of a woven fabric of polyamide or the like. The sheet material 68B is folded in half on a crease 68a located at the lower edge 63c of the outlet region 65B and sewn up by overlapped peripheral edges of the inboard side region 63a and outboard side region 63b, thus formed into the inner tube 63B. Seams 66a, 66b and 66c sewing the inboard side region 63a and outboard side region 63b together are formed at predetermined regions of the peripheral edges. The seam 66a is formed at the front upper edge of the inner tube 63B leading to an insertion opening 64a of the tubular region 64 and to the front outlet port 65a, and the seam 66b sews up an inner peripheral edge leading to the insertion opening 64a and rear outlet port 65b. The seam 66c furcates from the seam 66b and has an L shape. The seam 66c sews the reinforcing sheet 70B to the inboard side region 63a and outboard side region 63b and the seam 66b sews the reinforcing sheet 70B partially.

Figure 18:
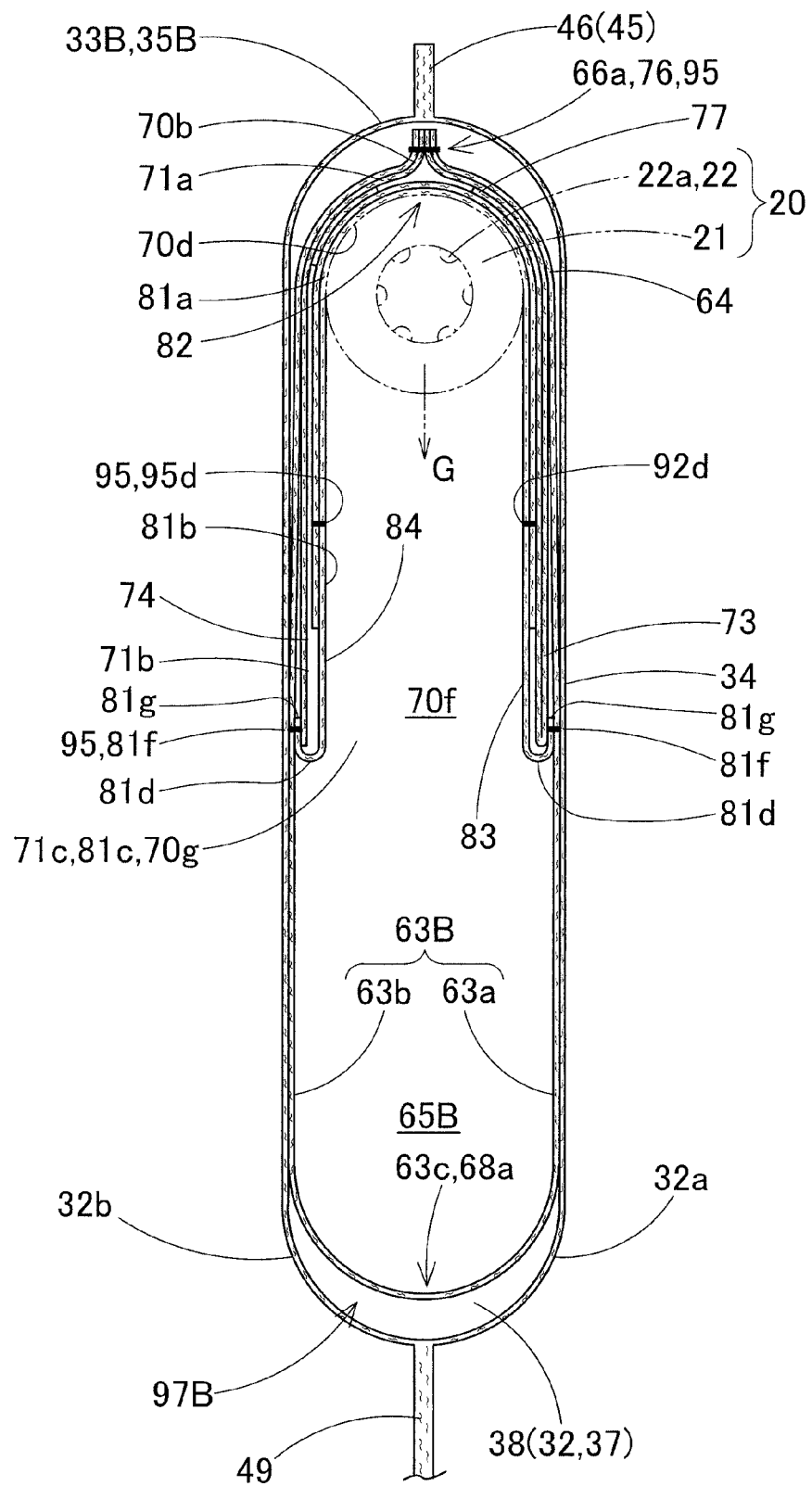
FIG. 18 is a schematic vertical section taken along line XVIII-XVIII of FIG. 17.
Figure 21A:
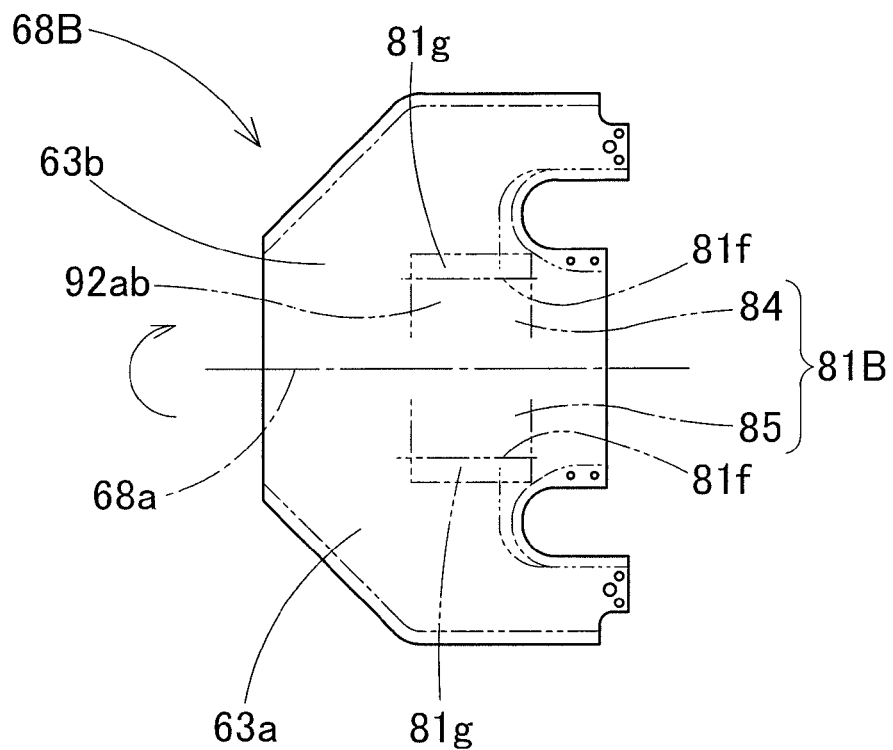
FIGS. 21A and 21B illustrate the production process of an inner tube disposed inside the connection port of FIG. 17.
Figure 21B:
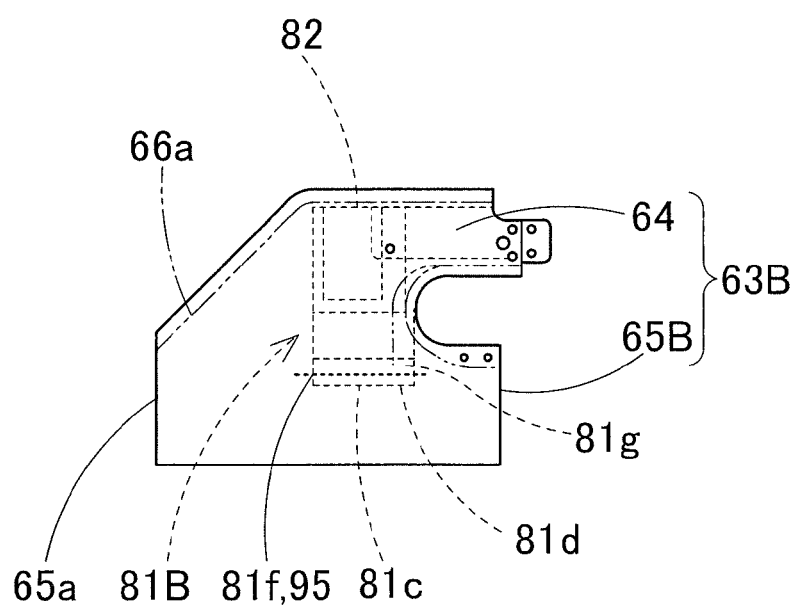

As described later, the lower edges 81d of the opening 81c of the second cover region 81B of the reinforcing sheet 70 are sewn to the inboard side region 63a and outboard side region 63b of the inner tube 63B by seams 81f so as not to flutter. In order for the seams 81f not to be exposed in an interior of the connection port 33, the lower edges 81d of the second cover region 81B are sewn to the inboard side region 63a and outboard side region 63b before the inner tube 63B is folded in half and is turned from the seam 81f (from the seam allowance 81g), as shown in FIGS. 18 and 21B.

Referring to FIGS. 17 and 19A to 20C, the reinforcing sheet 70B is composed of a first constituent 91B forming the first cover region 71B and a second constituent 92B forming the second cover region 81B, which are separate members. In a similar fashion to the foregoing embodiment, the first cover region 71B has a double-folded configuration that is doubled at the front edge 70a (in other words, at its region distant from the leading end 20a of the inflator 20 in an axial direction ID of the inflator 20) on a crossing crease 72 which crosses the axial direction ID of the inflator 20, and covers a circumference of the leading end 20a region of the inflator 20 with the inboard side region (front region) 73 and outboard side region (back region) 74 disposed on both sides of the crossing crease 72. The first cover region 71B includes a tubular wrap region 71a wrapped around an outer circumference 21b of a vicinity of the leading end of the inflator body 21 and a gas path region 71b which ranges from the tubular wrap region 71a to the crossing crease 72 and covers a circumference of gas releasing portion 22 of the inflator 20. The second cover region 81B has a double-folded configuration that is doubled at the upper edge 70b of the reinforcing sheet 70B (in other words, at the edge facing away from the main inflatable portion 37B of the bag body 31B) on an axial-direction crease 82 which extends in parallel to the axial direction ID of the inflator 20, and covers the circumference of the leading end 20a region of the inflator 20 with an inboard side region (front region) 83 and an outboard side region (back region) 84 disposed on both sides of the axial-direction crease 82. The second cover region 81B includes a tubular wrap region 81a wrapped around the outer circumference 21b of the vicinity of the leading end of the inflator body 21 and a gas path region 81b which ranges from the tubular wrap region 81a to the front edge 70a of the reinforcing sheet 70B and covers the circumference of the gas releasing portion 22 of the inflator 20.

In a similar fashion to the foregoing embodiment, the first cover region 71B and second cover region 81B so overlap that the crossing crease 72 continues to the axial-direction crease 82 at a region distant from the gas releasing portion 22 of the inflator 20. In the illustrated embodiment, the second cover region 81B is disposed inside the first cover region 71B. Each of the first cover region 71B and second cover region 81B has an opening 71c/81c facing toward the outlet region 65B of the inner tube 63B.

Also in this embodiment, the reinforcing sheet 70B will improve the heat resistance of the inner tube 63B by covering the seam 66a disposed at the upper front edge of the inner tube 63 with its region where the crossing crease 72 and the axial-direction crease 82 are continuous and preventing an inflation gas G discharged from the gas releasing portion 22 of the inflator 20 from directly hitting the seam 66a.

Figure 22A:
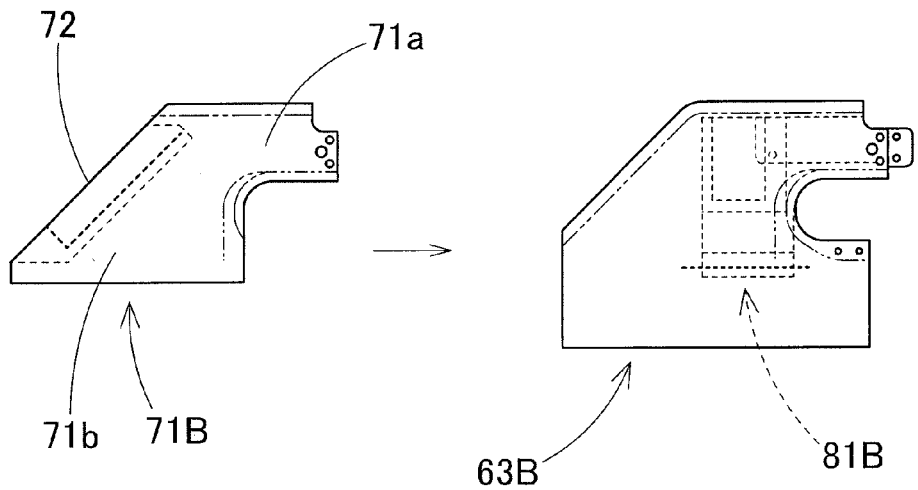
FIGS. 22A and 22B illustrate the process of assembling the first cover region with the inner tube to form a reinforcing sheet assembly.
Figure 22B:
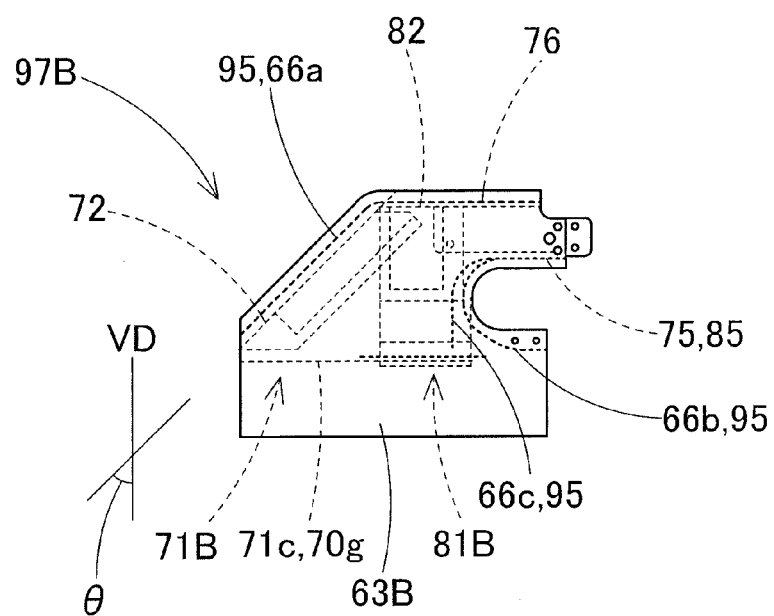

Also in the first cover region 71B, the crossing crease 72 is inclined from the direction VD perpendicular to the axial direction of the inflator 20 at such an angle θ (about 45°, in the embodiment) as to enlarge toward the opening 71c, as shown in FIG. 22B.

Figure 19A:
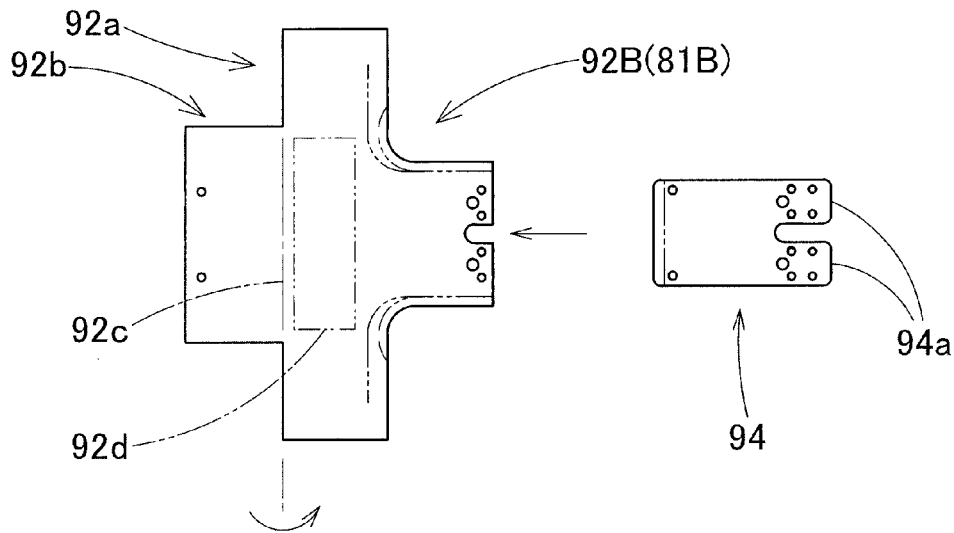
FIGS. 19A, 19B and 19C illustrate the production process of a second cover region of a reinforcing sheet disposed inside the connection port of FIG. 17.
Figure 19B:
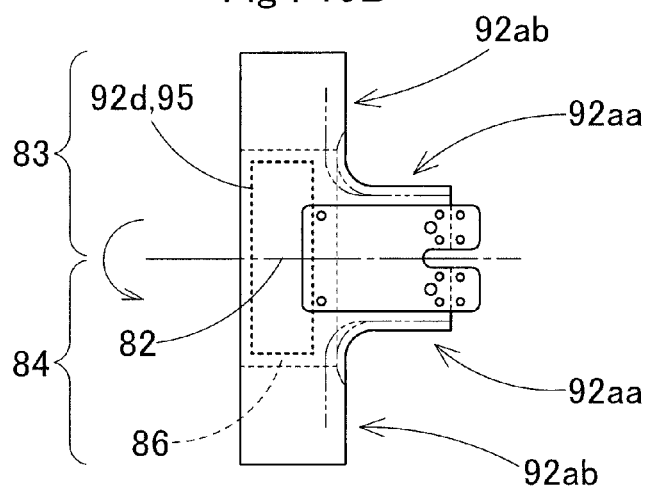
Figure 19C:
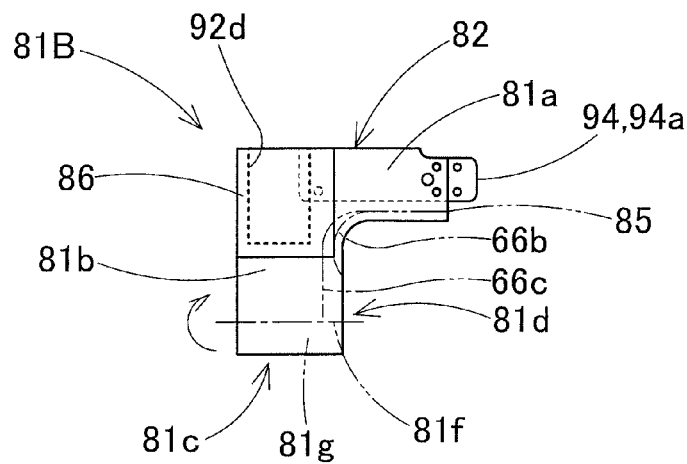
Figure 20A:
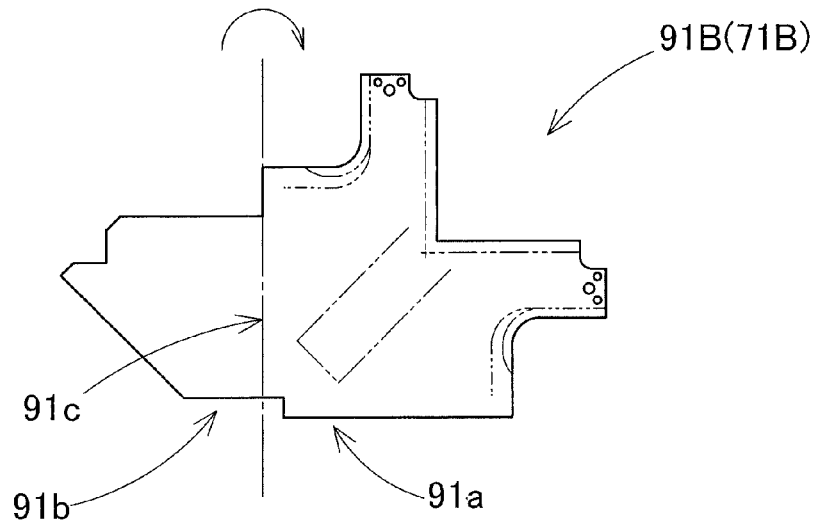
FIGS. 20A, 20B and 20C illustrate the production process of a first cover region of the reinforcing sheet disposed inside the connection port of FIG. 17.
Figure 20B:
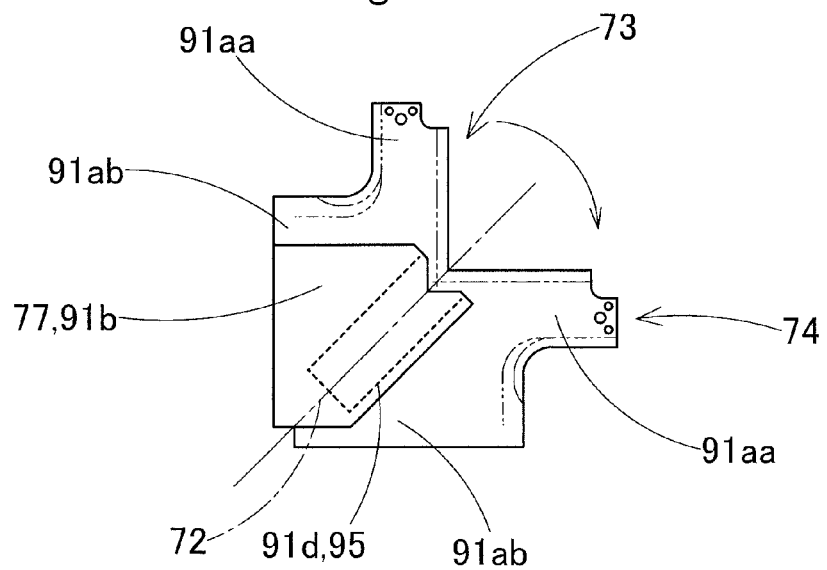

Moreover, the first cover region 71B includes a reinforced region 77 at an inner side of the gas path region 71b encompassing the crossing crease 72 as shown in FIG. 20B while the second cover region 81B includes a reinforced region 86 at an outer side of the gas path region 81b encompassing the axial-direction crease 82 as shown in FIGS. 19B and 19C, for further enhancing heat resistance.

The production process of the reinforcing sheet assembly 97B is now described. Firstly, as shown in FIGS. 19A and 19B, a guide cloth 94 is disposed at a predetermined location on the inner side of a main region 92a of the second constituent 92B. Then a reinforcing region 92b is folded back on a crease 92*c* towards the opposite side from the side where the guide cloth 94 is disposed, i.e., on the outer side, of the main region 92*a*, and is sewn to the main region 92*a* together with the guide cloth 94 with a seam 92*d* of sewing threads 95, as shown in FIG. 19B, thus forming the reinforced region 86. Then as indicated with double-dotted lines in FIG. 21A, the lower edges 81*d* of the second cover region 81B (terminal edges of the path constituents 92*ab*) are located at predetermined positions on the sheet material 68B of the inner tube before folded in half such that the seam allowances 81*g* face outwardly, and sewn thereto with sewing threads 95, thereby forming the seam 81*f*.

Subsequently, as shown in FIGS. 19C and 21B, the second constituent 92B is doubled on the axial-direction crease 82 together with the guide cloth 94. That is, the sheet material 68B of the inner tube is doubled on the crease 68*a* at the same time. Thus the outer contours (folded-up contours) of the second cover region 81B and inner tube 63B are formed.

Figure 20C:
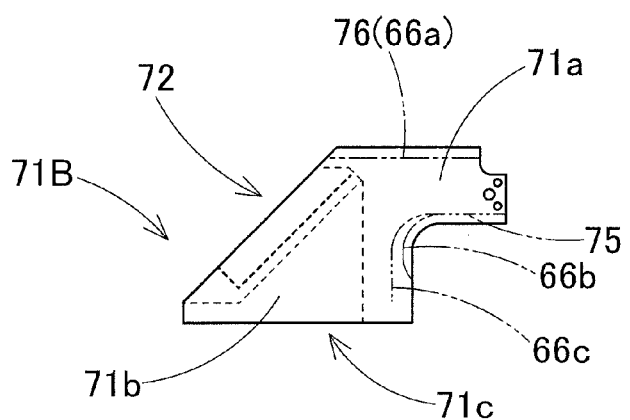

In the meantime, as shown in FIGS. 20A and 20B, a reinforcing region 91*b* of the first constituent 91B is folded back over a main region 91*a* on a crease 91*c* located at a boundary between the reinforcing region 91*b* and main region 91*a*, and is sewn and fixed to the main region 91*a* with a seam 91*d*, thus forming a reinforced region 77. Then as shown in FIG. 20C, if an inboard side region 73 of the first constituent 91B is folded over an outboard side region 74 on the crossing crease 72, the outer contour (folded-up contour) of the first cover region 71B is formed.

As shown in FIGS. 22A and 22B, subsequently, the first cover region 71B is inserted into the inner tube 63B, to which the second cover region 81B has been preliminarily sewn, from an open front upper edge. If then the seams 66*a*, 66*b* and 66*c* are formed, the reinforcing sheet assembly 97 is completed. The seam 66*a* formed along the upper front edge of the inner tube 63B is formed above and at a distance from the axial-direction crease 82 of the second cover region 81B and overlaps with the seam 76 of the first cover region 71B extending from the crossing crease 72 along the upper edge of the first cover region 71B (FIG. 22A). As described above, the seam 66*c* sews the reinforcing sheet 70B to the inboard side region 63*a* and outboard side region 63*b* of the inner tube 63B and the seam 66*b* sews the reinforcing sheet 70B partially.

Then the reinforcing sheet assembly 97 is inserted into the connection port 33B of the airbag 30B via the opening 35*c*, and is so arranged that an open region 70*f* of the reinforcing sheet 70B and the outlet region 65B of the inner tube 63B are located in an area ranging from the root region 34B of the connection port 33B to the gas feed path 38 of the bag body 31B, and the tubular region 70*d* of the reinforcing sheet 70B and the connection tube region 64 of the inner tube 63B are located in the tubular region 35B of the connection port 33B of the bag body 31B. Thus the airbag 30B is completed and ready for mounting on a vehicle V.

With the reinforcing sheet assembly 97B, the inner tube 63B and reinforcing sheet 70B will be easily set in the connection port 33B formed by one-piece woven technology. The reinforcing sheet assembly 97B may also be mounted on a connection port 33 formed by cut-and-sewn technology.

As in the reinforcing sheet assembly 97B, the second cover region 81B and first cover region 71B may be assembled with the inner tube 63B separately to form the reinforcing sheet 70B.

With the inner tube 63B, although the lower edge 81*d* regions of the second cover region 81B are extended downward in such a manner as to enter an area of the gas feed path 38, the lower edge 81*d* regions are sewn to the inner tube 63 by the sewn seams 81*f* so as not to flutter or slip inside the inner tube 63B. Therefore, the inner tube 63B is able to exert its redirecting property smoothly and let the inflation gas G out of the front and rear outlet ports 65*a* and 65*b* of the outlet region 65B in a bifurcate fashion. Further, the lower edge 81*d* regions are turned after being sewn to the inboard side region 63*a* and outboard side region 63*b* of the inner tube 63B such that the seam allowances 81*g* contact the inboard side region 63*a* and outboard side region 63*b* directly and the sewn seams 81*f* are covered by the inboard side region 83 and outboard side region 84 of the second cover region 81B as shown in FIG. 18. This configuration will prevent the sewn seams 81*f* from being exposed to the inflation gas G, and help enhance the heat resistance of the reinforcing sheet 70B. Therefore, the second cover region 81B will smoothly let the inflation gas G out of the opening 81*c* fixed to the inner tube 63B and feed the gas G towards the outlet region 65B of the inner tube 63.

An alternative embodiment is now described in reference to FIGS. 23 to 37.

Figure 23:
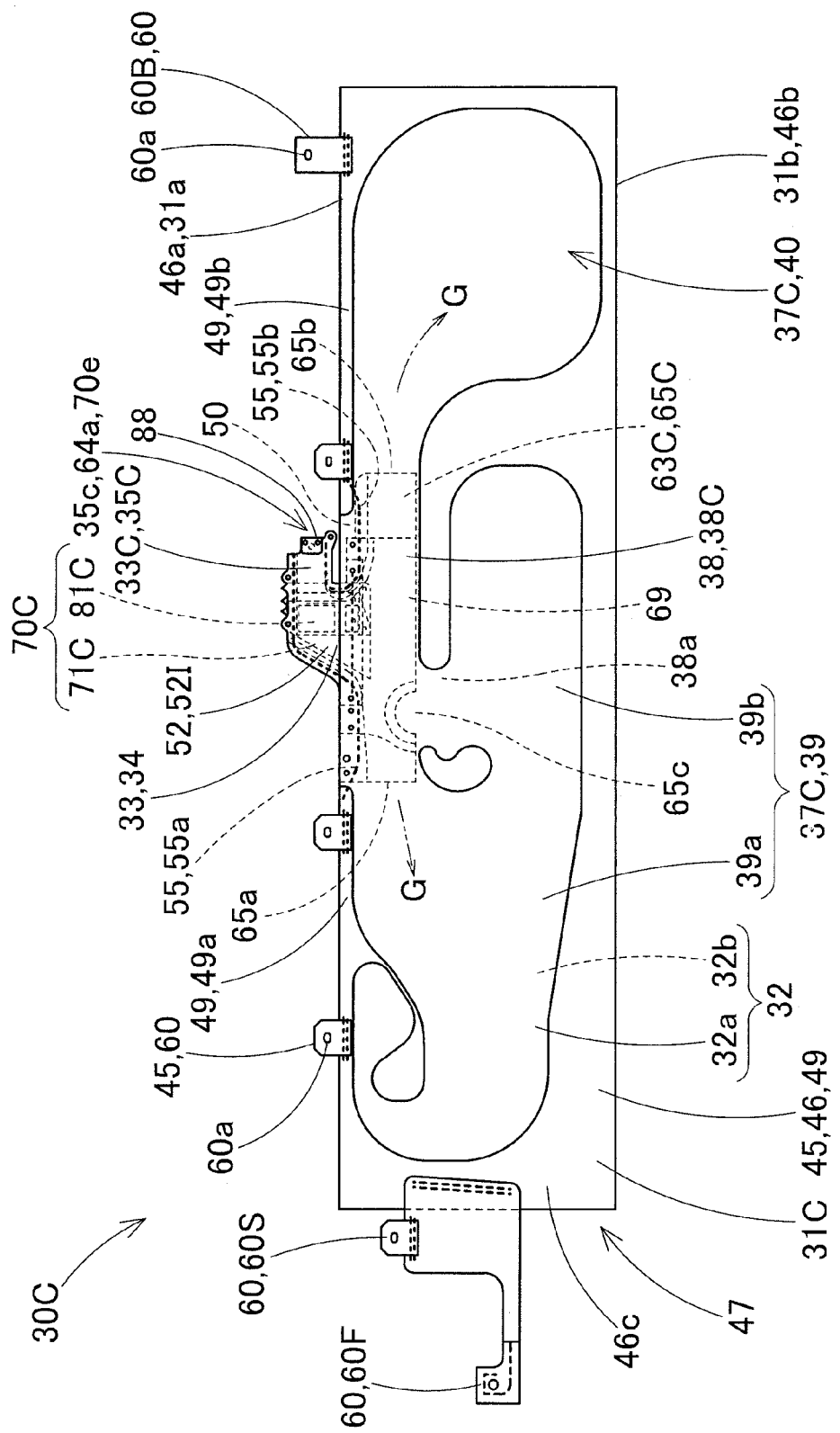
FIG. 23 is a front view of an airbag for use in an alternative embodiment of the invention.

In an airbag 30C shown in FIG. 23 for use in a head-protecting airbag device, an airbag body 31C is composed of a plurality of mounting portions 60, a one-piece woven portion 47 and base cloths 52 for forming a connection port 33C as shown in FIGS. 23 to 28, in a similar fashion to the airbag 30 shown in FIGS. 2 to 6.

Figure 25:
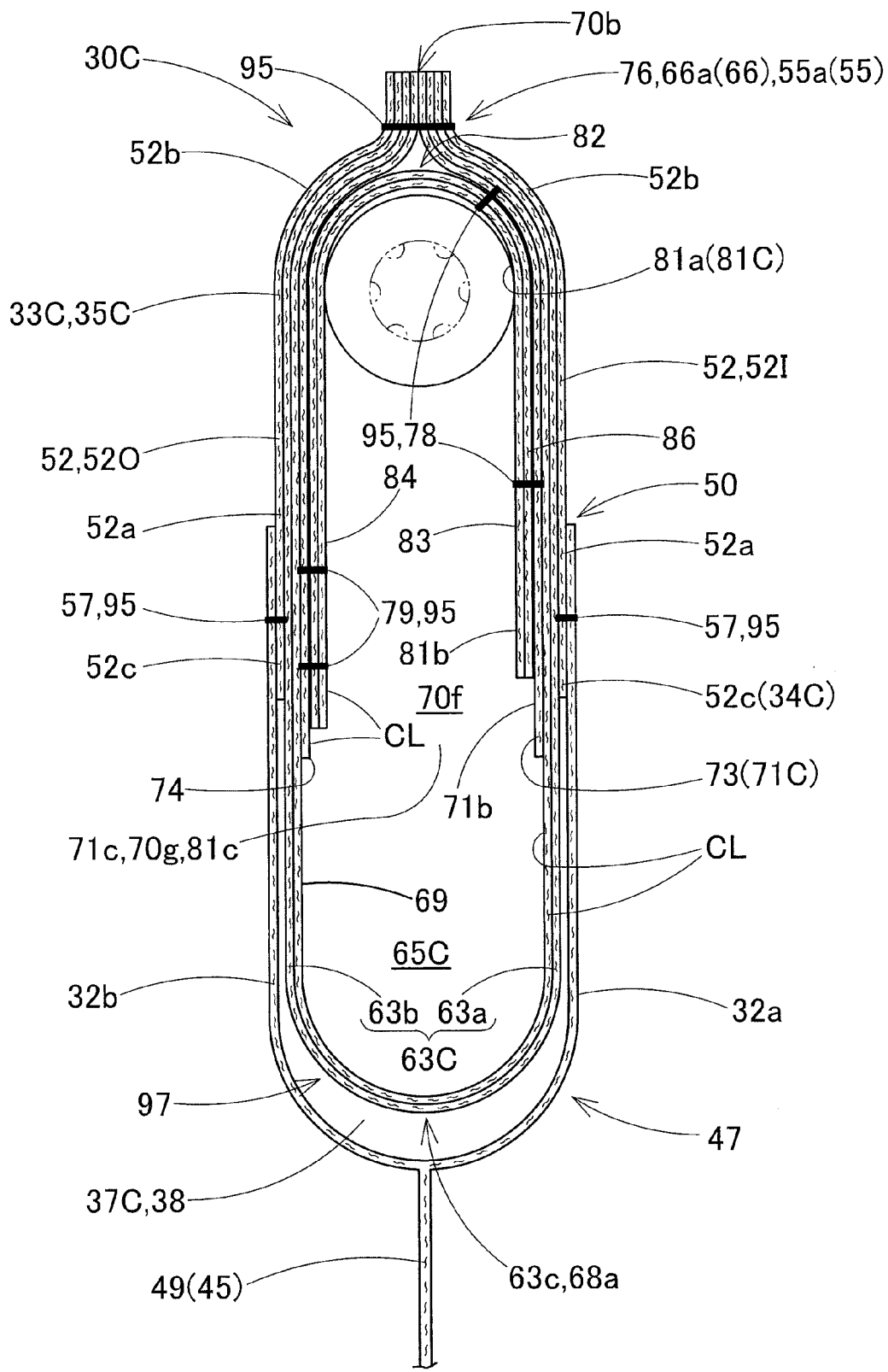
FIG. 25 is a schematic vertical section of the airbag coupled with an inflator, taken along line XXV-XXV of FIG. 24.
Figure 26:
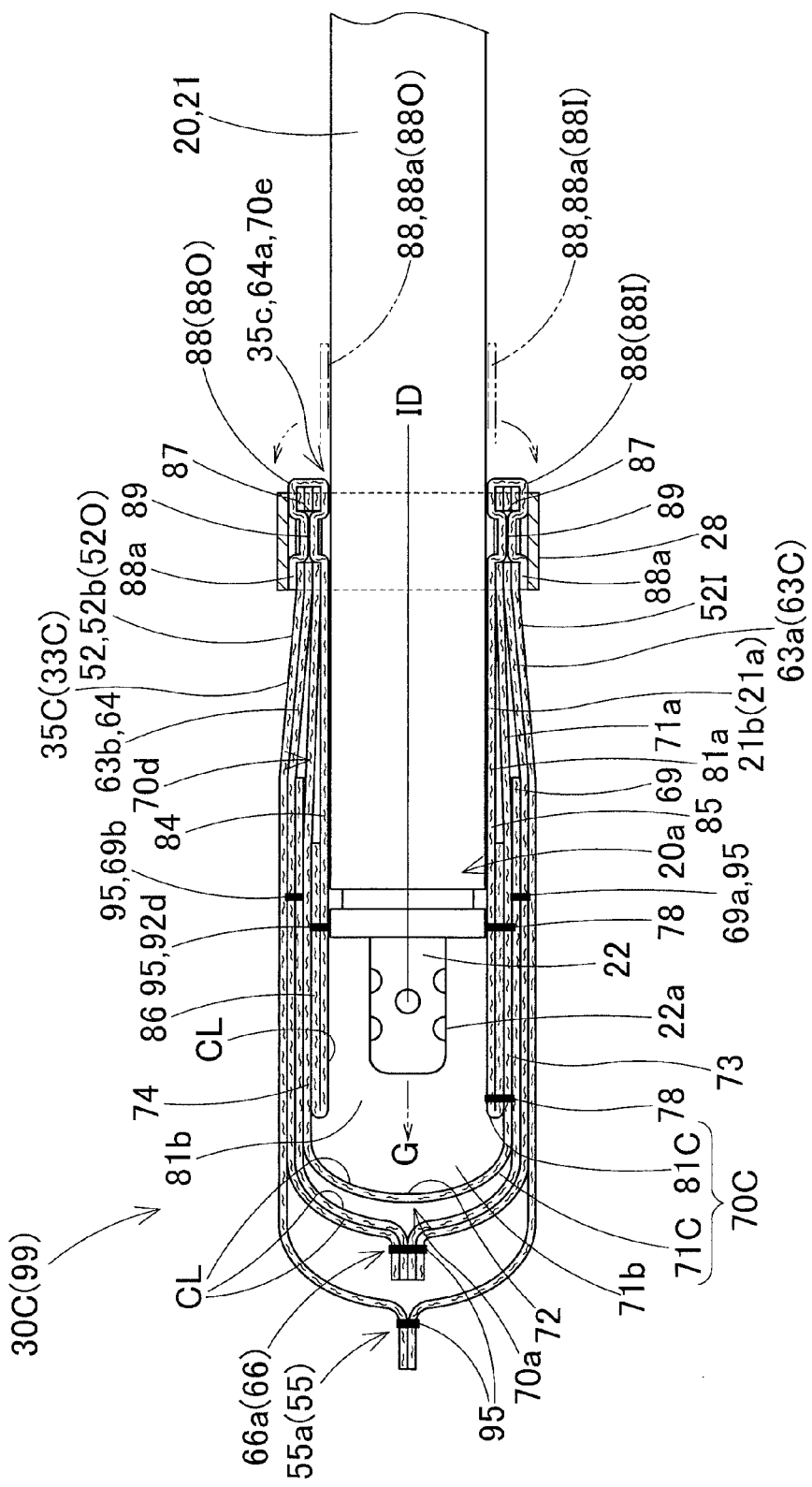
FIG. 26 is a schematic horizontal section of the airbag coupled with the inflator, taken along line XXVI-XXVI of FIG. 24.

However, the airbag 30C differs from the airbag 30 in configuration as follows:

A first cover region 71C and a second cover region 81C are provided separately to form a reinforcing sheet 70C, and each of the cover regions 71C and 81C is provided with a coating layer CL on the plane facing an outer circumference 21*b* of the inflator 20 for enhancing heat resistance, as shown in FIGS. 25 and 26.

The second cover region 81C is disposed on an inner side of the first cover region 71C and fixed to the first cover region 71C so as not to slip or flutter due to an inflation gas G. Specifically, as shown in FIGS. 25, 26, 30 and 32, the front edge 81*h* of the second cover region 81C to be disposed at a distance from the leading end of the inflator 20 in an axial direction ID of the inflator 20 is sewn to the first cover region 71C with seams 78 and 79 of sewing threads 95.

Figure 29:
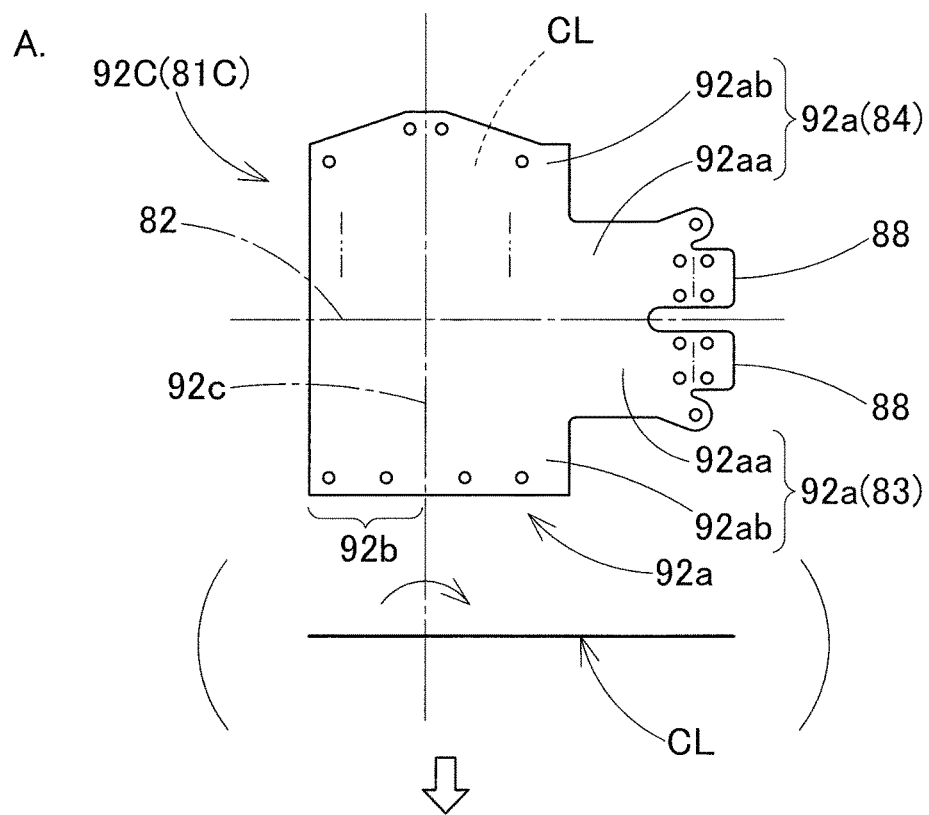
FIG. 29 illustrates the production process of a second cover region of a reinforcing sheet for use in the airbag of FIG. 23.
Figure 29:
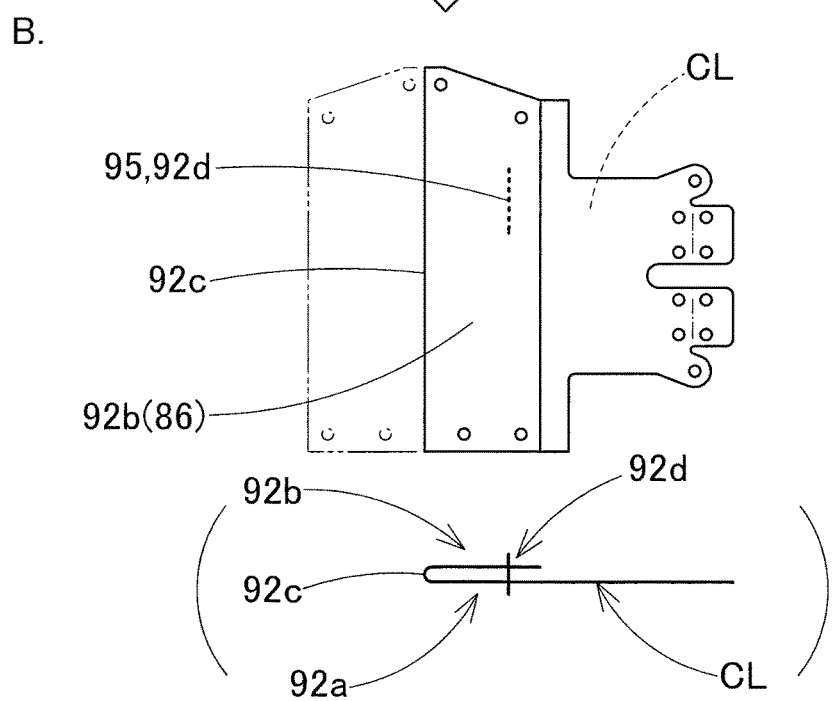
Figure 37:
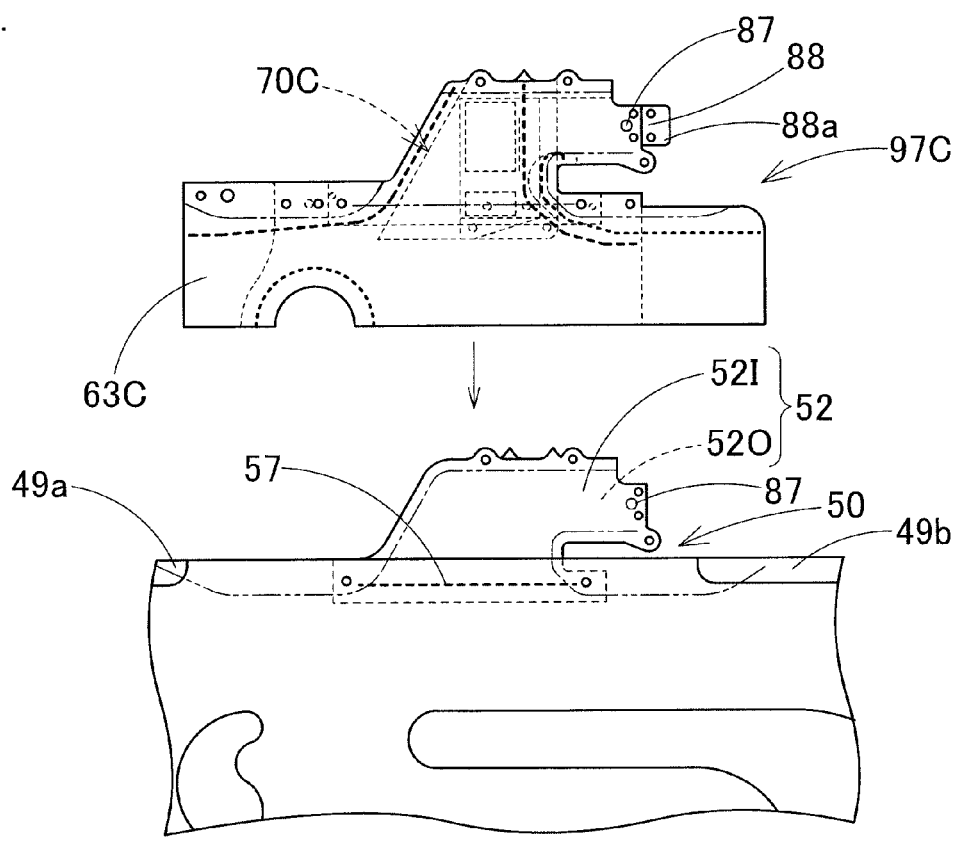
Figure 37:
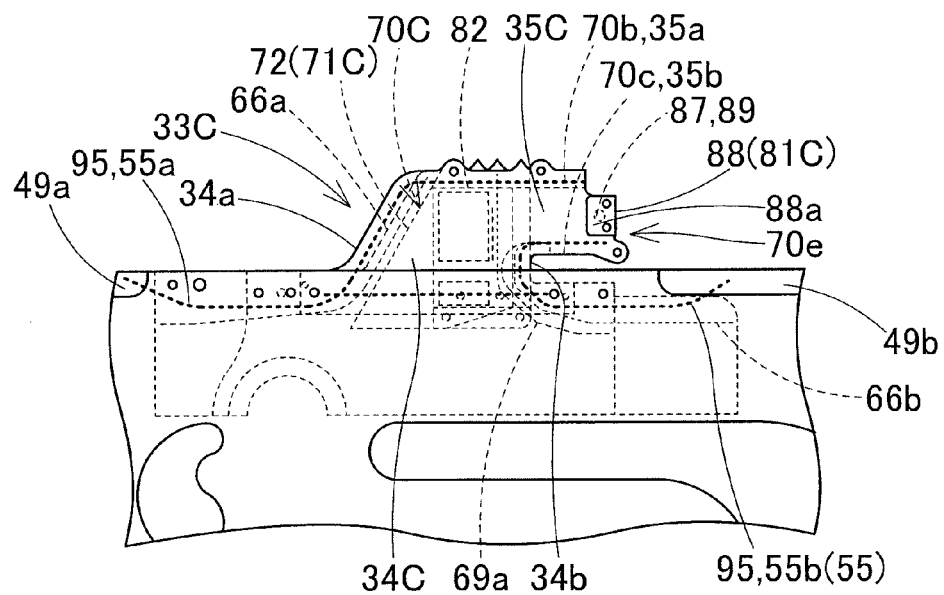

The reinforcing sheet 70C is not provided with a guide cloth 94. Instead, as shown in FIGS. 26, 29 and 37, the second cover region 81*c* is provided with tongue regions 88 (88I, 88O) to protrude out of an insertion opening 70*e* of the reinforcing sheet 70C. The inboard side tongue region 88I and outboard side tongue region 88O are each folded back on an outer surface of the connection port 33C. Each of the base cloths 52 for forming the connection port 33C, inner tube 63C and first cover region 71C of the reinforcing sheet 70C is provided with a through hole(s) 87 at the leading end of the connection port 33, and the inboard side tongue region 88I and outboard side tongue region 88O are welded to the second cover region 81C in a folded-back state through the through holes 87, with a welding portion 89. That is, by being folded back over the outer circumference of the connection port 33C from an inner side of the reinforcing sheet 70C, the tongue regions 88 cover end planes of the first cover region 71C, inner tube 63C and base cloths 52 of the connection port 33C (i.e., end planes of the insertion openings 64*a* and 70*e*).

The airbag 31C depicted in FIG. 23 includes a gas feed path 38 and a main inflatable portion 37C, and the main inflatable portion 37C includes a front inflatable portion 39 and a rear inflatable portion 40 disposed at the rear of the front inflatable portion 39. The front inflatable portion 39 includes a main chamber 39a and a pressure-control chamber 39b disposed at the rear of the main chamber 39a. The pressure-control chamber 39b is in gas communication with the gas feed path 38 via an opening 38a. The pressure-control chamber 39b admits an inflation gas G for preventing undue pressure rise of the main chamber 39a in an initial stage of airbag deployment.

Figure 24:
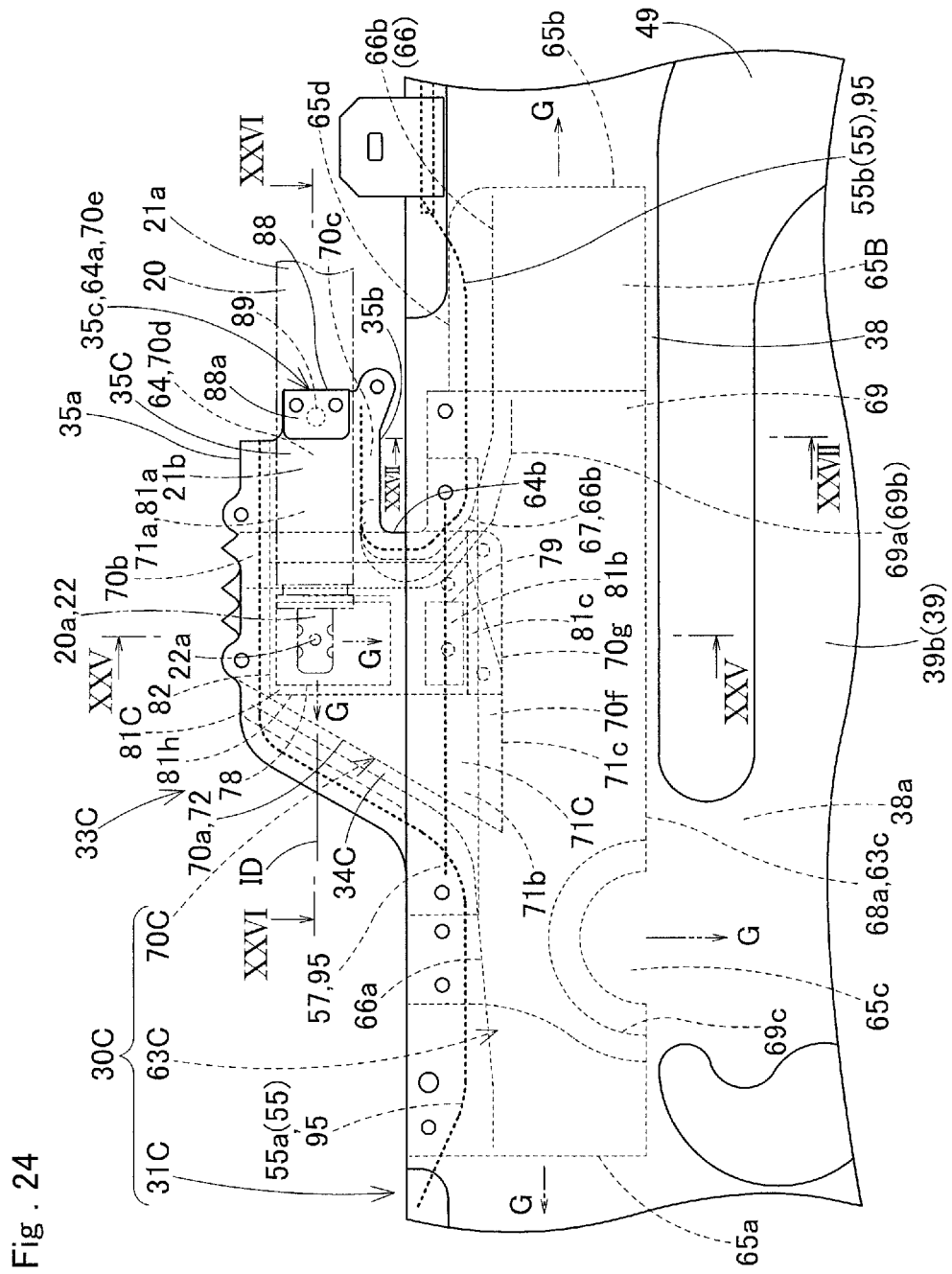
FIG. 24 is an enlarged front view of the airbag of FIG. 23 showing a vicinity of a connection port.

To correspond with the configuration of the main inflatable portion 37C described above, the inner tube (redirecting sheet) 63C has an additional, intermediate outlet port 65c other than the front and rear outlet ports 65a and 65b, as shown in FIGS. 23 and 24. The intermediate outlet port 65c is disposed on the lower edge 63c (i.e., on the crease 68a) of the inner tube 63C between the front and rear outlet ports 65a and 65b, in such a fashion as to feed an inflation gas G to the pressure-control chamber 39b via the opening 38a of the gas feed path 38.

Figure 35:
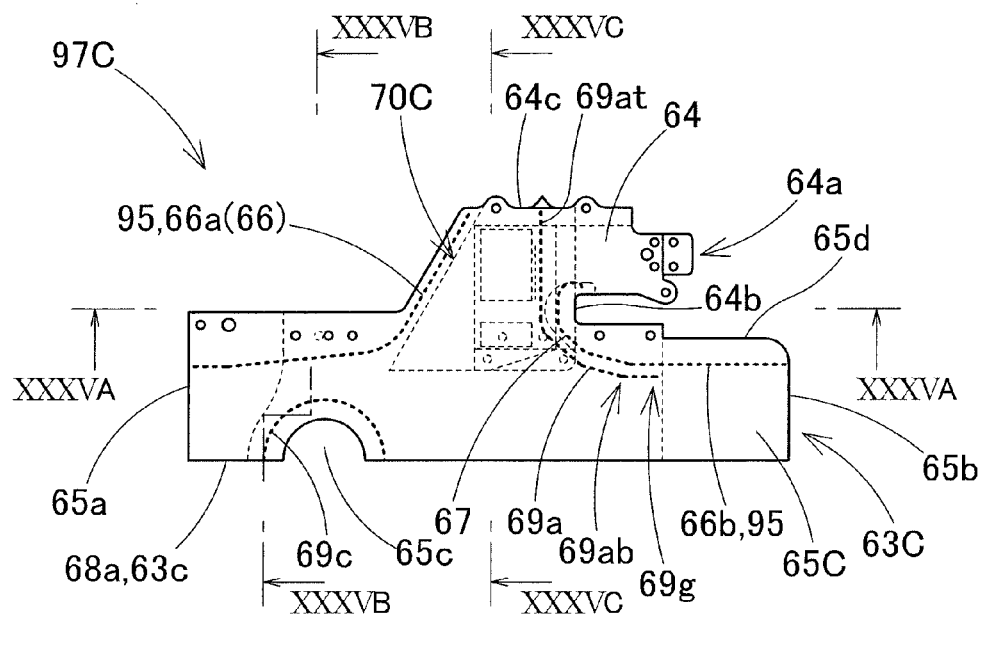
Figure 35:
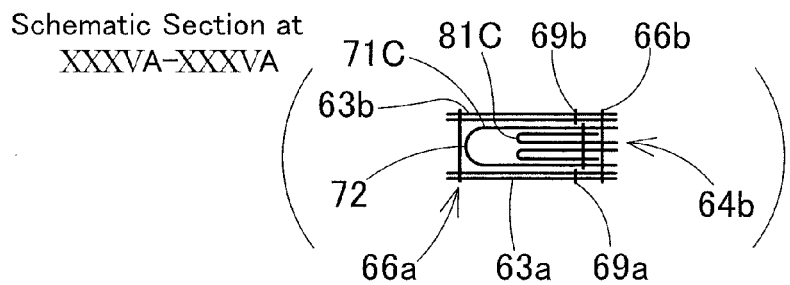
Figure 35:
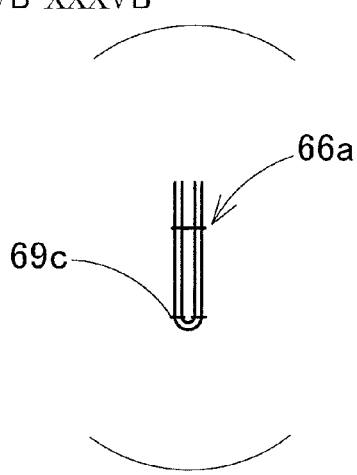
Figure 35:
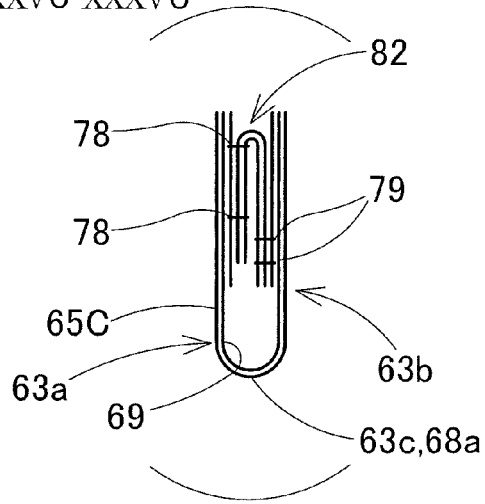

Moreover, as shown in FIGS. 25 to 28 and 33, the inner tube 63C is provided on the inner side with a patch cloth 69 for enhancing heat resistance and minimizing a damage caused by stress concentration at airbag deployment. The patch cloth 69 is sewn to an inner plane of a sheet material 68C for forming the inner tube 63C with seams 69a, 69b and 69c of sewing threads 95. The seam 69c is disposed in the periphery of the intermediate outlet port 65c. The seams 69a and 69b are for stress deconcentration and are formed along the seam 66b of the inner tube 68C which sews up the outer peripheral edge of the sheet material 68C folded in half on the crease 68a. The seam 66b of the inner tube 68C passes a bent region 67 of the inner tube 63C at which the outlet region 65C bends from the connection tube region 64C in a generally L shape, as shown in FIG. 35. The seams 69a and 69b sew the patch cloth 69 to the inboard side region 63a and outboard side region 63b of the sheet material 68C along the bent region 67, in a vicinity of the bent region 67 and at a position dislocated from the seam 66b.

Figure 28:
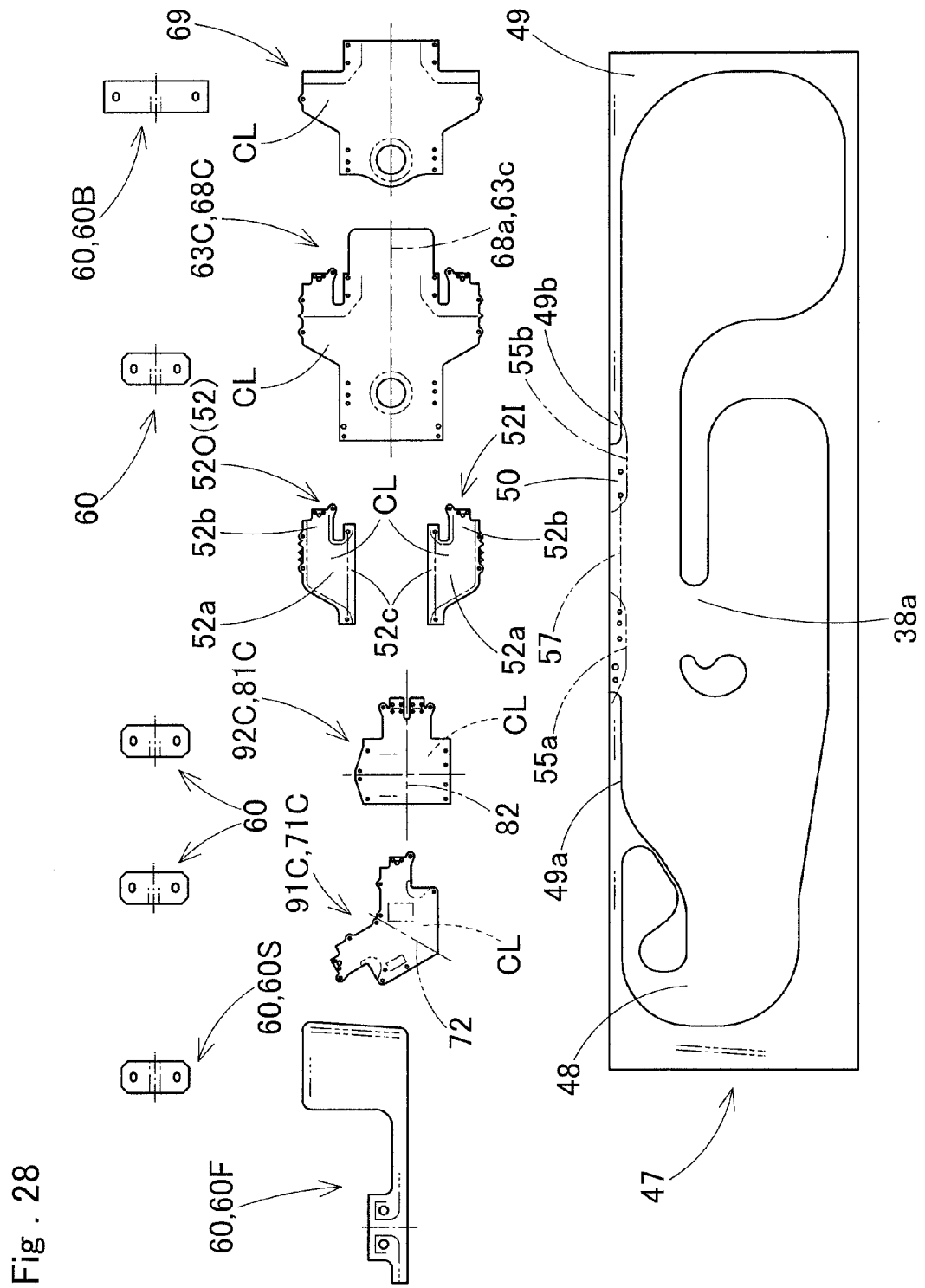
FIG. 28 depicts components of the airbag of FIG. 23 by front views.

Components of the airbag 30C shown in FIG. 28; the base cloths 52 of the connection port 33, the sheet material 68 for forming the inner tube 63, the patch cloth 69, a first constituent 91C for forming the first cover region 71C and a second constituent 92C for forming the second cover region 81C, are each formed of a flexible sheet material such as a plain-weave fabric of polyamide, and each of the components has a coating layer CL formed of such coating agent having heat-resisting property as silicone resin, on the side to be subjected to an inflation gas G or to be located in proximity to the gas G. Each of the above-described components is provided, at the peripheral edge, with positioning holes (reference numeral omitted) to help positioning at sewing work.

In the description of the airbag 30C, a capital C is given to a reference numeral of a member and region having a different configuration from the foregoing airbag 30. The members and regions which are similar to or the same as counterparts in the airbag 30 are provided with common reference numerals, and their descriptions will be suitably omitted.

The production process of the airbag 30C is now described. Firstly, to produce a reinforcing sheet 70C, as shown in FIG. 29, the reinforcing region 92b of the second constituent 92C is folded back on the crease 92c towards the outer side of the main region 92a and is sewn to the main region 92a with a seam 92d of sewing threads 95 of polyamide or the like, thus forming the reinforced region 86.

Figure 30:
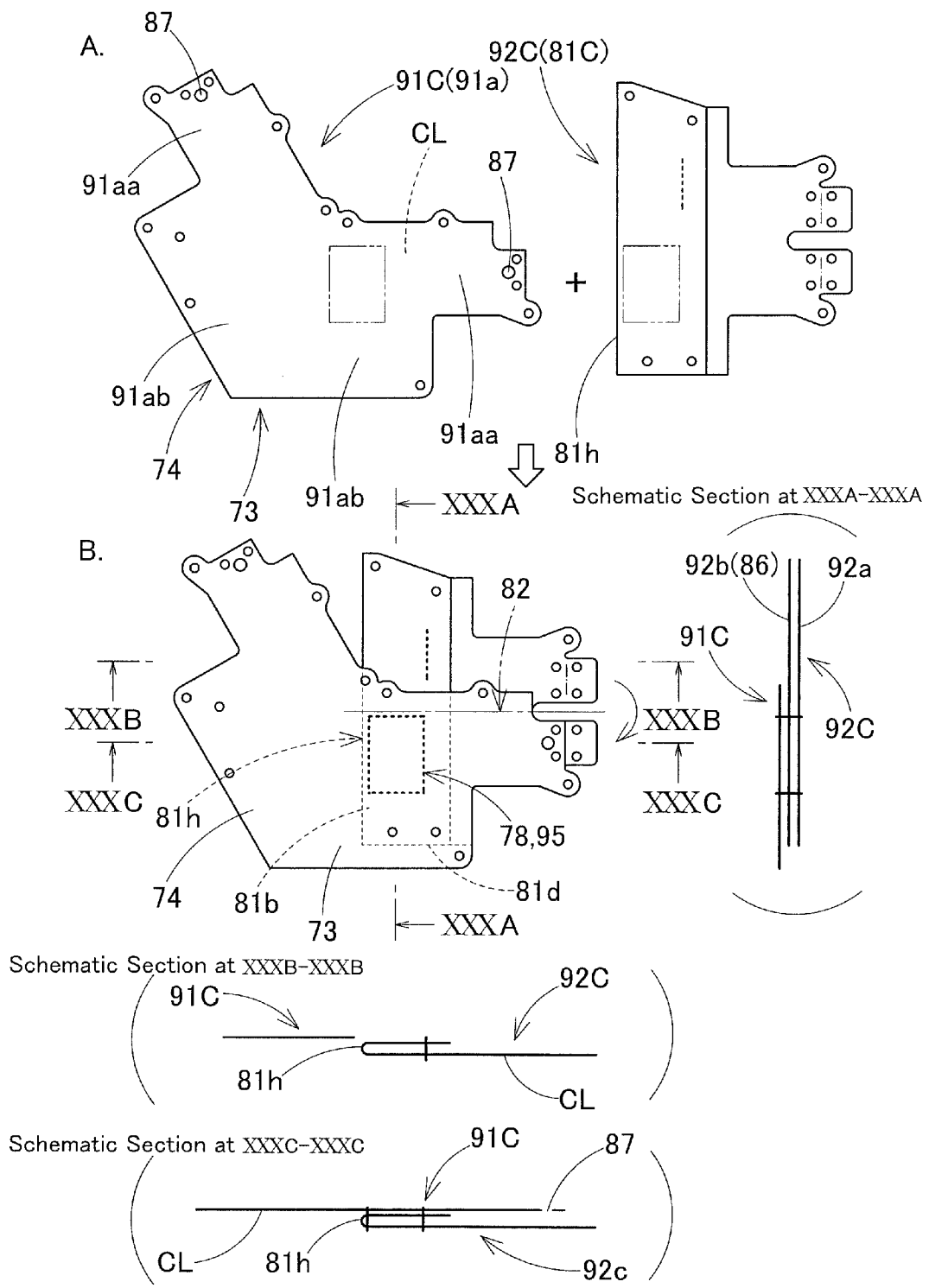
FIGS. 30 to 32 illustrate the production process of the reinforcing sheet.

Subsequently, as shown in FIG. 30, the second constituent 92C is placed on the inner side of the first constituent 91C and sewn to the first constituent member 91C with a seam 78. The seam 78 sews the inboard side regions 73 and 83 of the first cover region 71C and second cover region 81C together in the form of a generally rectangular ring, which extends from a vicinity of the axial-direction crease 82 of the second cover region 81C towards the lower end 81d in proximity to the front edge 81h. Since the outboard side regions 74 and 84 of the first cover region 71C and second cover region 81C will be sewn together as well with a seam 79 (FIG. 32) later on, the seam 78 is formed at an upper half area of the gas path region 81b in a vicinity of the axial-direction crease 82 so as not to overlap the seam 79 and minimize the thickness of the reinforcing sheet 70C.

Figure 31:
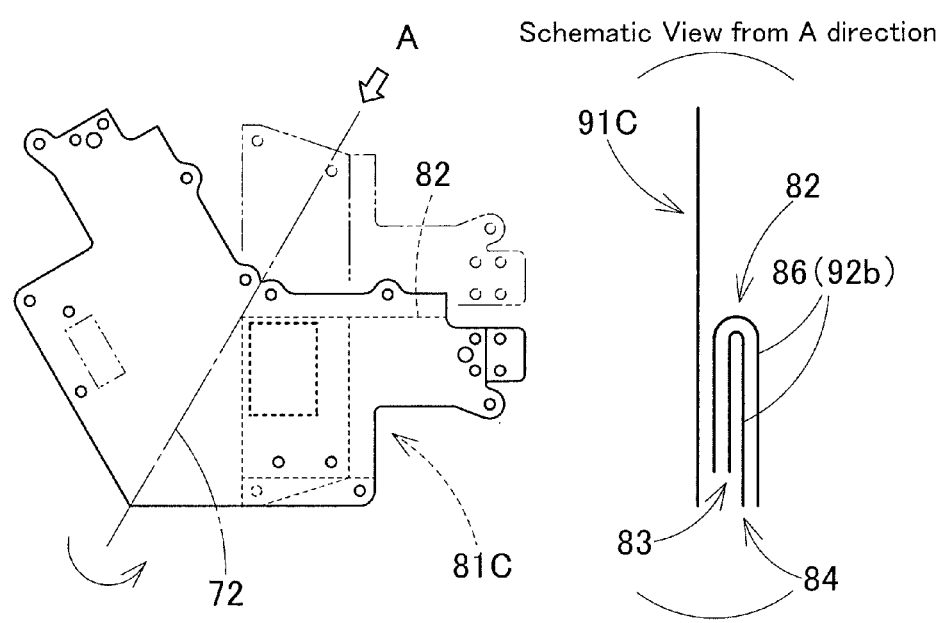
Figure 31:
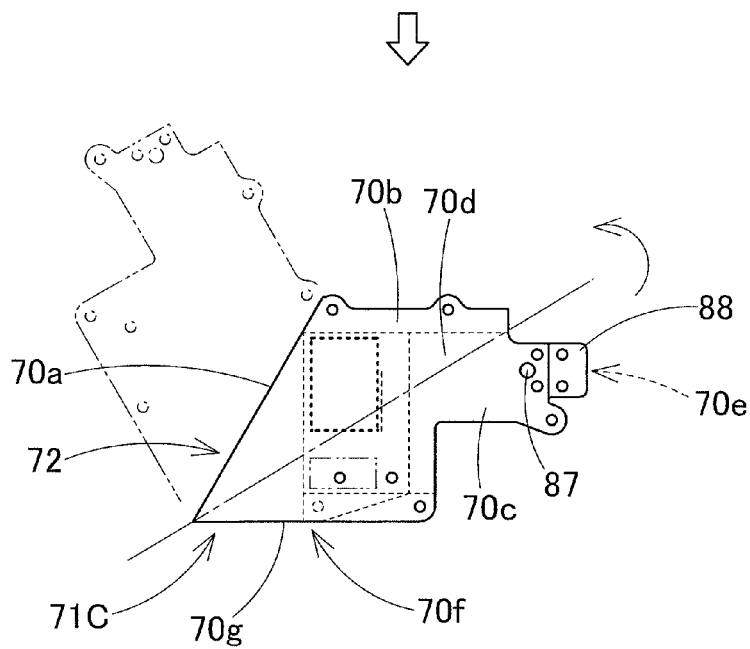

Then as shown in FIGS. 30 and 31, the second constituent 92C is doubled on the axial-direction crease 82 to form the second cover region 81C, and then as shown in FIG. 31, the first constituent 91C is doubled on the crossing crease 72 to form the first cover region 71C. The second cover region 81C is disposed inside the first cover region 71C.

Figure 32:
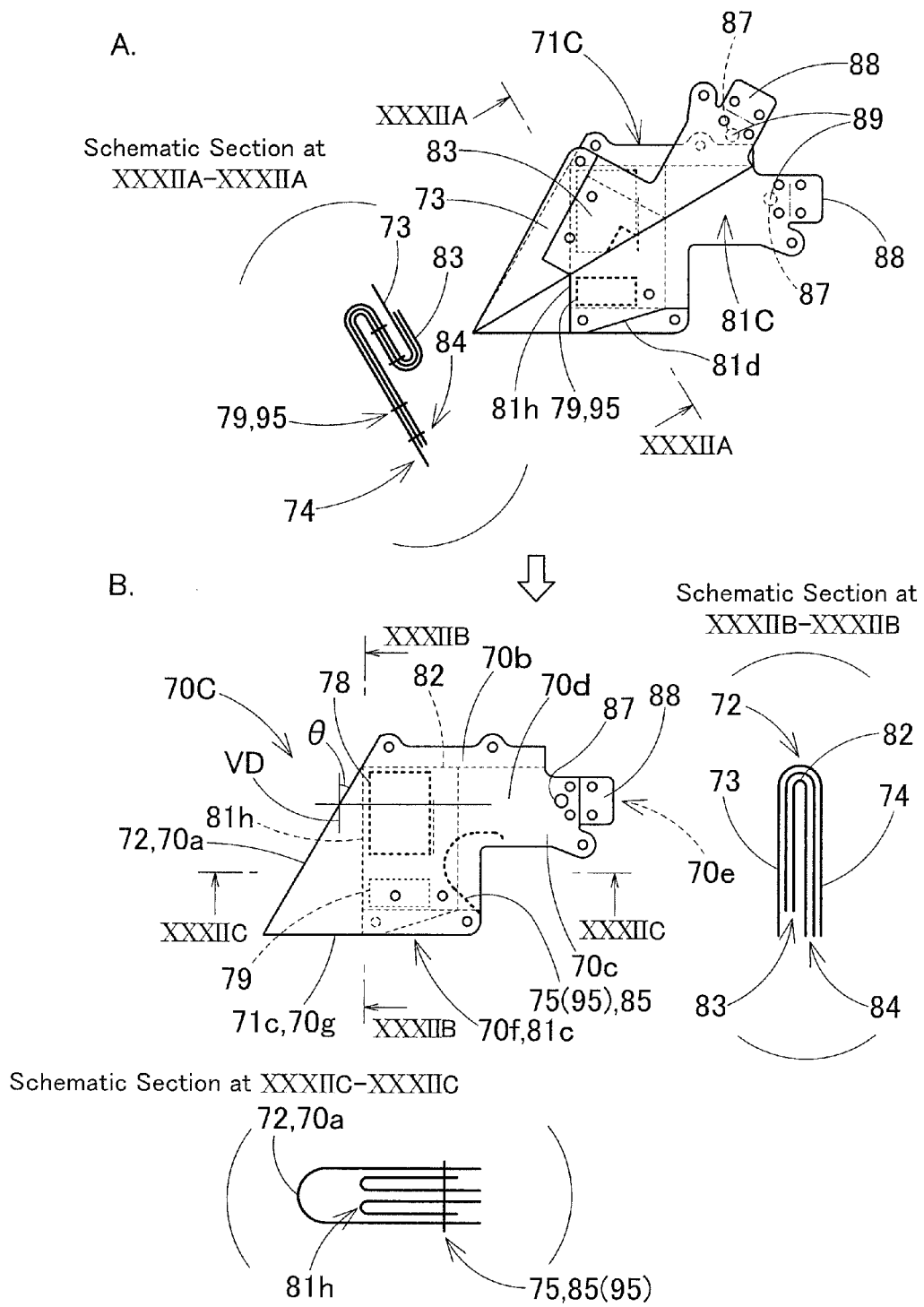

As shown in FIG. 32, the crossing crease 72 of the first cover region 71C is inclined from a direction VD perpendicular to the axial direction of the inflator 20 at such an inclination angle θ (about 60°, in the illustrated embodiment) as to enlarge toward the opening 71c.

Thereafter, as shown in FIGS. 31 and 32, the inboard side regions 73 and 83 of the first cover region 71C and second cover region 81C are turned over and the outboard side regions 74 and 84 of the first cover region 71C and second cover region 81C are sewn together with the seam 79. The seam 79 is formed into a generally rectangular ring in proximity to the front edge 81h and in a vicinity of the lower end 81d of the second cover region 81C, in such a manner as not to overlap the seam 78. If then seams 75 and 85 are formed with sewing threads 95 in order to fix the first cover region 71C to the second cover region 81C and to fix the inboard side region 73 of the first cover region 71C to the outboard side region 74, the reinforcing sheet 70C is completed. The crossing crease 72 continues to the axial-direction crease 82 in the reinforcing sheet 70C as well.

Although different reference numerals are given, the seam 75 is the same as the seam 85, both of which sew the inboard side region 73 and outboard side region 74 of the first cover region 71C and the inboard side region 83 and outboard side region 84 of the second cover region 81C all together.

As shown in FIG. 32, the reinforcing sheet 70C produced as described above includes a tubular region 70d which is provided with an insertion opening 70e at the rear end and accommodates the leading end 20a region of the inflator 20, and an open region 70f provided with an emission opening 70g for allowing an outflow of inflation gas G. The emission opening 70g is disposed at the lower edge of the front end 70a region of the reinforcing sheet 70C (see also FIGS. 24 to 26). The open region 70f receives the inflation gas G emitted from the gas releasing portion 22 of the inflator 20 and releases it from the emission opening 70g, i.e., from the openings 71c and 81c of the first cover region 71C and second cover region 81C. In a similar fashion to the foregoing reinforcing sheet 70, the open region 70f is composed of the gas paths 71b and 81b of the first cover region 71C and second cover region 81C.

Figure 34:
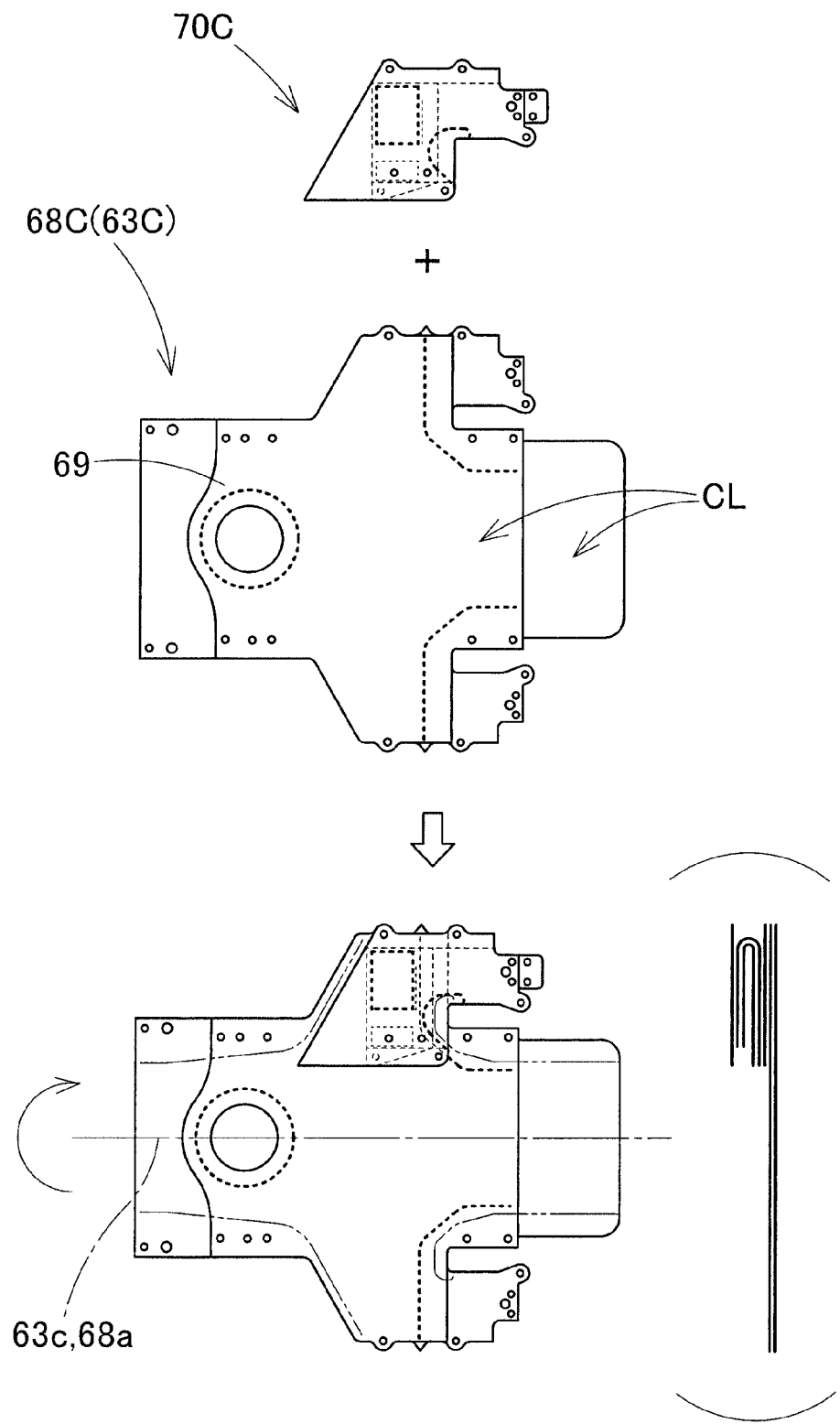
FIGS. 34 and 35 illustrate the process of assembling the reinforcing sheet and the inner tube.

Referring to FIGS. 34 and 35, the completed reinforcing sheet 70C is placed on a sheet material 68C for forming the inner tube 63C. The sheet material 68C is folded on the crease 68a such that the inboard side region 63a and outboard side region 63b overlap each other, and the inboard and outboard side regions 63*a* and 63*b* are sewn together by predetermined regions of the outer peripheral edges with a sewing thread 95, except the insertion opening 64*a* and outlet ports 65*a* and 65*b*, thereby forming a sewn seam 66*a* and a sewn seam 66*b*. The seam 66*a* is formed at the outer peripheral edge between the front outlet port 65*a* and insertion opening 64*a*, while the seam 66*b* is formed between the insertion opening 64*a* and rear outlet port 65*b*. Thus the inner tube 63C is completed. The seam 66*b* sews up the bent region 67 which is located at the rear edge 64*b* of the connection tube region 64C in a vicinity of the insertion opening 64*a* and an upper edge 65*d* of the outlet region 65C at the rear of the connection tube region 64C.

In the airbag 30C, although the seam 66*a* does not sew the reinforcing sheet 70C, the seam 66*b* partially sews the reinforcing sheet 70C together with the inner tube 63C. That is, the seams 66*a* and 66*b* form the outer contour of the inner tube 63C while the seam 66*b* joins the reinforcing sheet 70C with the inner tube 63C. Thus, a reinforcing sheet assembly 97C, in other words, the inner tube 63C equipped with the reinforcing sheet 70C, is formed.

Figure 33:
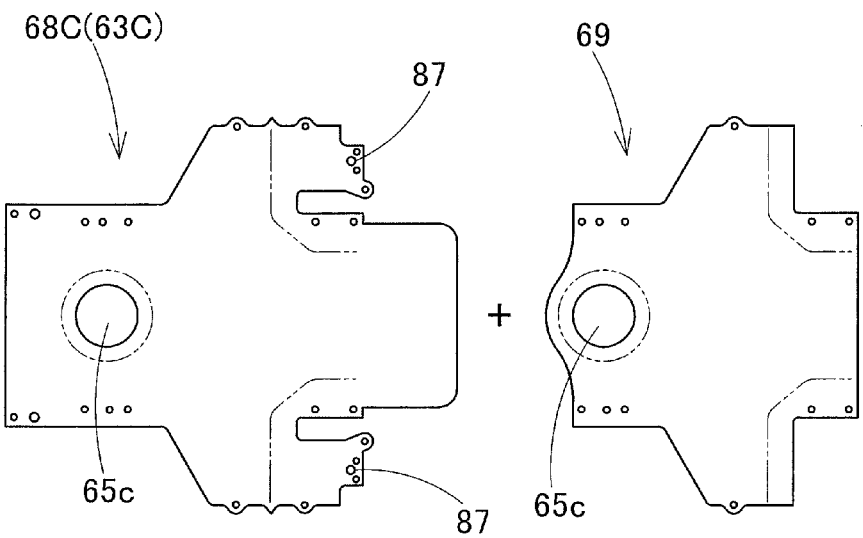
FIG. 33 illustrates the production process of an inner tube for use in the airbag of FIG. 23.
Figure 33:
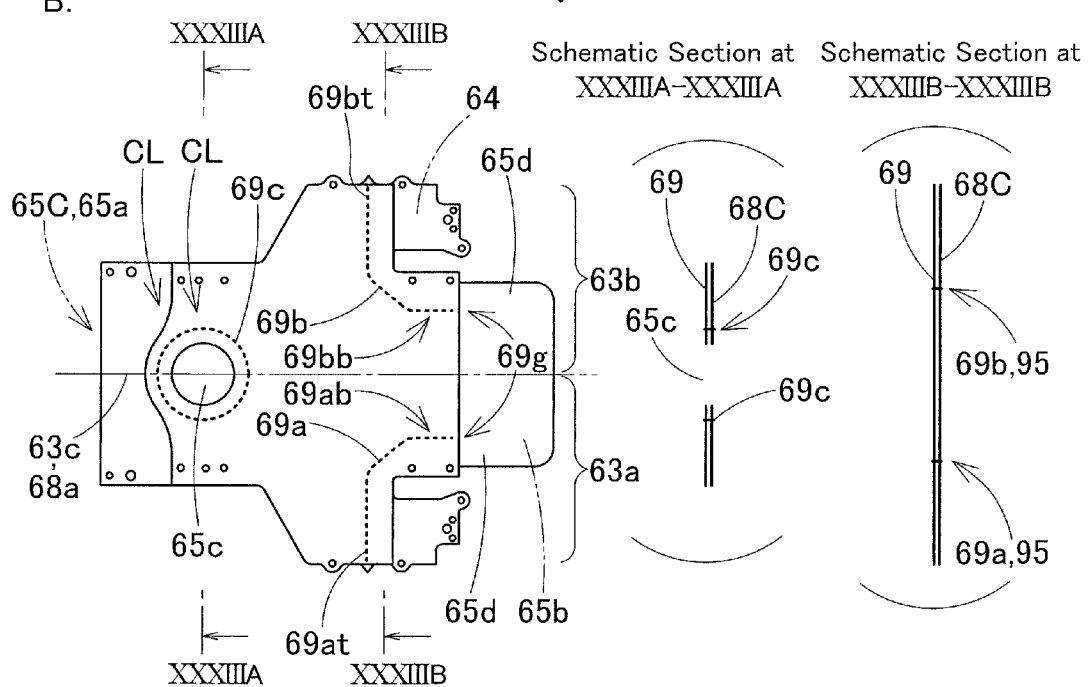

Further, as shown in FIG. 33 and described above, the inner tube 63C is provided with the patch cloth 69 on the inner side. The patch cloth 69 is arranged at a front region of the connection tube region 64C and a central region of the outlet region 65C except vicinities of the outlet ports 65*a* and 65*b*. The patch cloth 69 is sewn to the inner plane of the sheet material 68C for forming the inner tube 63C with the seams 69*a*, 69*b* and 69*c* of sewing threads 95.

Figure 27:
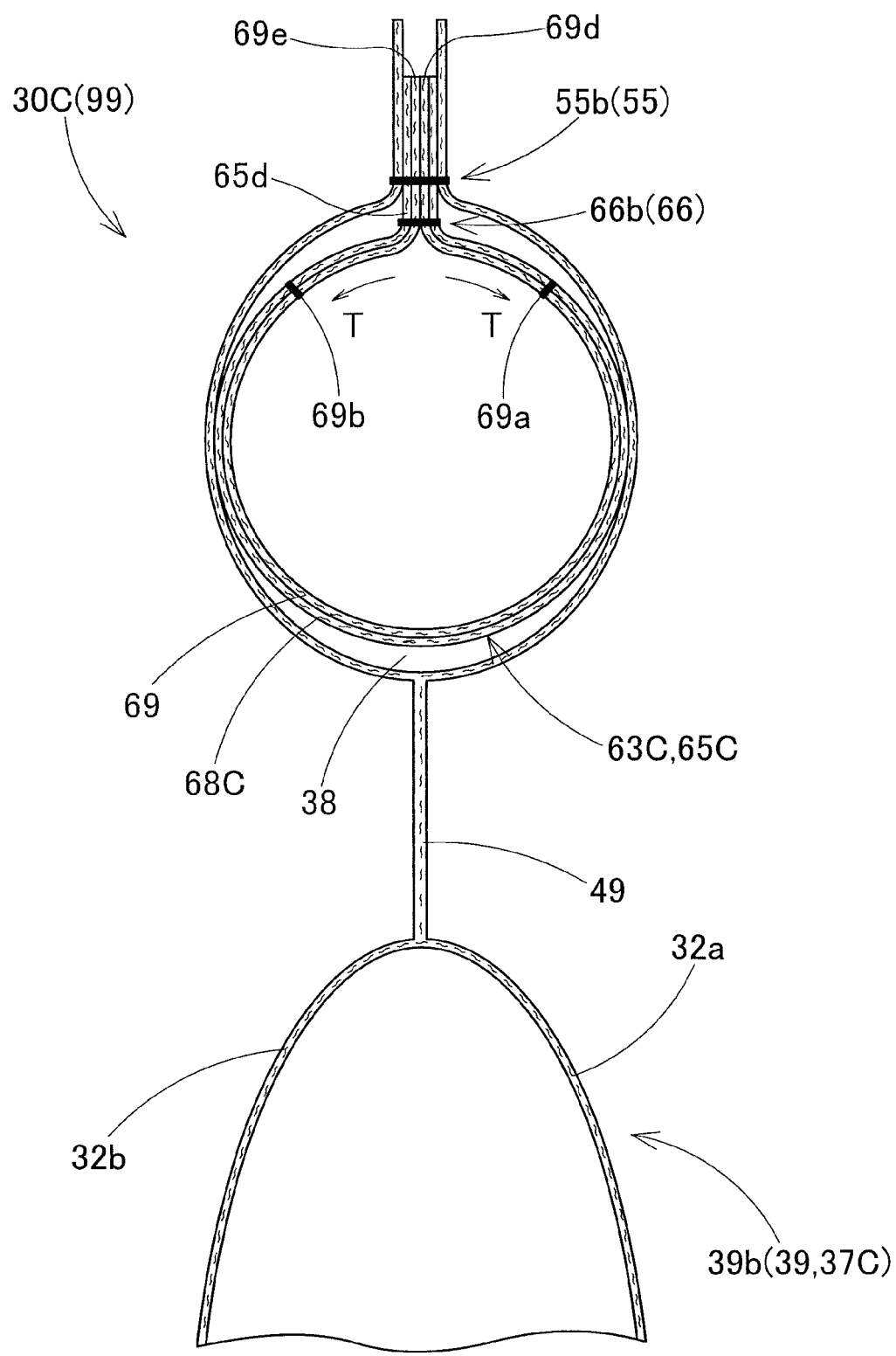
FIG. 27 is a schematic vertical section of the airbag as inflated, taken along line XXVII-XXVII of FIG. 24.

As shown in FIGS. 27 and 35, the seam 69*a* sews the patch cloth 69 to the inboard side region 63*a* of the inner tube 63C along and on an inner side of (i.e., dislocated from) the seam 66*b* at the bent region 67, in proximity to the seam 66*b*. The seam 69*b* sews the patch cloth 69 to the outboard side region 63*b* of the inner tube 63C along and on an inner side of (i.e., dislocated from) the seam 66*b* at the bent region 67, in proximity to the seam 66*b*. As shown in FIG. 33, upper end regions 69*at* and 69*bt* of the seams 66*a* and 66*b* each extend straightly in a direction perpendicular to the crease 68*a*.

The seam 69*c* sews the patch cloth 69 to the inner tube 63C in the periphery of the intermediate outlet port 65*c*.

Figure 36:
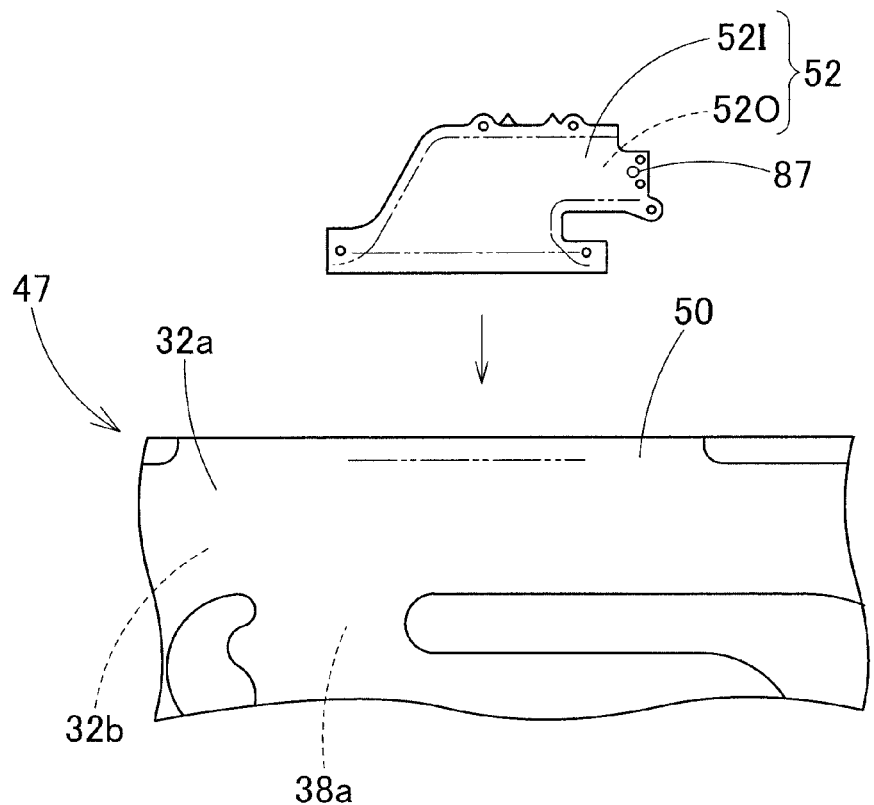
FIGS. 36 and 37 illustrate the production process of the airbag of FIG. 23.
Figure 36:
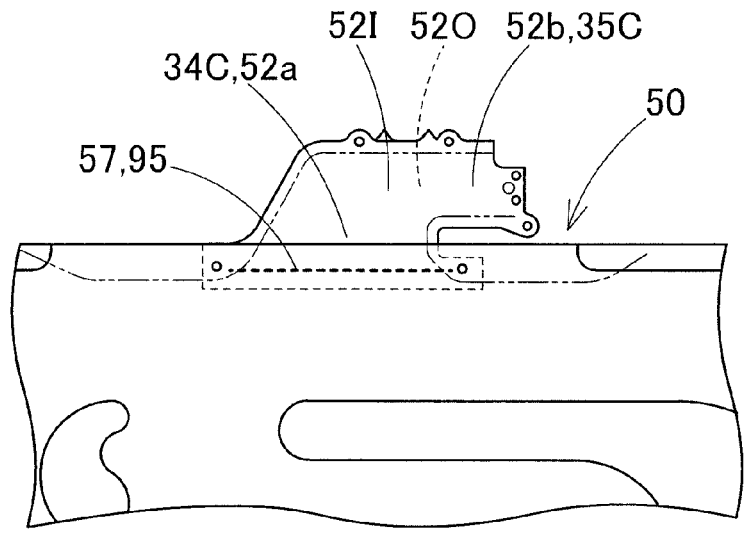

Subsequently, the reinforcing sheet assembly 97C is assembled with the bag body 31C. By this time, on the part of the bag body 31C, as shown in FIG. 36, the base cloths 52I and 52O of the connection port 33C have been sewn to the inboard side wall 32*a* and outboard side wall 32*b* of the split portion 50 of the one-piece woven portion 47 with seams 57 of the sewing threads 95 in advance. Then as shown in FIG. 37, the reinforcing sheet assembly 97C is placed between the base cloths 52I and 52O, and the base cloths 52I and 52O, the reinforcing sheet 70C and inner tube 63C are sewn together with the front edge seam 55*a* and the rear edge seam 55*b* using the sewing threads 95, thereby the connection port 33C is completed as well as the reinforcing sheet assembly 97C is fixed to the connection port 33C. Specifically, the front edge seam 55*a* sews together the base cloths 52I and 52O, the upper front edge of the inner tube 63C and the upper edge 70*b* of the reinforcing sheet 70C above and at a distance from the axial direction cease 82 (see FIG. 24). The rear edge seam 55*b* sews the base cloths 52I and 52O, the reinforcing sheet 70C and inner tube 63C together at the lower edge of the tubular region 35, at the rear of the seams 75 and 85 of the reinforcing sheet 70C.

Thereafter, as shown in FIGS. 24, 26 and 37, the tongue regions 88 (88I and 88O), which protrude out of the opening 35*c* of the tubular region 35C of the connection port 33C in an opposing fashion, are folded back on the outer surface of the tubular region 35C and welded to the second cover region 81C through the through holes 87 formed on the base cloths 52 of the connection port 33C, inner tube 63C and first cover region 71C of the reinforcing sheet 70C. That is, the tongue regions 88 are fixed to the outer surface of the tubular region 35C of the connection port 33C in a periphery of the opening 35*c*.

If then the mounting portions 60 are sewn to predetermined positions of the bag body 31C, the airbag 30C is completed.

Thereafter, the airbag 30C is folded up in such a fashion as to bring the lower edge 31*b* close to the upper edge 31*a*, and is bound with a breakable tape for keeping a folded-up configuration. Mounting brackets 13 (FIG. 1) are attached to the mounting portions 60. Then the leading end 20*a* region of the inflator 20 is inserted into the insertion opening 70*e* (i.e., the opening 35*c* of the tubular region 35 of the connection port 33C) of the tubular region 70*d* of the reinforcing sheet 70C disposed inside the connection tube region 64 of the inner tube 63C, thus inserted in the tubular region 35 of the connection port 33C. Subsequently, a clamp 28 is mounted around the outer circumference of the tubular region 35 of the connection port 33C to joint the inflator 20 with the tubular region 35. Thus an airbag module 99 is completed.

Thereafter, the mounting portions 60 with the mounting brackets 13 are disposed at predetermined mounting positions on an inner panel 2 of a vehicle body structure 1, and bolt 14 fastened thereat. Further, the inflator 20 is secured to the inner panel 2 by fixing the mounting bracket 24 with bolts 26, thus the airbag module 99 is mounted on the vehicle body structure 1. Then the inflator 20 is connected with a not-shown lead wire extending from a suitable control for actuating the inflator. If then a front pillar garnish 4, a roof head liner 5, a middle pillar garnish 7 and a rear pillar garnish 8 are attached to the vehicle body structure 1, the head-protecting airbag device S is mounted on the vehicle V.

The airbag device S provided with the airbag 30C will provide the same operational advantages as the foregoing airbag device S with the airbag 30, and provide following additional advantages due to the configuration of the airbag 30C.

In the airbag 30C, as shown in FIGS. 24 to 26, the second cover region 81C and first cover region 71C of the reinforcing sheet 70C are sewn together by the front edge 81*h* disposed at a distance from the leading end of the inflator 20 in an axial direction ID of the inflator 20, with the seams 78 and 79.

This configuration will prevent the front edge 81*h* of the second cover region 81C from riding up and being separated from the first cover region 71C due to an inflation gas G, and further prevent the inflation gas G from flowing into a space between the second cover region 81C and first cover region 71C via the front edge 81*h* of the second cover region 81C. By way of example, even if the gas G hits the crossing crease 72 of the first cove region 71C and bounces back towards the axial-direction crease 82 of the second cover region 81C, the gas G is not likely to flow into a space outside of the second cover region 81C since the front edge 81*h* stays fixed to the first cover region 71C. Accordingly, if there is a seam 55*a* which sewed up the first cover region 71C, inner tube 63C or the like outside the axial-direction crease 82, the seam 55*a* will not be damaged by the inflation gas G.

It will be appreciated that this configuration may be applied to the reinforcing sheet 70 depicted in FIG. 11.

In the airbag 30C, as shown in FIGS. 25 and 26, the second cover region 81C disposed closer to the inflator 20 includes a coating layer CL having heat resisting property on the inner plane to contact the inflator 20, thus improving heat resistance of the reinforcing sheet 70C.

In the airbag 30C, especially, both of the first cover region 71C and second cover region 81C are provided with a coating layer CL on the inner planes facing toward the inflator 20. Therefore, the heat resistance of the reinforcing sheet 70C will be further improved.

Since the first cover region 71C and second cover region 81C are composed of separate members (i.e., the first constituent 91C and second constituent 92C), it will be easy to form a coating layer CL on the plane of each of the cover regions 71C and 81C to face towards the inflator 20 and be subjected to an inflation gas G.

In comparison, the reinforcing sheet 70 in the foregoing embodiment is composed of a single sheet material 90 as shown in FIGS. 8 to 10, and the inner planes of the first cover region 71 and second cover region 81 are located on opposite sides of the sheet material 90. In this instance, a coating layer CL may be formed on one side of the sheet material 90 such that at least the second cover region 81 disposed closer to the inflator 20 has the coating layer CL on the inner plane.

The first cover region 71B and second cover region 81B shown in FIGS. 19 and 20 also desirably have a coating layer for enhancing heat resisting property on the planes to be subjected to an inflation gas G. Furthermore, the inner tubes 63 and 63B shown in FIG. 3 and FIG. 21B desirably have such a coating layer.

In the airbag 30C, the first cover region 71C and second cover region 81C are both provided with a coating layer CL formed from such a coating agent as silicone resin, on the inner planes. Usually, such a coating layer CL has a high friction resistance and makes it difficult to insert the inflator 20 into the reinforcing sheet 70 via the opening 35c of the connection port 33C.

However, the second cover region 81C (i.e., the cover region disposed closer to the inflator 20) of the reinforcing sheet 70C of the airbag 30C includes the tongue regions 88 (88I and 88O) that are disposed proximate to the opening 35c of the connection port 33C for receiving the inflator 20 and on both sides of the inflator 20, in an opposing fashion, and the tongue regions 88 are folded back on the outer surface of the connection port 33C and fixed to the outer surface of the connection port 33C with the aid of the welding portion 89, as shown in FIG. 26. That is, the tongue regions 88 extend from inside to the outside of the opening 35c of the connection port 33C and covers the end planes of the reinforcing sheet 70C, inner tube 63C and connection port 33C. By being gripped by fingers, the tongue regions 88 (88I and 88O) will assist the insertion of the inflator 20 into the reinforcing sheet 70C, and further help prevent the inflator 20 from being erroneously inserted in between the reinforcing sheet 70C and connection port 33C.

In the airbag 30C, moreover, the inner tube (redirecting sheet) 63C has an additional intermediate outlet port 65c between the front and rear outlet ports 65a and 65b and on the crease 68a (i.e., at the lower edge 63c) for releasing an inflation gas G.

This configuration will facilitate controlling of the flow rate of the inflation gas G released from the outlet ports 65a, 65b and 65c of the inner tube 63C depending on the number of the inflatable portions 39a, 39b and 40 and improve the performance of the airbag 30C. In the bag body 31C of the airbag 30C, the pressure-control chamber 39b prevents an undue pressure rise of the main chamber 39a by admitting an inflation gas G from the intermediate outlet port 65c, when a head of a passenger is located at a side of the upper region of the main chamber 39a, by way of example.

In the airbag 30C, furthermore, the inner tube 63C is formed by folding the sheet material 68C in half on the crease 68a and sewing up the overlapped outer peripheral edges with the seams 66a and 66b. The inner tube 63C includes a bent region 67 at which the outlet region 65C bends from the connection tube region 64C in a generally L shape, and the seam 66b is located at the bent region 67. The inner tube 63C is provided, on the inner plane of at least in a vicinity of the bent region 67, with the patch cloth 69 having flexibility. As shown in FIG. 33, the patch cloth 69 is integrated with the inner tube 63C by being sewn to the inboard side region 63a and outboard side region 63b of the inner tube 63C along the bent region 67, in a vicinity of the bent region 67 and at a position dislocated from the seam 66b sewing up the outer peripheral edges of the sheet material 68C at the bent region 67. The seam 66b sews the edges 69d and 69e of the patch cloth 69 together with the inner tube 63C.

If the airbag device S is actuated and the inflator feeds an inflation gas G to the airbag 30C, a stress concentration is likely to occur on the seam 66b at the bent region 67 of the inner tube 63C due to a tension force T generated by pressure of the gas G. However, as shown in FIGS. 24 and 27, the seam 66b is reinforced by the patch cloth 69. Specifically, the seams 69a and 69b sew the patch cloth 69 to the inboard side region 63a and outboard side region 63b of the inner tube 63C at farther interior positions than the seam 66b of the bent region 67 (FIG. 27) and the inner tube 63C is reinforced in thickness. This configuration will help prevent the seam 66b from being damaged by the inflation gas G and help the inner tube 63C feed the gas G out of the outlet ports 65a, 65b and 65c.

In the illustrated embodiment, the seams 69a and 69b of the patch cloth 69 are located in a vicinity of the seam 66b of the inner tube 63C, which seam 66b is an L or J shape with a greater curvature than another seam 66a of the outer peripheral edge of the inner tube 63C. However, the patch cloth 69 may be sewn to the inner tube 63C in a vicinity of the front seam 66a as well if the front seam 66a is likely to be damaged at airbag deployment.

In the illustrated embodiment, although there is no seam of the patch cloth in a vicinity of the seam 66a, the seam 66a has a smaller curvature than the seam 66b and the vicinity of the seam 66a is also thickened with the patch cloth 69, thus configured to be resistant against the pressure of inflation gas G upon airbag deployment. In the illustrated embodiment, especially, each of the seams 69a and 69b has the end regions 69at/69bt which extends up to the edges of the sheet material 68C distant from the crease 68a, i.e., up to the upper edge 64c of the connection tube region 64. Thus the end regions 69at and 69bt help reinforce the vicinity of the seam 66a and prevent the region from being damaged at airbag deployment by integrating the patch cloth 69 to the sheet material 68C in the circumferential wall of the connection tube region 64.

That is, when the inner tube 63C is integrated with a patch cloth 69 for reinforcement, it is desirable to locate the seam to sew the patch cloth 69 to the sheet material 68C to extend generally straightly downward from the outer periphery of the connection tube region 64 up to the region beyond the bent region 67 between the front and rear seams 66a and 66b.

Moreover, when the inner tube 63C has a seam 66b which sews up the bent region 67 with a great curvature at the intersection of the connection tube region 64 and outlet region 65C as in the illustrated embodiment, it is further desirable to form each of the seams 69a and 69b in a vicinity of the bent region 67 in such a manner as to extend generally straightly downward from the outer periphery (i.e., the upper edge 64c) of the connection tube region 64 and bend along the bent region 67 and further extend along the rear upper edge 65d of the outlet region 65C up to the end in a front and rear direction of the patch cloth 69 (i.e., to the rear end 69g).

The end regions 69at and 69bt of the seams 69a and 69b do not necessarily have to extend up to the upper edge 64c of the connection tube region 64. They have only to extend towards the upper edge 64c of the connection tube region 64, and therefore, may also be configured to intersect with the seam 66a in a front region of the connection tube region 64.

In the illustrated embodiment, the patch cloth 69 is composed of a single sheet material, and therefore easily attached to the sheet material 68C of the inner tube 63C, which is also a single sheet material, and is easy to handle.

Without considering such an advantageous effect, the patch cloth may also be formed of two pieces of sheet materials each of which is sewn to a vicinity of the seam 66b in the inboard side region 63a/outboard side region 63b of the inner tube 63C.

In the foregoing embodiments, the airbag 30/30B/30C have been described as is provided with an inner tube (redirecting sheet) 63/63B/63C. However, the airbag may be configured without an inner tube such that a reinforcing sheet 70/70B/70C only is disposed inside the tubular region 35/35B/35C and root region 34/34B/34C of the connection port 33/33B/33C. Also in this instance, the reinforcing sheet 70/70B/70C will improve heat resisting property of the front edge 34a and upper edge 35a of the connection port 33/33B/33C, especially when a sewn seam 55a is located at the front edge of the connection port 33/33B/33C.

Although the invention has been described as applied to the head-protecting airbag device S, the invention may also be applied to an airbag for pedestrian protection, by way of example, so far as the airbag includes a connection port which protrudes out of a main inflatable region and is bent in a L shape when mounted on a vehicle and a reinforcing sheet disposed in the connection port.

The connection port of the airbag of the invention may also be formed in such a manner as to protrude straightly out of the main inflatable portion, so far as it is bent in an L shape when mounted on a vehicle so as to form the root region and tubular region.

What is claimed is:

1. An airbag device mountable on a vehicle, comprising:
   a generally cylindrical inflator which emits an inflation gas from a leading end region thereof;
   an airbag inflatable with the inflation gas fed from the inflator, including:
   a bag body including a main inflatable portion that is inflatable in such a manner as to separate a front wall from a back wall thereof and a connection port that is tubular in shape and connected with the inflator for admitting the inflation gas into the main inflatable portion; and
   a flexible reinforcing sheet disposed inside the connection port for covering the leading end region of the inflator, the reinforcing sheet including:
   a first cover region that has a double-folded configuration that is doubled, at a region of the reinforcing sheet distant from the leading end region of the inflator in an axial direction of the inflator, on a crossing crease which crosses the axial direction of the inflator, and wraps the leading end region of the inflator with regions of the first cover region disposed on both sides of and away from the crossing crease, the first cover region including an opening facing towards the main inflatable portion of the bag body; and
   a second cover region that has a double-folded configuration that is doubled, at a distant edge of the reinforcing sheet disposed facing away from the main inflatable portion of the bag body, on an axial-direction crease which extends in parallel to the axial direction of the inflator, and wraps the leading end region of the inflator with regions of the second cover region disposed on both sides of the axial-direction crease, the second cover region including an opening facing towards the main inflatable portion of the bag body, and the first cover region and second cover region being arranged in such an overlapped fashion that the crossing crease continues to the axial-direction crease at a region distant from the leading end of the inflator.

2. The airbag device of claim 1, wherein the second cover region of the reinforcing sheet is located on an inner side of the first cover region.

3. The airbag device of claim 2, wherein the second cover region and the first cover region of the reinforcing sheet are sewn together by an end region of the second cover region disposed distant from the leading end of the inflator in the axial direction of the inflator.

4. The airbag device of claim 1, wherein the crossing crease of the first cover region of the reinforcing sheet is inclined from a direction perpendicular to the axial direction of the inflator at such an angle as to enlarge toward the opening.

5. The airbag device of claim 1, wherein the first cover region of the reinforcing sheet is sewn up by a distant edge thereof that is disposed on a part facing away from the main inflatable portion and extends in such a fashion as to continue from the crossing crease.

6. The airbag device of claim 1, wherein the second cover region of the reinforcing sheet is sewn up by an edge thereof disposed on a part facing away from the axial-direction crease and adjoining the opening and an opening for receiving the inflator.

7. The airbag device of claim 1, wherein the first cover region and second cover region are sewn together by edges thereof that are disposed on a part facing away from the axial-direction crease and adjoin said openings of the first cover region and second cover region and openings for receiving the inflator.

8. The airbag device of claim 1, wherein the first cover region and second cover region are composed of such a single piece of sheet material that the first cover region and second cover region are joined with each other in a seamless fashion.

9. The airbag device of claim 1, wherein the first cover region includes, in a vicinity of the crossing crease, a reinforced region that has a multi-layered structure.

10. The airbag device of claim 1, wherein the second cover region includes, in a vicinity of the axial-direction crease, a reinforced region which has a multi-layered structure.

11. The airbag device of claim 1, wherein at least either one of the cover regions of the reinforcing sheet disposed closer to the inflator includes a coating layer having heat resisting property on an inner plane thereof approximating the inflator.

12. The airbag device of claim 1, wherein each of the first cover region and second cover region of the reinforcing sheet includes a coating layer having heat resisting property on a plane thereof facing toward the inflator.

13. The airbag device of claim 11, wherein:
the cover region disposed closer to the inflator further includes tongue regions that are disposed proximate to an opening of the connection port for receiving the inflator and on both sides of the inflator, in an opposing fashion; and
each of the tongue regions is folded back on an outer surface of the connection port and attached to the outer surface of the connection port.

14. The airbag device of claim 1, wherein:
the airbag further includes a redirecting sheet that has flexibility and is disposed inside the connection port and a region of the main inflatable portion adjoining the connection port such that the reinforcing sheet is located on an inner side of the redirecting sheet; and
the redirecting sheet includes a connection tube region that is disposed inside the connection port of the bag body to receive the leading end region of the inflator and be connected with the inflator, and an outlet region that extends from the connection tube region into the main inflatable portion and includes at least two outlet ports for releasing the inflation gas towards opposite directions.

15. The airbag device of claim 14, wherein the redirecting sheet is composed of a piece of flexible sheet material that is formed into the redirecting sheet by being folded in half on a crease disposed in the outlet region and sewn up by overlapped outer peripheral edges thereof.

16. The airbag device of claim 15, wherein the redirecting sheet includes an additional intermediate outlet port for releasing the inflation gas between said outlet ports in the outlet region.

17. The airbag device of claim 15, wherein:
the redirecting sheet includes a bent region at which the outlet region bends from the connection tube region in a generally L shape, and a seam sewing up the overlapped outer peripheral edges of the redirecting sheet is located at the bent region;
the redirecting sheet is provided, on an inner plane thereof of at least a vicinity of the bent region, with a patch cloth having flexibility;
the patch cloth is integrated with the redirecting sheet by being sewn to regions of the redirecting sheet on both sides of the crease, along the bent region, in a vicinity of the bent region and at a position dislocated from the seam at the bent region; and
the seam at the bent region sews edges of the patch cloth together with the redirecting sheet.

18. The airbag device of claim 17, wherein the patch cloth is composed of a single sheet material.

* * * * *